(12) United States Patent
Koyama et al.

(10) Patent No.: US 6,424,385 B1
(45) Date of Patent: Jul. 23, 2002

(54) STILL IMAGE SYSTEM

(75) Inventors: Noboru Koyama, Kanagawa; Fumihiko Kaise, Tokyo; Hiroe Honma, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/637,807

(22) PCT Filed: Sep. 8, 1995

(86) PCT No.: PCT/JP95/01793

§ 371 (c)(1),
(2), (4) Date: Jul. 3, 1996

(87) PCT Pub. No.: WO96/08014

PCT Pub. Date: Mar. 14, 1996

(30) Foreign Application Priority Data

Sep. 8, 1994 (JP) .............................................. 6-214962

(51) Int. Cl.⁷ ................................................ H04N 5/44

(52) U.S. Cl. ........................... 348/734; 386/70; 386/69; 386/83; 348/734

(58) Field of Search .............................. 386/70, 69, 83, 386/46, 52, 55, 95, 107, 106, 117, 118, 125, 37, 123; 348/734, 1, 8, 38; 360/32; H04N 5/781, 5/83, 5/783

(56) References Cited

U.S. PATENT DOCUMENTS 5,126,851 A  * 6/1992 Yoshimura et al. ........... 386/52
5,412,486 A    5/1995 Bannai et al.

FOREIGN PATENT DOCUMENTS

| EP | 0449529 A2 | 2/1991 | ............. H04N/1/32 |
| JP | 63-182777 | 7/1988 | ............. G06F/15/40 |
| JP | 3-276259 | 12/1991 | ............. G06F/15/40 |
| JP | 6-236406 | 8/1994 | ............. G06F/15/40 |

* cited by examiner

*Primary Examiner*—Robert Chevalier
(74) *Attorney, Agent, or Firm*—Bell, Boyd & Lloyd LLC

(57) ABSTRACT

There are provided on an optical disk a high resolution image file for storing a high resolution image data, an index file for storing a predetermined number of low resolution image data, a management file for storing information about the high and low resolution image data, and a management data table for controlling the relative locations of the high resolution image file and index file to each other on the optical disk. A playback apparatus according to the present invention plays back the index file through referring to data of the management file and management data table and produces on a monitor a single screen display of the predetermined number of the low resolution image data saved in the index file. Accordingly, the predetermined number of the low resolution image data can be read out by a single access action thus speeding up the display of index images.

25 Claims, 45 Drawing Sheets

FORMAT TABLE

| FIELD NAME | NUMBER OF BYTES | DATA TYPE |
|---|---|---|
| TABLE ID | 1 | B |
| NEXT TABLE POINTER | 1 | B |
| FORMAT VERSION | 2 | B |
| FILE TYPE | 1 | B |
| FILE TYPE VERSION | 1 | B |
| NUMBER OF TABLES | 1 | B |
| RESERVED (EMPTY) | 1 | B |
| DATA START ADDRESS | 4 | B |
| DATA SIZE | 4 | B |
| RESERVED (EMPTY) | 4 | |

FIG.26

IMAGE PARAMETER TABLE

| FIELD NAME | NUMBER OF BYTES | DATA TYPE |
|---|---|---|
| TABLE ID | 1 | B |
| NEXT TABLE POINTER | 1 | B |
| IMAGE SIZE (IN HORIZONTAL) | 2 | B |
| IMAGE SIZE (IN VERTICAL) | 2 | B |
| IMAGE COMPONENT | 1 | B |
| MATRIX IDENTITY | 1 | B |
| WIDE ID | 1 | B |
| COMPRESSION RATE | 1 | B |
| RIGHT OF COPY AND EDIT | 1 | B |
| INPUT DEVICE TYPE | 1 | B |
| RESERVED (EMPTY) | 3 | B |
| PRESENCE OF DUMMY DATA | 1 | B |
| X-BIGIN OF EFFECTIVE DATA | 2 | B |
| Y-BIGIN OF EFFECTIVE DATA | 2 | B |
| X-SIZE OF EFFECTIVE DATA | 2 | B |
| Y-SIZE OF EFFECTIVE DATA | 2 | B |
| RESERVED (EMPTY) | 4 | B |

FIG.27

OV_INF. PMF FILE (OVERALL DATA MANAGEMENT FILE)

| HEADER | | |
|---|---|---|
| FORMAT TABLE | | {MUST} |
| NAME TABLE | | {OPTION} |
| COMMENT TABLE | | {OPTION} |
| DISC ID TABLE | | {OPTION} |
| OPTION TABLE | | {OPTION} |

DATA

| FIELD NAME | NUMBER OF BYTES | DATA TYPE |
|---|---|---|
| TOTAL NUMBER OF IMAGES | 2 | B |
| NEXT IMAGE DIRECTORY NUMBER | 2 | B |
| TOTAL NUMBER OF IMAGE DIRECTORIES | 2 | B |
| NUMBER OF PLAYBACK CONTROL FILES | 1 | B |
| APPLICATION OF PMSEQ DIRECTORY | | |
| NUMBER OF RGB | 1 | B |
| NUMBER OF PRINT DATA FILES | 1 | B |
| NUMBER OF APPLICATION OF TELOP DATA FILE | 1 | B |
| APPLICATION OF SEARCH DATA FILE | 1 | B |
| AUTO-START FILE NUMBER | 1 | B |
| LAST ACCESSED IMAGE/DIRECTORY NUMBER | 2 | B |
| LAST ACCESSED IMAGE NUMBER | 2 | B |
| PASSWORD | 8 | B |
| NARRATION LANGUAGE DATA | 6 | B |
| RESERVED | 2 | |
| IMAGE DIRECTORY DATA UNIT | 48 × N | |

FIG.28(a)

| IMAGE DIRECTORY | NUMBER OF DATA UNIT BYTES | DATA TYPE |
|---|---|---|
| DIRECTORY NUMBER | 2 | B |
| INDEX IMAGE NUMBER | 2 | B |
| NUMBER OF IMAGES IN DIRECTORY | 2 | B |
| INDEX IMAGE INDIVIDUAL DATA | 1 | B |
| CHARACTER ID CODE | 1 | B |
| DIRECTORY NAME | 36 | A OR C |
| RESERVED | 4 | B |

FIG.28(b)

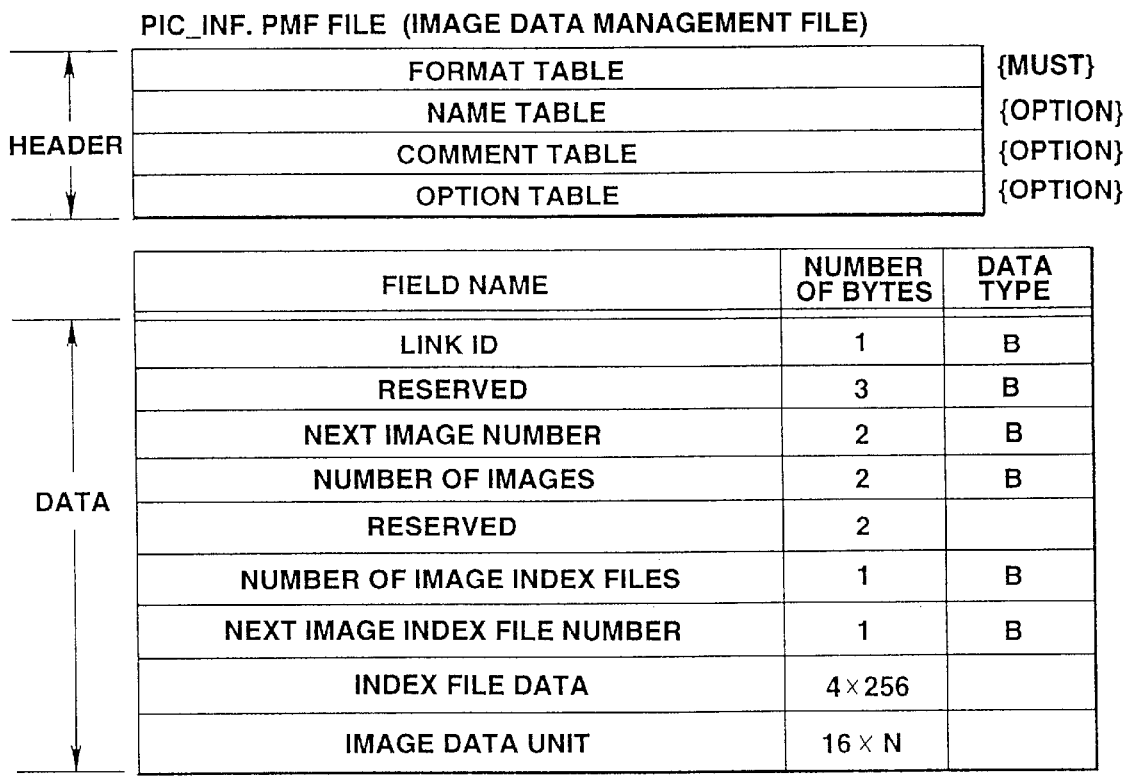

PIC_INF. PMF FILE (IMAGE DATA MANAGEMENT FILE)

HEADER:
| | |
|---|---|
| FORMAT TABLE | {MUST} |
| NAME TABLE | {OPTION} |
| COMMENT TABLE | {OPTION} |
| OPTION TABLE | {OPTION} |

DATA:
| FIELD NAME | NUMBER OF BYTES | DATA TYPE |
|---|---|---|
| LINK ID | 1 | B |
| RESERVED | 3 | B |
| NEXT IMAGE NUMBER | 2 | B |
| NUMBER OF IMAGES | 2 | B |
| RESERVED | 2 | |
| NUMBER OF IMAGE INDEX FILES | 1 | B |
| NEXT IMAGE INDEX FILE NUMBER | 1 | B |
| INDEX FILE DATA | 4 × 256 | |
| IMAGE DATA UNIT | 16 × N | |

FIG.29(a)

| IMAGE DATA UNIT | NUMBER OF BYTES | DATA TYPE |
|---|---|---|
| DIRECTORY NUMBER | 2 | B |
| IMAGE NUMBER | 2 | |
| IMAGE TYPE DATA | 1 | |
| IMAGE INDIVIDUAL DATA | 1 | |
| NUMBER OF LINKS | 1 | |
| NARRATION DATA | 1 | |
| KEYWORD SEARCH DATA NUMBER | 2 | |
| TIME STAMP SEARCH DATA NUMBER | 2 | |
| TELOP NUMBER | 2 | |
| RESERVED | 2 | |

FIG.29(b)

PRT_INF. PMF FILE
(PRINT DATA MANAGEMENT FILE)

| | | |
|---|---|---|
| HEADER | FORMAT TABLE | {MUST} |
| | NAME TABLE | {OPTION} |
| | COMMENT TABLE | {OPTION} |
| | OPTION TABLE | {OPTION} |

| | FIELD NAME | NUMBER OF BYTES | DATA TYPE |
|---|---|---|---|
| DATA | NEXT PRINT DATA FILE NUMBER | 1 | B |
| | TOTAL NUMBER OF PRINT DATA FILES | 1 | B |
| | RESERVED | 2 | |
| | PRINT DATA FILE MANAGEMENT DATA | 4×N | |

FIG.30 (a)

| PRINT DATA FILE MANAGEMENT DATA | NUMBER OF BYTES | DATA TYPE |
|---|---|---|
| PRINT DATA FILE NUMBER | 1 | B |
| PRINT EXECUTION ID | 1 | B |
| RESERVED | 2 | |

FIG.30 (b)

OV_IDX. PMX FILE (OVERALL INDEX FILE)

| | NUMBER OF BYTES |
|---|---|
| HEADER | |
| INDEX IMAGE DATA 0 | 4096 |
| INDEX IMAGE DATA 1 | 4096 |
| INDEX IMAGE DATA 2 | 4096 |
| ⋮ | ⋮ |
| INDEX IMAGE DATA N-1 | 4096 |
| INDEX IMAGE DATA N | 4096 |

FIG.32(a)

INDEX IMAGE DATA

| HEADER | FORMAT TABLE | {MUST} |
|---|---|---|
| | UNUSED | {MUST} |

| | FIELD NAME | NUMBER OF BYTES | DATA TYPE |
|---|---|---|---|
| HEADER | DATA (JPEG) | | |
| | UNUSED | | |

FIG.32(b)

PIDXnnn. PMX FILE (IMAGE INDEX FILE)

| | | NUMBER OF BYTES |
|---|---|---|
| HEADER → | INDEX IMAGE DATA 0 | 4096 |
| HEADER → | INDEX IMAGE DATA 1 | 4096 |
| | INDEX IMAGE DATA 22 | 4096 |
| | ⋮ | ⋮ |
| | INDEX IMAGE DATA N-1 | 4096 |
| | INDEX IMAGE DATA N | 4096 |

FIG.33(a)

INDEX IMAGE DATA

| | | |
|---|---|---|
| HEADER | FORMAT TABLE | {MUST} |
| | UNUSED | {MUST} |

| FIELD NAME | NUMBER OF BYTES | DATA TYPE |
|---|---|---|
| DATA (JPEG) | | |
| UNUSED | | |

(DATA)

FIG.33(b)

INDEX A:ALBUMNAME

| A1 | A2 | A3 | A4 | A5 |
|---|---|---|---|---|
| A6 | A7 | A8 | A9 | A10 |
| A11 | A12 | A13 | A14 | A15 |
| A16 | A17 | A18 | A19 | A20 |
| A21 | A22 | A23 | A24 | A25 |

FIG.39

ALBUM INDEX A-Y

| A1 | B1 | C1 | D1 | E1 |
|---|---|---|---|---|
| F1 | G1 | H1 | I1 | J1 |
| K1 | L1 | M1 | N1 | O1 |
| P1 | Q1 | R1 | S1 | T1 |
| U1 | V1 | W1 | X1 | Y1 |

FIG.40

ALBUM INDEX A-E

| A1 | A2 | A3 | A4 | A5 |
| B1 | B2 | B3 | B4 | B5 |
| C1 | C2 | C3 | C4 | C5 |
| D1 | D2 | D3 | D4 | D5 |
| E1 | E2 | E3 | E4 | E5 |

FIG.41

ALBUM INDEX A-E

| A1 | A11 | A21 | A31 | A41 |
| B1 | B11 | B21 | B31 | B41 |
| C1 | C11 | C21 | C31 | C41 |
| D1 | D11 | D21 | D31 | D41 |
| E1 | E11 | E21 | E31 | E41 |

FIG.42

STILL IMAGE SYSTEM

TECHNICAL FIELD

The present invention relates to a still image system for handling still image data produced by scanning pictures of e.g. a negative film or photograph print or received from a camera, video taperecorder, or monitor.

BACKGROUND ART

Common still image recording methods are known in which still images of objects captured on photographic films by cameras are developed and processed at a photo laboratory shop to yield photo prints.

As the photo prints are increased in number, their holders or albums become bulky and require a considerable size of storage space. Also, their handling will be troublesome. It has thus been requested to introduce new devices for easy storage and management of still images of photographic and other recorded pictures.

It is an object of the present invention, in view of the above aspect, to provide an image recording apparatus, an image recording method, an image playback apparatus, a recording medium, and a management method in the form of a still image system which provides easy storage and management of still image data of photos and other prints.

DISCLOSURE OF THE INVENTION

A playback apparatus according to the present invention is provided for playing back image data stored in a recording medium which has an image file consisting of a plurality of high resolution image files containing high resolution image data and at least one index file containing a predetermined number of low resolution image data produced from the high resolution image data, a management file containing management data for displaying the high resolution image files specified by their respective low resolution image data, and a management data table (data U-TOC) containing location data for identifying the relative recording locations of the image file and the management file on the recording medium on the basis of recording units of the recording medium. In particular, the apparatus comprises: a playback means for retrieving the image file from the recording medium and playing back the image data in the image file; a display means for displaying images of the image data played back by the playback means; and a controller means for retrieving the index file from the recording medium by referring to the management data in the management file and the location data in the management data table and controlling the action of the playback means so that the predetermined number of the low resolution image data in the retrieved index file is displayed on the display means.

The controller means includes a memory means (RAM) for saving data of the management file and management data table and is arranged responsive to the data of the management file and management data table in the memory means for directing the playback means to play back the image file.

Accordingly, the playback apparatus of the present invention allows the predetermined number of the low resolution image data to be read as in the single index file from the recording medium and played back as a whole. Hence, the access to and playback of the low resolution image data will be minimized in time consumption.

The recording means has a multi-level directory structure comprising a directory (PIC_MD) and subdirectories (image directories) provided in a lower level than the directory. The management file comprises a first management file (overall data management file) allocated in the directory and a second management file (image data management file) allocated in each subdirectory. The index file comprises a first index file (overall index file) allocated in the directory and a second index file (image index file) allocated in the subdirectory.

As the first index file holds the low resolution image data of each subdirectory and the second index file holds all the low resolution image data of the directory, various groups of index images can be displayed in multiple levels thus providing ease of the management and selection of the image data.

The controller means is arranged to control the playback means for producing on the display means a first screen display of a specific number of the low resolution image data retained in the first index file with reference to the data of the first management file and the management data table saved in the memory means. Also, the controller directs the playback means to produce on the display means a second screen display of a given number of the low resolution image data retained in the second index file with reference to the data of the second management file and the management data table saved in the memory means.

The first screen display is composed of the specific number of the low resolution image data indicating the subdirectories leveled lower than the directory. The second screen display is composed of the given number of the low resolution image data indicating all the image files in the subdirectories.

As described, the multi-level directory structure comprises the directory and subdirectories for holding the image data. While the directory includes the first management file, the subdirectory holds the second management file to manage the image file on the subdirectory basis, thus allowing the image file in each subdirectory to be played back with much ease.

The management data required for playing back the image file is intensively contained in the management data table. Therefore, retrieval of the image files on the disk will quickly be conducted by accessing the management file and its management data. The number of access actions for retrieving the image file will also be minimized.

The recording medium includes a first area (file extent area) for storing the image file and the management file, and a second area (volume management area) for storing the management data table. The management data table comprises first management blocks (VT, MT) for controlling the second area on the basis of units of management block differentiated from the recording units, and second management blocks (DRB) for controlling the location of the image file in the first area on the basis of the recording units for each directory or subdirectory. The controller means is hence allowed to control the playback means for retrieving the specified high resolution image file through referring to data of the first and second management blocks.

As the recording medium is classified into two areas, the first area for storing the data files including the image and management files, and the second area for storing the management data table, the image file in the first area will be accessed easily and quickly.

In addition, the controller means is arranged to specify a second management block indicative of the directory with reference to the data of the first management blocks, and directs the playback means to retrieve the first index file through referring to data of the second management block indicative of the directory.

Similarly, the controller means is arranged to specify a second management block indicative of the directory with reference to the data of the first management blocks, also specify a second management block indicative of the specified subdirectory with reference to data of the second management block indicative of the directory, and directs the playback means to retrieve the second index file in the subdirectory through referring to data of the second management block indicative of the subdirectory.

The management data in the management file and management data table include no bulky data such as the image data and will be saved in a memory such as a RAM with no difficulty. While the management file and management data table are saved temporarily in the memory, the number of access actions on the optical disk is minimized and the retrieval of the image file will quickly be executed.

Also provided according to the present is a playback method of playing back image data stored in a recording medium. The recording medium has an image file consisting of a plurality of high resolution image files containing high resolution image data and at least one index file containing a predetermined number of low resolution image data produced from the high resolution image data, a management file containing management data for displaying the high resolution image files specified by their respective low resolution image data, and a management data table containing location data for identifying the relative recording locations of the image file and the management file on the recording medium on the basis of recording units of the recording medium. The method of the present invention comprises the steps of: (a) retrieving the index file from the recording medium through referring to the management data of the management file and the location data of the management data table; and (b) playing back the index file retrieved at the step (a) so that the predetermined number of the low resolution image data in the index file is displayed on the display means.

The playback method of the present invention further comprises a step of saving the data of the management file and management data table in a memory means other than the recording medium so that in the step (b), the index file is played back by means of the data of the management file and management data table saved in the memory.

The playback method allows the predetermined number of the low resolution image data to be read as in the single index file from the recording medium and played back as a whole. Hence, the access to and playback of the low resolution image data will be minimized in time consumption.

The playback method of the present invention is characterized in that the recording means has a multi-level directory structure comprising a directory and subdirectories provided in a lower level than the directory, the management file comprises a first management file allocated in the directory and a second management file allocated in each subdirectory, and the index file comprises a first index file allocated in the directory and a second index file allocated in the subdirectory.

As the first index file holds the low resolution image data of each subdirectory and the second index file holds all the low resolution image data of the directory, various groups of index images can be displayed in multiple levels thus providing ease of the management and selection of the image data.

In the playback method, the step (b) includes: producing on the display means a first screen display of a specific number of the low resolution image data retained in the first index file, with reference to the data of the first management file and the management data table saved in the memory means, and producing on the display means a second screen display of a given number of the low resolution image data retained in the second index file, with reference to the data of the second management file and the management data table saved in the memory means.

The first screen display is composed of the specific number of the low resolution image data indicating the subdirectories leveled lower than the directory. The second screen display is composed of the given number of the low resolution image data indicating all the image files in the subdirectories.

As described, the multi-level directory structure comprises the directory and subdirectories for holding the image data. While the directory includes the first management file, the subdirectory holds the second management file to manage the image file on the subdirectory basis, thus allowing the image file in each subdirectory to be played back with much ease.

The management data required for playing back the image file is intensively contained in the management data table. Therefore, retrieval of the image files on the disk will quickly be conducted by accessing the management file and its management data. The number of access actions for retrieving the image file will also be minimized.

The recording medium includes a first area for storing the image file and the management file and a second area for storing the management data table. The management data table comprises first management blocks for controlling the second area on the basis of units of management block differentiated from the recording units, and second management blocks for controlling the location of the image file in the first area on the basis of the recording units for each directory or subdirectory. The playback method further comprises a step (e) of retrieving the high resolution image file specified at the step (d) through referring to data of the first and second management blocks.

In the playback method, a second management block indicative of the directory is specified with reference to the data of the first management blocks, and as in the step (a), retrieving the first index file through referring to data of the second management block indicative of the directory.

Also, the playback method further comprises: specifying a second management block indicative of the directory with reference to the data of the first management blocks; and specifying a second management block indicative of the subdirectory specified at the step (c) with reference to data of the second management block indicative of the directory, and as in the step (a), retrieving the second index file in the subdirectory specified at the step (d) through referring to data of the second management block indicative of the subdirectory.

The management data in the management file and management data table include no bulky data such as the image data and will be saved in a memory such as a RAM with no difficulty. While the management file and management data table are saved temporarily in the memory, the number of access actions on the optical disk is minimized and the retrieval of the image file will quickly be executed.

BRIEF DESCRIPTION OF THE DRAWINGS

FIG. 26 is a diagram explaining a format table in the multi-level directory structure;

FIG. 27 is a diagram explaining an image parameter table in the multi-level directory structure;

FIG. 28(a), FIG. 28(b) are a diagram explaining an overall data management file in the multi-level directory structure;

FIG. 29(a), FIG. 29(b) are a diagram explaining an image data management file in the multi-level directory structure;

FIG. 30(a), FIG. 30(b) are a diagram explaining a print data management file in the multi-level directory structure;

FIG. 32(a), FIG. 32(b) are a diagram explaining an overall index file in the multi-level directory structure;

FIG. 33(a), FIG. 33(b) are a diagram explaining an image index file in the multi-level directory structure;

FIG. 39 is a diagram showing a first index display produced in the still image recording/playback system;

FIG. 40 is a diagram showing a second index display produced in the still image recording/playback system;

FIG. 41 is a diagram showing a third index display produced in the still image recording/playback system;

FIG. 42 is a diagram showing a fourth index display produced in the still image recording/playback system;

BEST MODE FOR CARRYING OUT THE INVENTION

The best modes of an image recording apparatus, an image recording method, an image playback method, a recording medium, and a control method according to the present invention will be described in details referring to the accompanying drawings.

Figure 1:
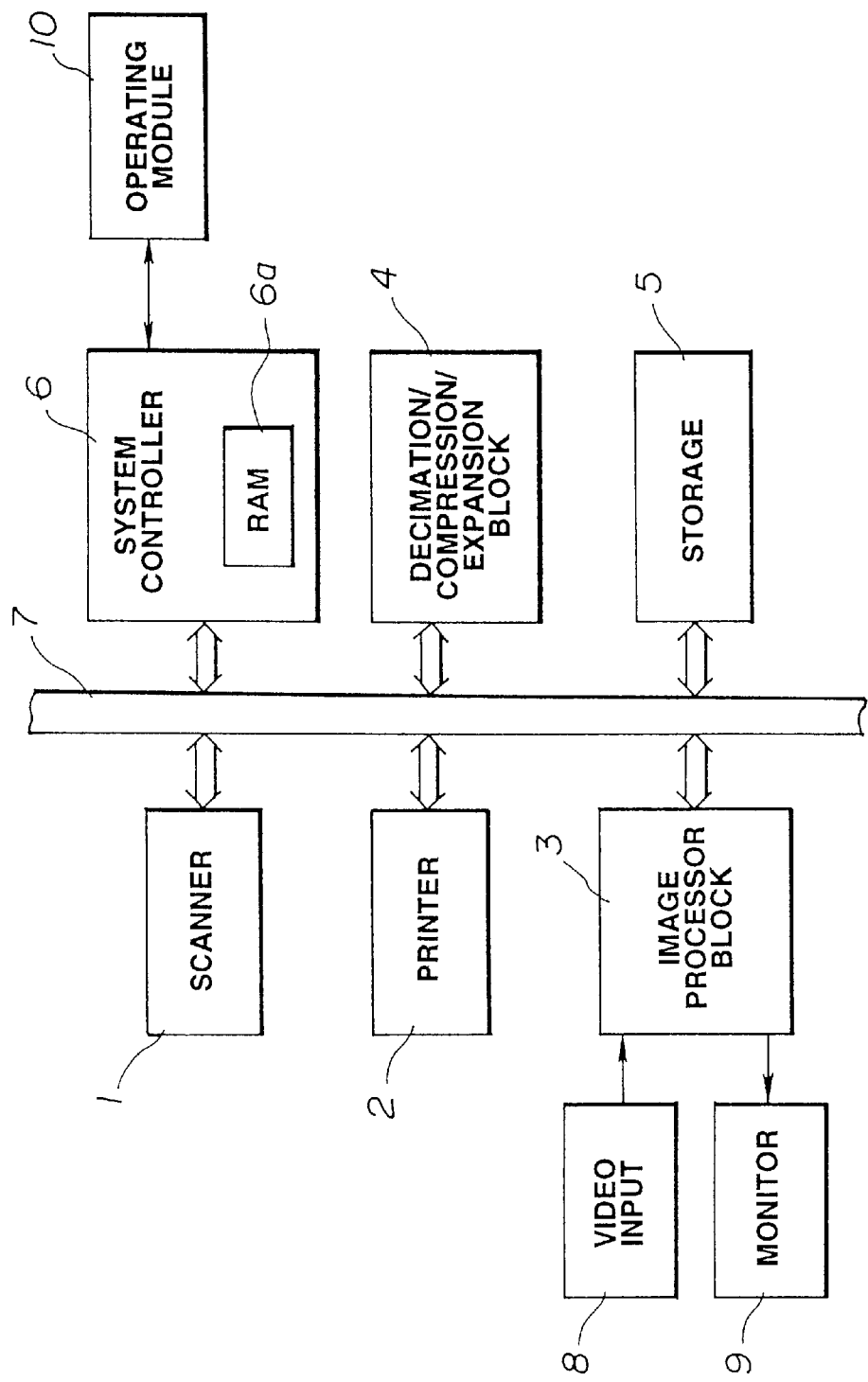
FIG. 1 is a block diagram of a still image recording/playback system for use with the image recording apparatus, image recording method, image playback method, recording medium, and management method according to the present invention.

The image recording apparatus, image recording method, image playback method, recording medium, and control method according to the present invention are applicable in a combination to a still-image recording/playback system shown in FIG. 1.

1. Structure of the Still-image Recording/Playback System

The still-image recording/playback system comprises a scanner 1 for reading data of an image from a photographic film or print, a printer 2 for printing a still image reproduced from the image data scanned or saved in the still-image recording/playback system, and an image processor block 3 for producing a high resolution image data for printing, a medium resolution image data for displaying on a monitor, and a low resolution image data for index display from the image data scanned with the still-image recording/playback system. The image processor block 3 is connected to a video input 8 for loading image data from other video devices including a video taperecorder and a video camera, and to a monitor 9 for display of a still image reproduced from the image data processed by the image processor block 3.

The still-image recording/playback system also includes a decimation/compression/expansion block 4 for subjecting the image data loaded to the still-image recording/playback system to decimation, compression, and expansion processes, a storage 5 for saving and retrieving the image data of different resolution levels on an optical disk (optomagnetic recording disk) provided as a recording medium in the still-image recording/playback system, and a system controller 6 for controlling the entire operation of the still-image recording/playback system. The system controller 6, which will be described later in more details, has a random access memory (RAM) 6a for temporarily saving the image data from the optical disk before storing again in a sequence for playback on the optical disk. The system controller 6 is connected to an operating module 10 for demanding capture, recording, playback, and printing of the image data.

In the still-image recording/playback system, the scanner 1, printer 2, image processor block 3, decimation/compression/expansion block 4, storage 5, and system controller 6 are connected to each other by a bus line 7.

1-1 Structure of the Scanner

Figure 2:
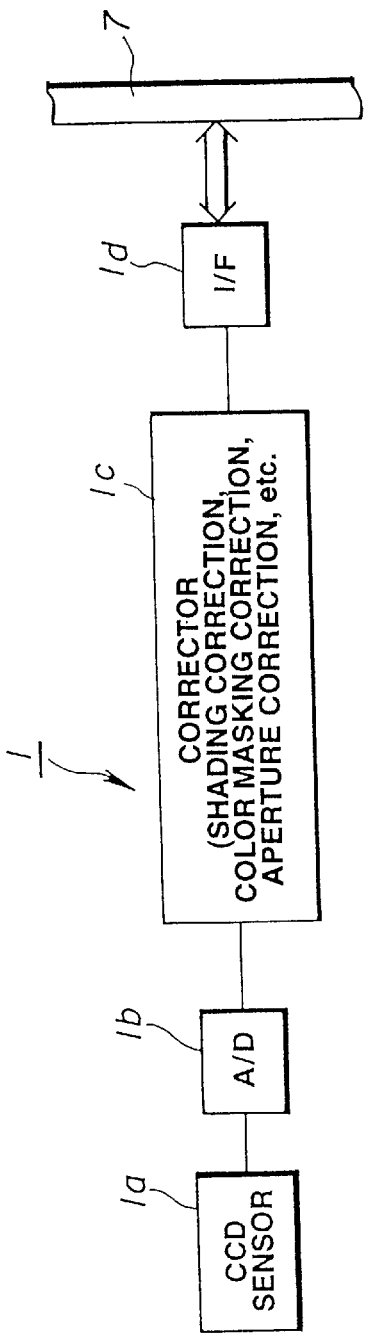
FIG. 2 is a block diagram of a scanner provided in the still image recording/playback system.

The scanner 1 comprises, as shown in FIG. 2, a CCD image sensor 1a for reading a still image of a photographic negative, positive, or print, an A/D converter 1b for converting an analog signal of the still image from the CCD image sensor 1a to a digital form of image data, a correcting device 1c for subjecting the digital image data from the A/D converter to correcting process such as shading or color masking correction, and an interface 1d connected to the bus line 7.

1-2 Structure of the Printer

Figure 3:
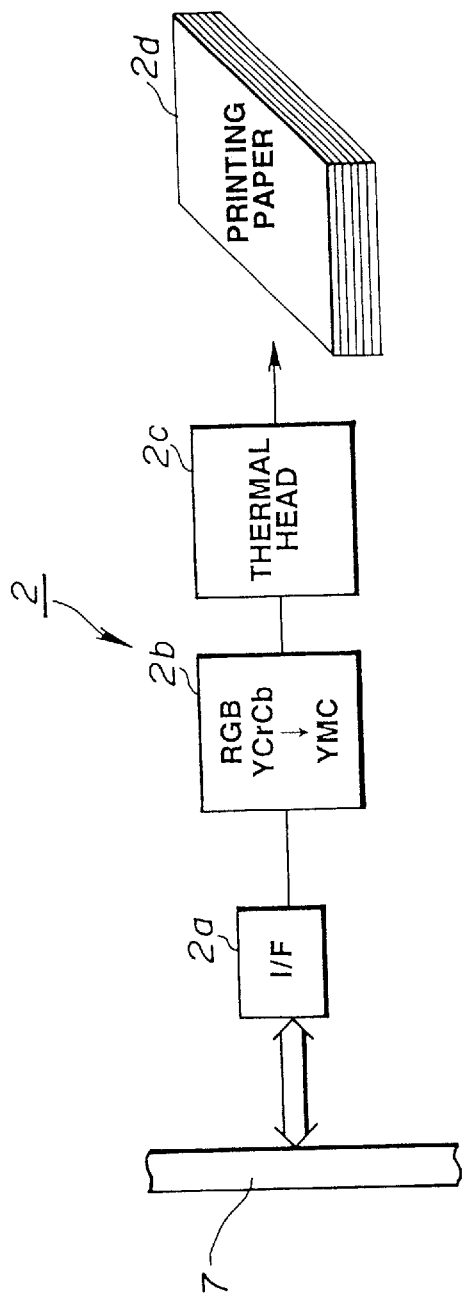
FIG. 3 is a block diagram of a printer provided in the still image recording/playback system.

The printer 2 comprises, as shown in FIG. 3, an interface 2a connected to the bus line 7, a data converter circuit 2b for converting the image data to an appropriate form for printing, and a thermal head 2c responsive to the image data from the data converter circuit 2b for reproducing a still image print on a printing paper 2d.

1-3 Structure of the Image Processor Block

The image processor block 3 comprises a frame memory 11 composed of a main memory 11a for temporarily saving an image data loaded to the still-image recording/playback system and a video memory 11b for temporarily saving an image data fed from the scanner 1 or video input 8, and an image processor circuit 12 for subjecting the image data from the main memory 11a to image processing such as enlargement or reduction. The image processor block 3 also includes a memory controller 13 for controlling the frame memory 11, an image processor controller 14 for controlling the image processing of the image processor circuit 12, and an interface 15 connected to the bus line 7.

The frame memory 11 incorporates an R frame memory for writing and reading a red (R) color component of the image data, a G frame memory for writing and reading a green (G) color component of the image data, and a B frame memory for writing and reading a blue (B) color component of the image data.

Each of the three color frame memories consists of two depthwisely arranged layers of 4 DRAMs (dynamic RAMs), each layer having a storage area of theoretically 1024 pixels×1024 pixels×4 bits for saving 4 megabits in total, and thus can hold 2048×2048×8 bits in 8 DRAMs. The frame memory 11 is composed of the three color frame memories, each saving 2048×2048×8 bits, placed one over the other in an order of e.g. R, G, and B, and thus has a storage size of 2048×2048×24 bits.

1-4 Structure of the Decimation/Compression/Expansion Block

Figure 5:
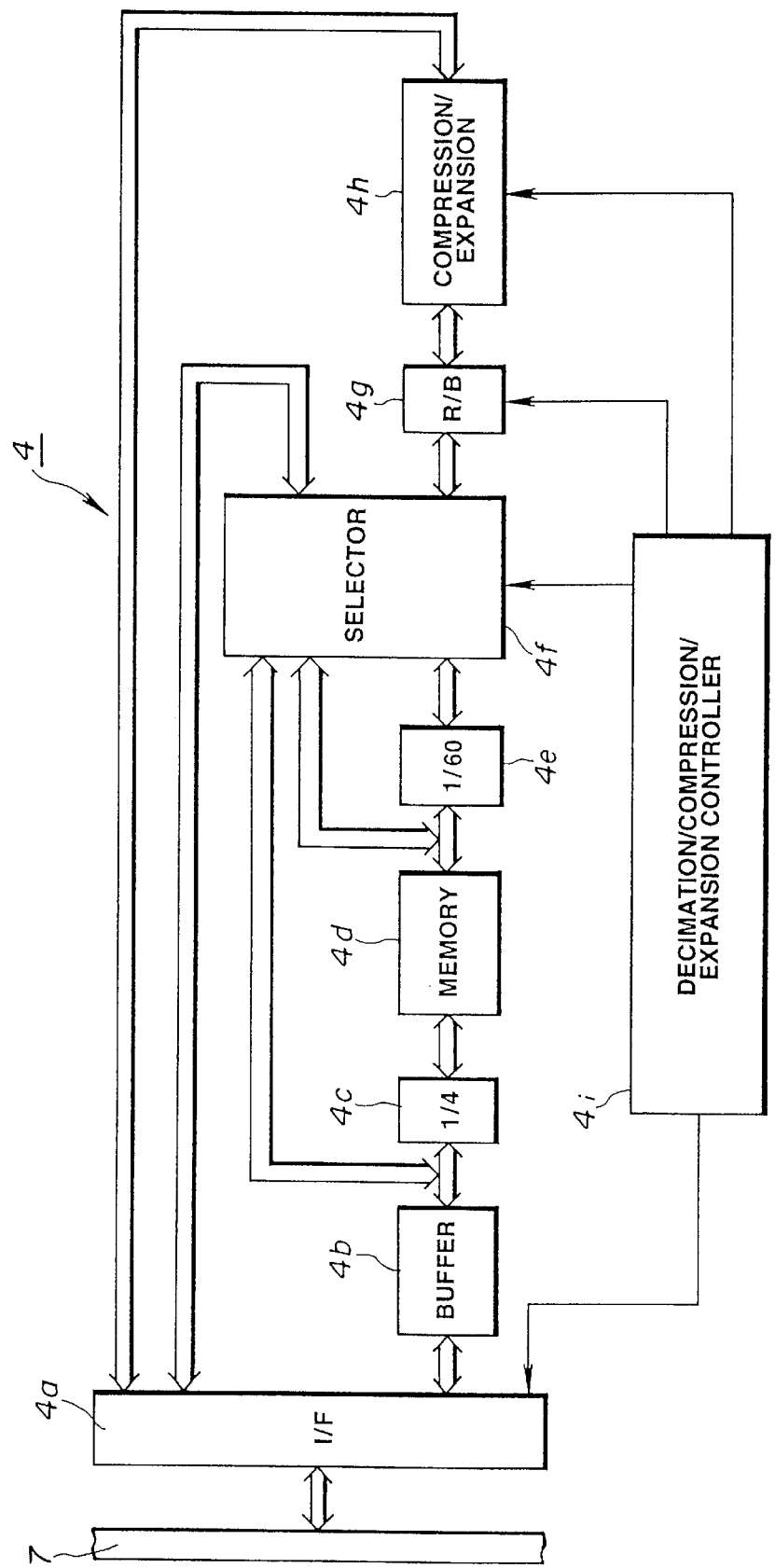
FIG. 5 is a block diagram of a decimation/compression/expansion block provided in the still image recording/playback system.

The decimation/compression/expansion block 4 comprises, as shown in FIG. 5, an interface 4a connected to the bus line 7, a buffer 4b for temporarily saving a high resolution image data fed through the interface 4a, a ¼ decimating circuit 4c for reducing the high resolution image data from the buffer 4b to ¼ to yield a medium resolution image data, and a memory 4d for temporarily saving the medium resolution image data from the ¼ decimating circuit 4c. The block 4 also includes a 1/60 decimating circuit 4e for reducing the medium resolution image data from the memory 4d to 1/60 to yield a low resolution image data, and a selector 4f for selecting and transmitting one of the high resolution image data from the buffer 4b, the medium resolution image data from the ¼ decimating circuit 4c, and the low resolution image data from the 1/60 decimating circuit 4e. It further includes a raster-to-block converter circuit 4g for dividing the image data of each resolution level to from the selector 4f into blocks of a given pixel length for ease of compression, a compression/expansion circuit 4h for fixed-length encoding blocks of the image data from the raster-to-block converter circuit 4g, and a decimation/compression/expansion controller 4i for controlling decimating, compressing, and expanding actions in the decimation/ compression/expansion block 4.

1-5 Structure of the Storage

Figure 6:
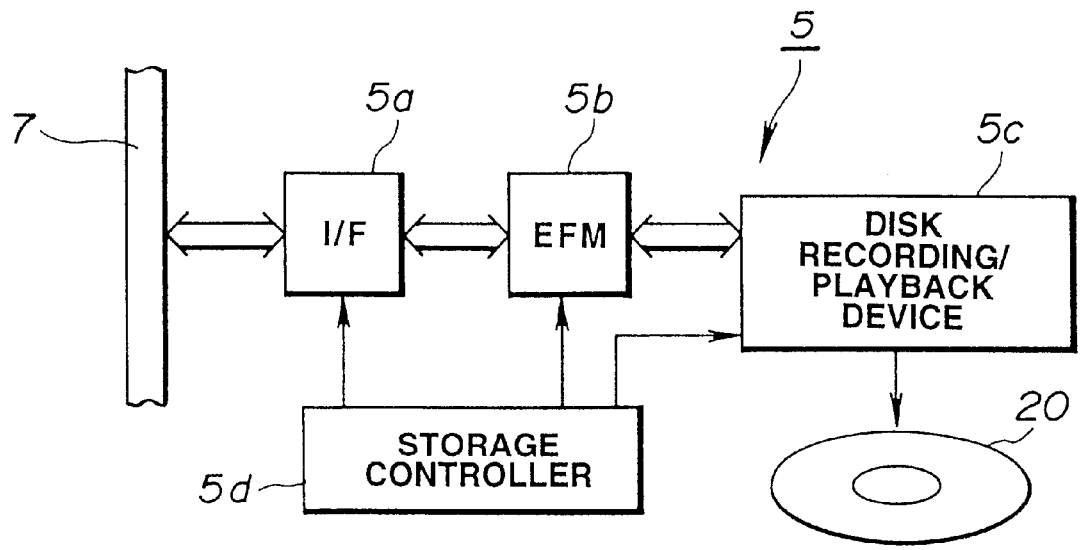
FIG. 6 is a block diagram of a storage provided in the still image recording/playback system.

The storage 5 comprises, as shown in FIG. 6, an interface 5a connected to the bus line 7, an EFM circuit 5b for subjecting the image data of each resolution level from the decimation/compression/expansion block 4 to eight-to-fourteen modulation, a disk recording/playback device 5c for recording and reproducing the image data of the EFM circuit 5b on an optical disk 20, and a storage controller 5d for controlling the entire operation of the storage 5.

1-6 Structure of the Video Input

Figure 7:
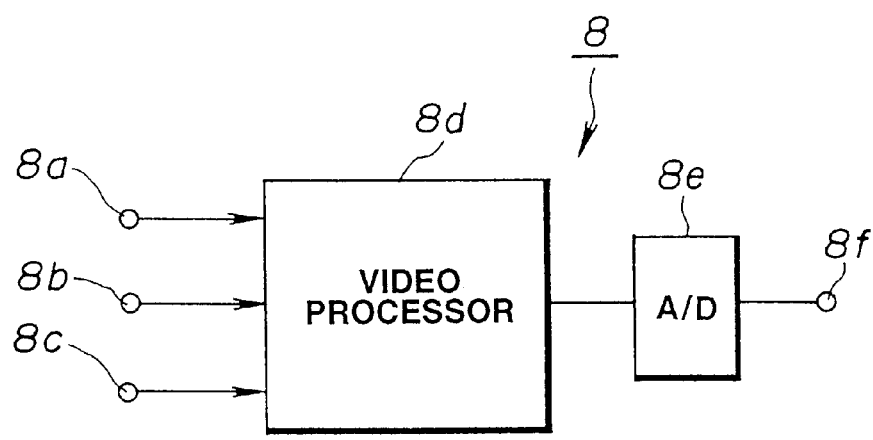
FIG. 7 is a block diagram of a video input provided in the still image recording/playback system.

The video input 8 comprises, as shown in FIG. 7, an input terminal 8a for receiving a composite video signal, an input terminal 8b for receiving two, Y (luminance) and C (chroma), different format video signals, an input terminal 8c for receiving three, R, G, and B, color format video signals, a video processor 8d for converting the video signal of different formats loaded through their respective input terminals 8a to 8c to a mode suited for the still-image recording/playback system, and an A/D converter 8e for converting the video signal of analog mode from the video processor 8d to a digital form of image data.

1-7 Structure of the Operating Module

Figure 8:
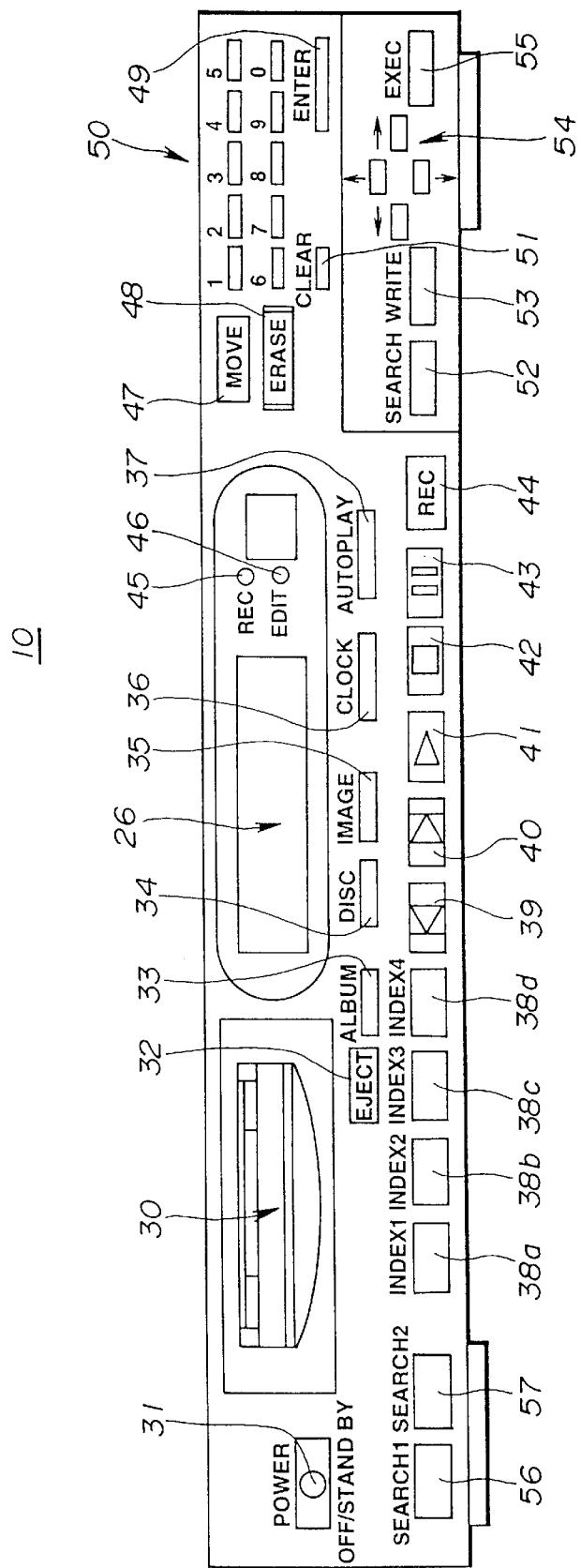
FIG. 8 is an exterior view of an operating module provided in the still image recording/playback system.

The operating module 10 is illustrated at its exterior in FIG. 8 where its front panel has a disk insertion opening 30 and a display 26 with a liquid crystal readout. The operating module 10 also includes a power key 31 for energizing a main power supply in the storage 5, an eject key 32 for demanding unloading of an optical disk 20 through the disk insertion opening 30, and an album key 33 for selecting albums in the disk 20.

There are further provided in the operating module 10 a disk key 34 for instructing display of a disk name, an album name, and so on, an image key 35 for commanding display of an image name, a keyword, a recording date, etc, a clock key 36 for commanding display of current date, time of day, etc, and an auto-play key 37 for giving a command of auto-play action to automatically play back the image data in each album in a sequence of records or a desired order.

There are in the operating module 10 a series of index keys: a first index key 38a for demanding first index display to indicate a full set of, for example, 25 images of the desired album on one screen display, a second index key 38b for demanding second index display to indicate a first one of the images of the album on one screen display, a third index key 38c for demanding third index display to indicate some of the images of the album starting from the first one to a predetermined number on one screen display, and a fourth index key 38d for demanding fourth index display to indicate on one screen display a given number of the images of the album selected every several images.

The operating module 10 includes a first album search key 56 for commanding a first album search display action to display the first image of each album for allowing searching of a desired album, a second album search key 57 for commanding a second album search display action to display a given number, from the first to the given number, of images in each album for allowing searching of a desired album, a return key 39 for demanding playback of an image that precedes the current image, a forward key 40 for demanding playback of an image that follows the current image, a playback key 41 for commanding playback of an image, and a stop key 42 for demanding stop of recording or playback.

Further provided in the operating module 10 are a pause key 43 for pausing the auto-play action, a record key 44 for commanding recording of a target image, a REC indicator 45 for illuminating during the recording, an edit indicator 46 for illuminating during editing mode, and a move key 47 used for moving a particular image to a desired location in either the current or another album.

Still further provided in the operating module 10 are an erase key 48 for commanding erasing of a recorded image, an enter key 49 for demanding entry of a desired key to be moved to a target location in the same album or to another album by means of the move key 47, a ten-key pad 50 for entry of numerals or letters, and a clear key 51 for commanding erasing of a numeral or letter entered through the ten-key pad 50.

As the prescribed keys 31 to 51 are to be manipulated at high frequency, they all are externally disposed on the front panel of the operating module 10.

The operating module 10 also has a search key 52 for commanding searching of a desired image, a write key 53 for demanding recording of attribute data including an album name and an image name, four, up, down, left, and right, scroll keys 54 for access to a desired character, and an EXEC key 55 for executing recording of the character specified with the up, down, left, and right keys 54.

The above keys 52 to 55 are provided for particular use, e.g. saving an album name and an image name, and substantially protected with a front cover which may be opened when action of the keys is requested.

2. Summary of Recording Action

A first recording action of the still-image recording/playback system having the foregoing structure will now be explained.

The action of recording an image data on the optical disk 20 in the storage 5 starts with a user operating the operating module 10 to specify an input station (the scanner 1 or the video input 8) for the image data and also, designated the storage 5 as an output station. This allows the system controller 6 to actuate the scanner 1 or video input 8.

2-1 Description of Action of the Scanner

The scanner 1 is arranged for scanning image data from both reflective and transparent originals. More specifically, the scanner 1 is capable of scanning, for example, E, L, and A6 size prints of the reflective original, and directly 35 mm and Broni size negatives of the transparent original.

The scanner 1 starts scanning with its CCD line sensor 1a shown in FIG. 2 when an original, e.g. a photo, has been placed on its scanning table. The CCD line sensor 1a scans the original and converts its image into a video signal which is then transmitted to the A/D converter 1b. The A/D converter 1b digitalizes the video signal of the CCD line sensor 1a yielding an image data. The image data is transferred to the correction system 1c where it is subjected to correction process for shifting, for example, a 35-mm size to an array of 1200 pixels in vertical by 1700 pixels in horizontal.

The scanner 1 produces 1298 by 975 to 1875 pixels, 1050 by 1450 pixels, 1120 by 1575 pixels, and 1325 by 1825 pixels from a Broni size, an E size, L size, and A6 size of images respectively and delivers them as the image data.

2-2 Description of Action of the Video Input

As shown in FIG. 7, the video input 8 is arranged to receive three different format signals from e.g. a video taperecorder: composite video signals, Y/C separate video signals (for luminance and chrominance), and R, B, and G color component video signals. The video signals are fed through their respective input terminals 8a, 8b, and 8c to the video processor 8d.

The video processor 8d converts the video signal of each format to a matrix of pixels, 480×640, which is then transmitted to the A/D converter 8e. The A/D converter 8e digitalizes the video signal of pixels to yield an image data of the format which is released from the output terminal 8f.

2-3 Description of Action of the Image Processor Block

The image data produced in the scanner 1 or video input 2 is a high resolution image data comprising, for example, 1024 pixels in vertical by 1536 pixels in horizontal and supplied through the input terminal 18 to the video memory 11b of the frame memory 3.

Upon the high resolution image data being received by the video memory 11b, the memory controller 13 carries out write and read control actions for temporarily saving and reading the image data on the video memory 11b. The high resolution image data when read out is transferred through the data line 17, interface 15, bus line 7, and data line 16 to the decimation/compression/expansion block 4 and also, imparted to the main memory 11a. The memory controller 13 performs a write control action on the main memory 11a for temporarily saving the high resolution image data received.

After the high resolution image data is saved in the main memory 11a, the image processing controller 14 directs the image processor circuit 12 and the memory controller 13 to shift the high resolution image data to a medium resolution image data of e.g. 480×640 pixels for display on the monitor. In response, the memory controller 13 carries out a read control action for reading the high resolution image data from the main memory 11a and transmits it to the image processor circuit 12. The image processor circuit 12 then converts the high resolution image data to the medium resolution image data which is transferred through the data line 16, interface 15, bus line 7, and data line 17 to the video memory 11b. Upon the medium resolution image data being received by the video memory 11b, the memory controller 13 carries out write and read control actions for temporarily saving and reading the image data on the video memory 11b. As the result, the medium resolution image data is retrieved from the video memory 11b and transferred through the output terminal 19 to the monitor 9 shown in FIG. 1.

The medium resolution image data supplied to the monitor 6 is an analog video signal with a medium resolution processed by the D/A converter for display. The image data loaded through the scanner 1 or video input 8 is now displayed on the monitor 9.

Figure 4:
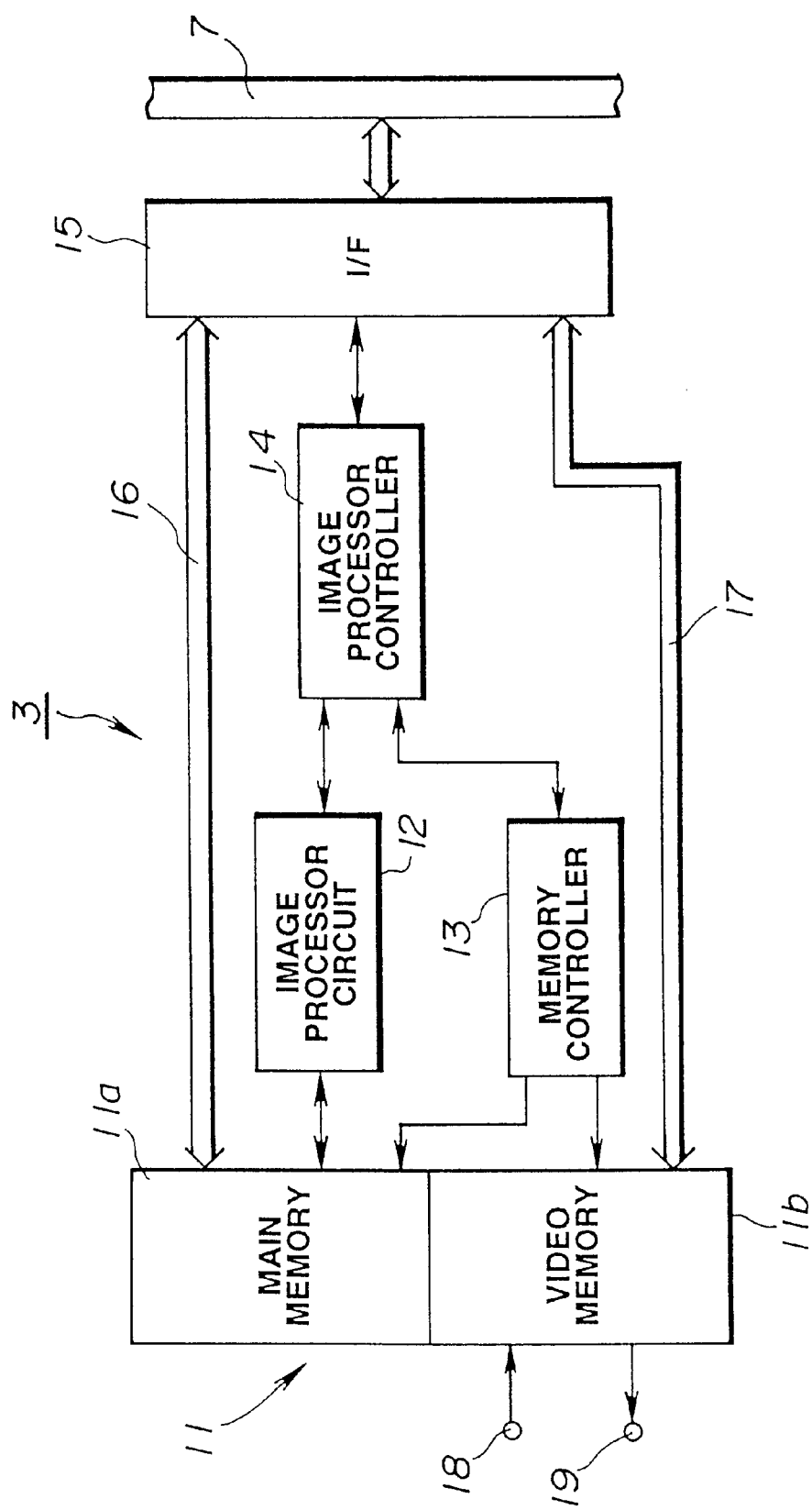
FIG. 4 is a block diagram of an image processor block provided in the still image recording/playback system.

When image processing such as enlargement or reduction of the image data loaded through the scanner 1 or video input 8 is requested by the action of the operating module 10, the image processor controller 14 shown in FIG. 4 directs the image processor circuit 12 to subject the image data read from the main memory 11a to the image processing. The image data subjected to the image processing in the image processor circuit 12 is then transmitted to the monitor 9. Accordingly, the processed image data from the image processor circuit 12 is displayed on the monitor 9. Also, the image processor controller 14 sends details (image processing information) of the image processing to which the image data has been subjected through the interface 15 and bus line 7 to the decimation/compression/expansion block 4.

2-4 Description of Action of the Decimation/Compression/Expansion Block

It is then examined by the user whether the image data in processing is a desired one or not through viewing its representation displayed on the monitor 9. When it is judged right, recording of the image data displayed on the monitor 9 is conducted by hitting the record key 44 of the operating module 10 shown in FIG. 8.

The system controller 6 shown in FIG. 1 is responsive to the actuation of the record key 44 for examining if the data or image processing information is available. If the image processing information is available, it is transmitted through the bus line 7 and interface 4a to the decimation/compression/expansion controller 4i of the decimation/compression/expansion block 4 shown in FIG. 5.

The decimation/compression/expansion controller 4i actuates the interface 4a for saving the image processing information temporarily and retrieving the high resolution image data. The high resolution image data is then fed to the interface 4a of the decimation/compression/expansion block 4 and saved in the buffer 4b temporarily. The decimation/compression/expansion controller 4i carries out a read control action over the buffer 4b for transmitting the high resolution image data, for example, line by line to both the ¼ decimation circuit 4c and the selector 4f.

The ¼ decimation circuit 4c decimates pixels of the high resolution image data to ¼ yielding a medium resolution image data of 480×640 pixels which is then transferred to the memory 4d. Upon the medium resolution image data being received by the memory 4d, the decimation/compression/expansion controller 4i performs a read control action on the memory 4d for retrieving the medium resolution image data. The medium resolution image data retrieved from the memory 4d is transmitted to both the 1/60 decimation circuit 4e and the selector 4f.

The 1/60 decimation circuit 4e decimates pixels of the medium resolution image data from the memory 4d to 1/60 yielding a low resolution image data of 60×80 pixels (for indexing) which is also transferred to the selector 4f.

The selector 4f is controlled by the decimation/compression/expansion controller 4i for selection. More particularly, the decimation/compression/expansion controller 4i performs a selection control action on the selector 4f for delivering the high resolution image data, the medium resolution image data, and the low resolution image data in this order. The image data of different resolution levels are transmitted to the raster-to-block converter circuit 4g.

The raster-to-block converter circuit 4g divides the image data into blocks, e.g. a block of 8×8 pixels, which are units for compression encoding and transfers them to the compression/expansion circuit 4h.

As the image data is grouped by the raster-to-block circuit 4g into the 8×8 blocks, its low resolution level is based on 60×80 pixels of an image size. The 60×80 pixel size of the low resolution image data is not divided by 8 in its vertical direction and thus unfavorable to be subjected to grouping into the 8×8 blocks. For compensation, the raster-to-block converter circuit 4g adds a dummy data of 4×80 pixels to an upper or lower region of the low resolution image data for converting 60×80 to 64×80 of the pixel size. Since the 64×80 pixels of the low resolution data can clearly be divided in the vertical direction by 8, they are grouped into 8 blocks by 10 blocks which are then transmitted to the compression/expansion circuit 4h. The dummy data is removed during display of the indexing data and its resultant image (e.g. a black or white image) will never be displayed in addition to the index image.

The compression/expansion circuit 4h comprises a discrete cosine transform (DCT) circuit, a quantizing circuit, and a fixed length encoding circuit. The image data of each resolution level is first fed to the DCT circuit.

The DCT circuit operates an orthogonal transformation of the image data of each resolution level in which data is converted an the frequency axis to produce DCT coefficients. After subjected to the orthogonal transformation, the image is transferred to the quantizing circuit.

In the quantizing circuit, the image data of each resolution level is quantized with a given quantizing coefficient determined by the system controller 6 and transferred to the fixed length encoding circuit.

The fixed length encoding circuit subjects the image data of each resolution level quantized by the quantizing circuit to a fixed length encoding with the DCT coefficients and feeds back its resultant fixed length coded data to the decimation/compression/expansion controller 4i. The decimation/compression/expansion controller 4i is responsive to the fixed length coded data for calculating an optimum quantizing coefficient suited for quantizing the image data in the quantizing circuit. Using the optimum quantizing coefficient received from the decimation/compression/expansion controller 4i, the quantizing circuit repeats the quantizing of the image data and transmits its resultant data to the fixed length encoding circuit where the image data of each resolution level is fixed length encoded to a string of fixed length codes.

In other words, the foregoing compression encoding process converts the image data of the medium resolution to a fixed length code form based on two clusters, one cluster being considered as a unit for recording, the image data of the high resolution to a fixed length code form based on eight clusters, and the image data of the low resolution to a fixed length code form based on 1/15 the cluster. The fixed length code form of the image data of each resolution level is then transmitted through the interface 4a and the bus line 7 to the storage 5 shown in FIG. 6. When the image data is accompanied with its image processing information, the decimation/compression/expansion controller 4i transfers the image processing information as well as the image data to the storage 5.

2-5 Description of Action of the Storage

The image data of each resolution level along with its processing information from the decimation/compression/expansion block 4 are supplied to the interface 5a shown in FIG. 6. Upon the image data of each resolution level and its processing information being received by the interface 5a, the storage controller 5d activates the interface 5a for loading the image data of each resolution level and its processing information in the storage 5. The data of each resolution level and its processing information loaded through the interface 5a to the storage 5 are then fed to the EFM circuit 5b. Upon the image data of each resolution level and its processing information being received by the EFM circuit 5b, the storage controller 5d activates the EFM circuit 5b for EFM (eight-to-fourteen) modulating the fixed-length code form of the image data of each resolution level and its processing information. The EFM modulated image data of each resolution level and processing information are transferred to the disk recording/playback device 5c. Upon the image data of each resolution level and its processing information being received by the disk recording/playback device 5c, the storage controller 5d activates the disk recording/playback device 5c for recording the image data of each resolution level and its processing information on to the optical disk 20. As the result, the image data of each resolution level and its processing information are stored on the optical disk 20.

More specifically, the optical disk 20 may be an opto-magnetic disk of 64 mm in diameter having a recording area for saving 200 frames of the image data of each resolution level. It is assumed that one album consists of 50 frames out of the 200 image data and the disk 20 holds four albums of the image data. This allows the user to select a desired album for recording by controlling the operating module 10 in case of recording the image data. Accordingly, the system controller 6 directs the storage controller 5d to activate the disk recording/playback device 5c for recording the different resolution levels of the image data in a sequence of the loading to the storage 5 on the album area selected by the user.

At the time, the image data of the low resolution level is stored as index files for displaying a desired group of images in one single screen. The image data of the medium resolution level is stored as medium resolution image files which are displayed on one-image-in-one-screen basis. The image data of the high resolution level is stored as high resolution image files for printing the image data on printing sheets.

3. Description of First Recording Procedure

The recording action will be explained in more details as is separated into three sections, first to third. The first recording procedure is illustrated in a flowchart of FIG. 9.

Figure 9:
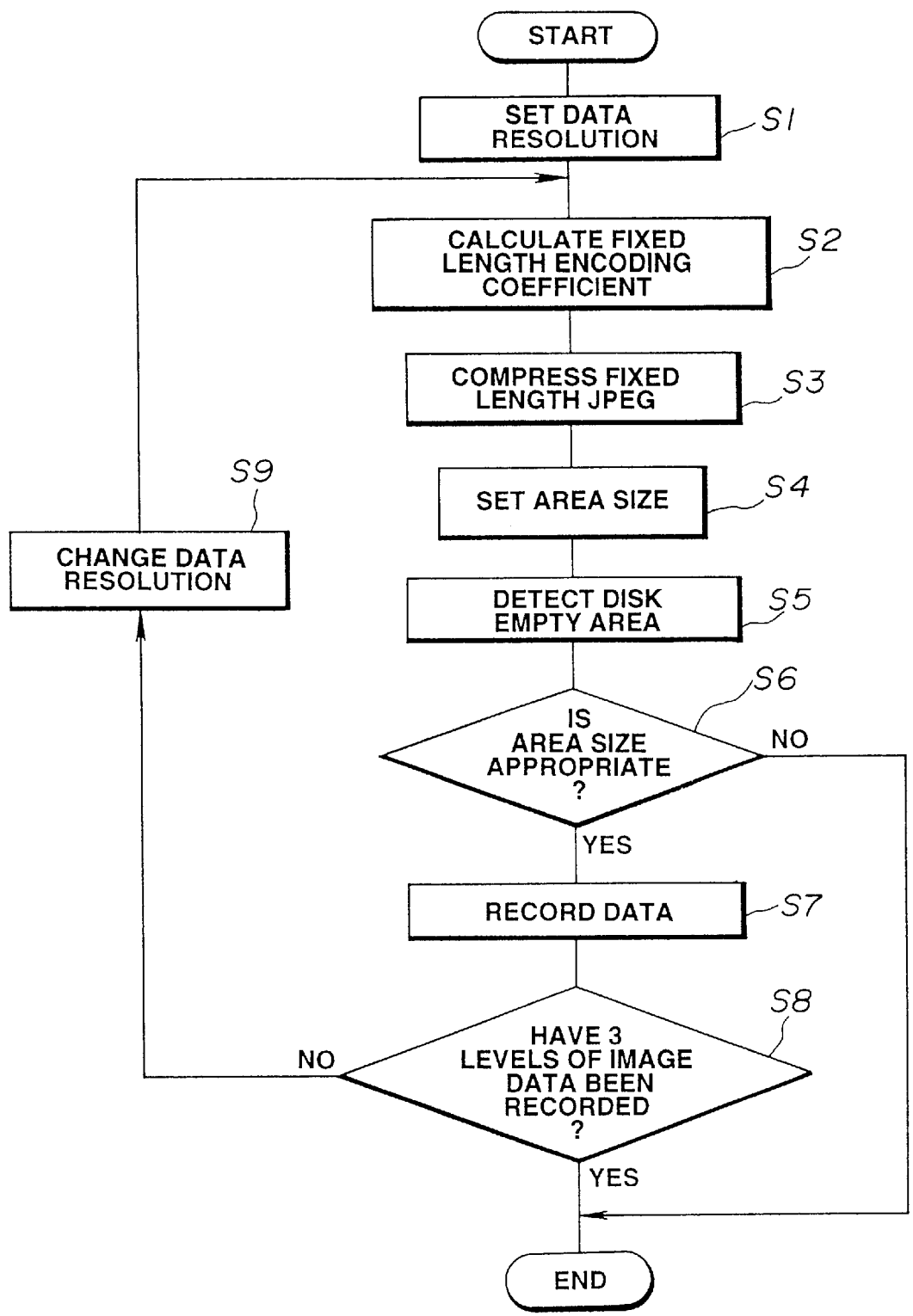
FIG. 9 is a flow chart explaining a first recording action of the still image recording/playback system.

As shown in the flowchart of FIG. 9, the procedure starts with the system controller 6 detecting a command of recording the imaged data given by the user and goes to Step S1.

At Step S1, the system controller 6 directs the decimation/compression/expansion controller 4i to activate the selector 4f for selecting the high resolution image data. The procedure then moves to Step S2.

At Step S2, the system controller 6 allows the decimation/compression/expansion controller 4i to calculate and impart a quantizing coefficient to the compression/expansion circuit 4h for quantization. This is followed by Step S3.

At Step S3, the system controller 6 directs the decimation/compression/expansion controller 4i to activate the compression/expansion circuit 4h for fixed length encoding the high resolution image data to yield a fixed length code form of which unit length equals to 8 clusters. The procedure then advances to Step S4.

At Step S4, the system controller 6 allows the decimation/compression/expansion controller 4i to determine an area size (1024×1536 pixels of the 8 clusters) for the high resolution image data to be recorded. This is followed by Step S5.

At Step S5, the system controller 6 produces a search command for searching a recording area required for storing 8 clusters of the high resolution image data and transmits it to the storage controller 5d of the storage 5. In response to the search command, the storage controller 5d directs the disk recording/playback device 5c to search an available recording area for the 8 clusters. When the available recording area is present, the system controller 6 sends a signal indicative of the presence to the decimation/compression/expansion circuit 4i. If the available recording area is not present, the system controller 6 sends a signal indicative of the absence to the decimation/compression/expansion circuit 4i. Step S6 then follows.

At Step S6, it is examined by the system controller 6 in response to the signal from the storage controller 5d whether the area of saving 8 clusters is present or not on the optical disk 20. If not, the procedure shown in FIG. 9 is terminated. When it is judged yes, the procedure advances to Step S7. As the procedure of FIG. 9 ends up with the available recording area being not found, the storage controller 5d produces a signal indicative of the absence of the recording area and feeds it to the system controller 6 which in turn directs the display 26 of the operating module 10 to indicate a message, e.g. "There is no area for storing the data." This allows the user to conduct a proper action of replacing the optical disk 20 to a new one or the like.

At Step S7, the system controller 6 causes the storage controller 5d to load the high resolution image data to the disk recording/playback device 5c. The storage controller 5d then directs the disk recording/playback device 5c to record the high resolution image data as a high resolution image file on the optical disk 20. This is followed by Step S8.

At Step S8, the system controller 6 directs the decimation/compression/expansion controller 4i to examine whether or not the image data of all the three, high, medium, and low, different resolution levels have been recorded. When it is judged yes, the procedure is terminated. If not, the procedure goes to Step S9.

By now, the high resolution image data only has been recorded allowing Step S8 to judge not, and the procedure moves to Step S9.

At Step S9, the system controller 6 directs the decimation/compression/expansion controller 4i to activate the selector 4f for selecting the medium resolution image data. Then, the procedure goes back to Step S2.

At Step S2, the system controller 6 allows the decimation/compression/expansion controller 4i to calculate a quantizing coefficient for fixed length encoding to a two-cluster code form. This is followed by Step S3 where the image data is subjected to the fixed length encoding with the quantizing coefficient determined at Step S2 to yield a two-cluster fixed length code form of the medium resolution image data. Then, at Steps S4 to S7, an available recording area is searched and used for recording the two-cluster medium resolution image data.

The recording of the image data of both the high and medium resolution levels is now completed. As it is judged not at Step S8, the procedure moves to Step S9.

At Step S9, the system controller 6 again directs the decimation/compression/expansion controller 4i to activate the selector 4f for selecting the low resolution image data. Then, the procedure goes back to Step S2.

At Step S2, the system controller 6 allows the decimation/compression/expansion controller 4i to calculate a quantizing coefficient for fixed length encoding to a 1/15-cluster code form. This is followed by Step S3 where the image data is subjected to the fixed length encoding with the quantizing coefficient determined at Step S2 to yield a 1/15-cluster fixed length code form of the low resolution image data. Then, at Steps S4 to S7, an available recording area is searched and used for recording the 1/15-cluster low resolution image data.

Now, the recording of the image data of all the high, medium, and low resolution levels is completed. As it is judged yes at Step S8, the procedure ends up.

As the medium and low resolution image data are produced from the high resolution image data saved in the frame memory 11, the different resolution levels of the image data are recorded on the optical disk 20. For playback, a desired resolution level of the image data suited for the application can be selected and reproduced.

In case that the high resolution image data is only recorded on the optical disk 20, it contains too many amounts of data to be displayed on the monitor and has to be subjected to a decimation process before transmitted to the monitor. According to the embodiment, the three different resolution levels of the image data have been recorded and when requested, the medium resolution image data suited for display on the monitor is readily retrieved thus decreasing the time for feeding the image data to the monitor for display.

Since a desired resolution level of the image data is directly retrieved from the disk, its decimation process is unnecessary and a relevant decimation circuit will be eliminated depending on a type of device.

The two lower resolution levels are created from the high resolution image data saved in the frame memory 11, whereby the loading of the image data of the three different resolution levels is minimized in length of time as compared with loading each resolution level of the image data. Also, the frame memory 11 is activated for retrieval of the image data only one time and will be shortened in the duration of its involvement.

As the different resolution levels of the image data are stored in the form of fixed length code, their recording and playback time is defined and also, the number of frames of the image data is specified. This allows the entire data size to be clarified and a relevant file control system will be simplified in construction.

If the different resolution levels of the image data are recorded at random in available recording areas of the optical disk 20, their storage states are messy. In practice, the storage 5 is arranged having a minimum recording unit of one cluster (64 Kbyte), a data recording speed of 150 Kbyte, a recording time for one cluster 64 K/150 K=0.43 sec, and a maximum seek time of 0.5 sec. The maximum seek time is greater than the recording time for one cluster. Hence, the random storage of the different resolution levels of the image data on the optical disk 20 results in increase of the recording and playback time because each resolution level has to be sought multiple times during the recording or playback.

Also, the different resolution levels of the image data stored at random leave their respective sizes of vacant recording area after they are removed for erasing or editing. The vacant recording areas of different sizes will thus be identified with much difficulty.

4. Description of Second Recording Procedure

In view of the above predicaments, a second recording procedure is provided for allowing the different resolution levels of the image data to be sorted and recorded in their respective recording areas of the optical disk 20.

Figure 10:
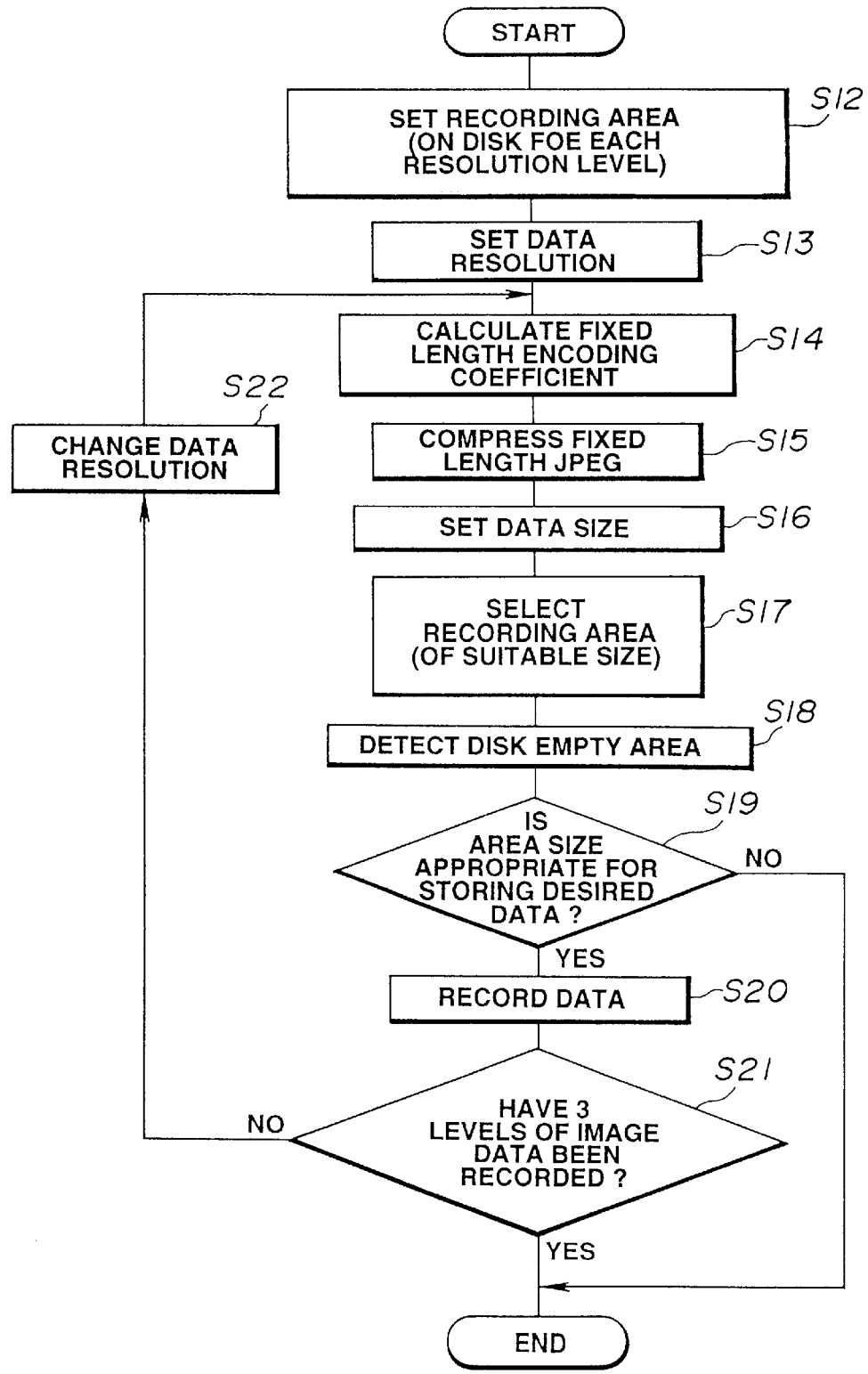
FIG. 10 is a flow chart explaining a second recording action of the still image recording/playback system.
Figure 11:
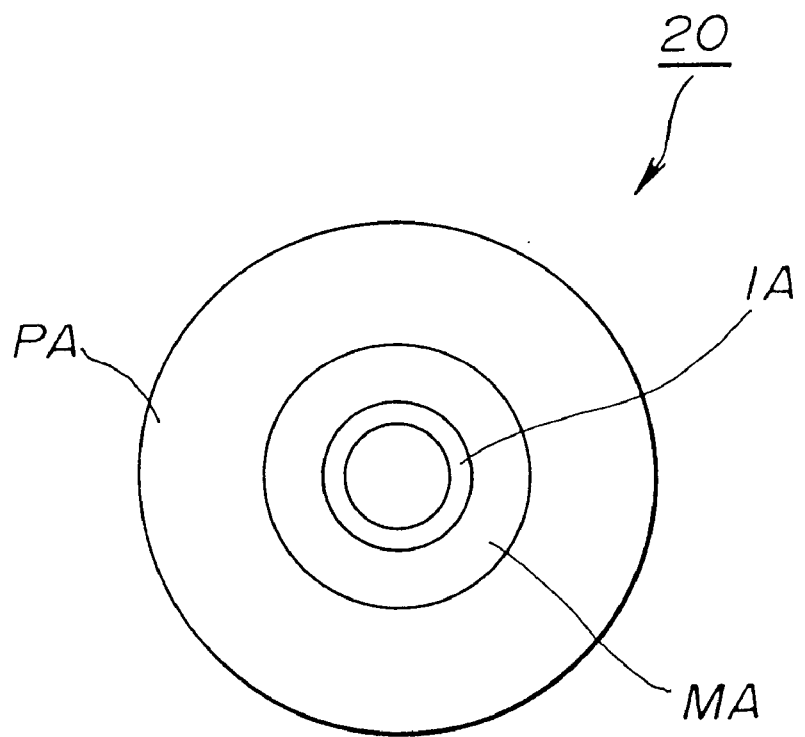
FIG. 11 is a schematic diagram showing recording areas for image data of different resolution levels specified on an optical disk by the second recording action.

The second recording procedure is shown in a flowchart of FIG. 10 which starts with the system controller 6 receiving a command of recording image data from the user. The procedure then proceeds to Step S12. It is assumed that the entire recording area of the optical disk 20 equals to 2200 clusters. At Step S12, the system controller 6 directs the storage controller 5d to divide the recording area of the optical disk 20 into three segments, from inner side to outer, a low resolution image data recording area IA for 32 clusters, a medium resolution image data recording area MA for 200 clusters, and a high resolution image data recording area PA for 1800 clusters, as shown in FIG. 11. After the three recording areas IA, MA, and PA are confirmed, the procedure goes to Step S13. From now on, the storage controller 5d controls the action of the disk recording/playback device 5c with respect to the three recording areas IA, MA, and PA.

At Step S13, the system controller 6 directs the decimation/compression/expansion controller 4i to activate the selector 4f for selecting the high resolution image data. This is followed by Step S14.

At Step S14, the system controller 6 allows the decimation/compression/expansion controller 4i to calculate and impart a quantizing coefficient to the compression/expansion circuit 4h for quantization. This is followed by Step S15.

At Step S15, the system controller 6 directs the decimation/compression/expansion controller 4i to activate the compression/expansion circuit 4h for carrying out a fixed length encoding so that the high resolution image data is turned to an 8-cluster fixed length code form. The procedure then advances to Step S16.

At Step S16, the system controller 6 allows the storage controller 5d to register 8 clusters of data size to the disk recording/playback device 5c. Then, Step S17 follows.

At Step S17, the system controller 6 directs the storage controller 5d to assign the disk recording/playback device 5c to the high resolution image data recording area PA. This is followed by Step S18.

At Step S18, the system controller 6 directs the storage controller 5d to activate the disk recording/playback device 5c for searching an available recording area on the optical disk 20 with reference to the data size and the high resolution image data recording area. This is followed by Step S19.

At Step S19, the system controller 6 directs the storage controller 5d to examine whether or not the available recording area found at Step S18 is large enough to store the 8 clusters of the high resolution image data. If not, the procedure is terminated. When it is judged yes, the procedure goes to Step S20. As the procedure of FIG. 10 ends up with the available recording area being not found, the storage controller 5d produces a signal indicative of the absence of the recording area and feeds it to the system controller 6 which in turn directs the display 26 of the operating module 10 to indicate a message, e.g. "There is no area for storing the data." This allows the user to conduct a proper action of replacing the optical disk 20 to a new one or the like.

At Step S20, the system controller 6 causes the storage controller 5d to activate the disk recording/playback device 5c for recording the 8 clusters of the high resolution image data in the available recording area on the optical disk 20 specified at Steps S18 and S19. Then, Step S21 follows.

At Step S21, the system controller 6 directs the storage controller 5d to examine whether all the three, high, medium, and low, different resolution levels of the image data have been recorded or not. When it is judged yes, the procedure is terminated. If not, the procedure goes to Step S22.

By now, the high resolution image data only has been recorded allowing Step S21 to judge it is not, and the procedure moves to Step S22.

At Step S22, the system controller 6 directs the decimation/compression/expansion controller 4i to activate the selector 4f for selecting the medium resolution image data. Then, the procedure goes back to Step S14.

At Step S14, the system controller 6 calculates a quantizing coefficient for fixed length encoding to yield a two-cluster code form. This is followed by Step S15 where the high resolution image data is subjected to the fixed length encoding with the quantizing coefficient determined at Step S14 to yield a two-cluster fixed length code form of the medium resolution image data. Then, at Steps S16 to S20, the data size and the recording area MP for the medium resolution image data are registered and an available recording area is searched and used for recording the two-cluster medium resolution image data.

So far, the high and medium resolution levels of the image data have been recorded allowing Step S21 to judge it is not completed, and the procedure moves to Step S22.

At Step S22, the system controller 6 directs the decimation/compression/expansion controller 4i to activate the selector 4f for selecting the low resolution image data. Then, the procedure goes back to Step S14.

At Step S14, a quantizing coefficient is calculated which is employed for fixed length encoding to yield a $1/15$-cluster code form. This is followed by Step S15 where the high resolution image data is subjected to the fixed length encoding with the quantizing coefficient determined at Step S14 to yield a $1/15$-cluster fixed length code form of the low resolution image data. Then, at Steps S16 to S20, the data size and the recording area IP for the low resolution image data are registered and an available recording area is searched and used for recording the $1/15$-cluster medium resolution image data.

The recording of all the different resolution levels of the image data is now completed. Hence, it is judged yes at Step S21 and the procedure is terminated.

As described, the entire recording area on the optical disk 20 is divided into the three different areas IA, MA, and PA for storing their respective resolution levels of the fixed length coded image data. As the different resolution level image data recording areas are accessed respectively with ease, the duration of recording and playback actions will be reduced.

In case that different sizes of the available recording area are left at random due to erasing or editing of the image data, they are readily identified and used for storing their respective resolution levels of the image data. Hence, the searching of the available recording areas will be simplified thus contributing to the reduction of the recording time.

However, while frames of the image data of each resolution level are not aligned in the order of playback as stored in its corresponding recording area, their retrieval may take a considerable length of time particularly in the auto-play mode for reading a succession of the frames automatically and continuously or a browsing mode for reading frames of the image data at a higher speed than that of the auto-play mode.

5. Description of Third Recording Procedure

A third recording procedure is provided for allowing the image data of each resolution level to be recorded in its corresponding recording area of the optical disk 20 in the order of loading.

Figure 12:
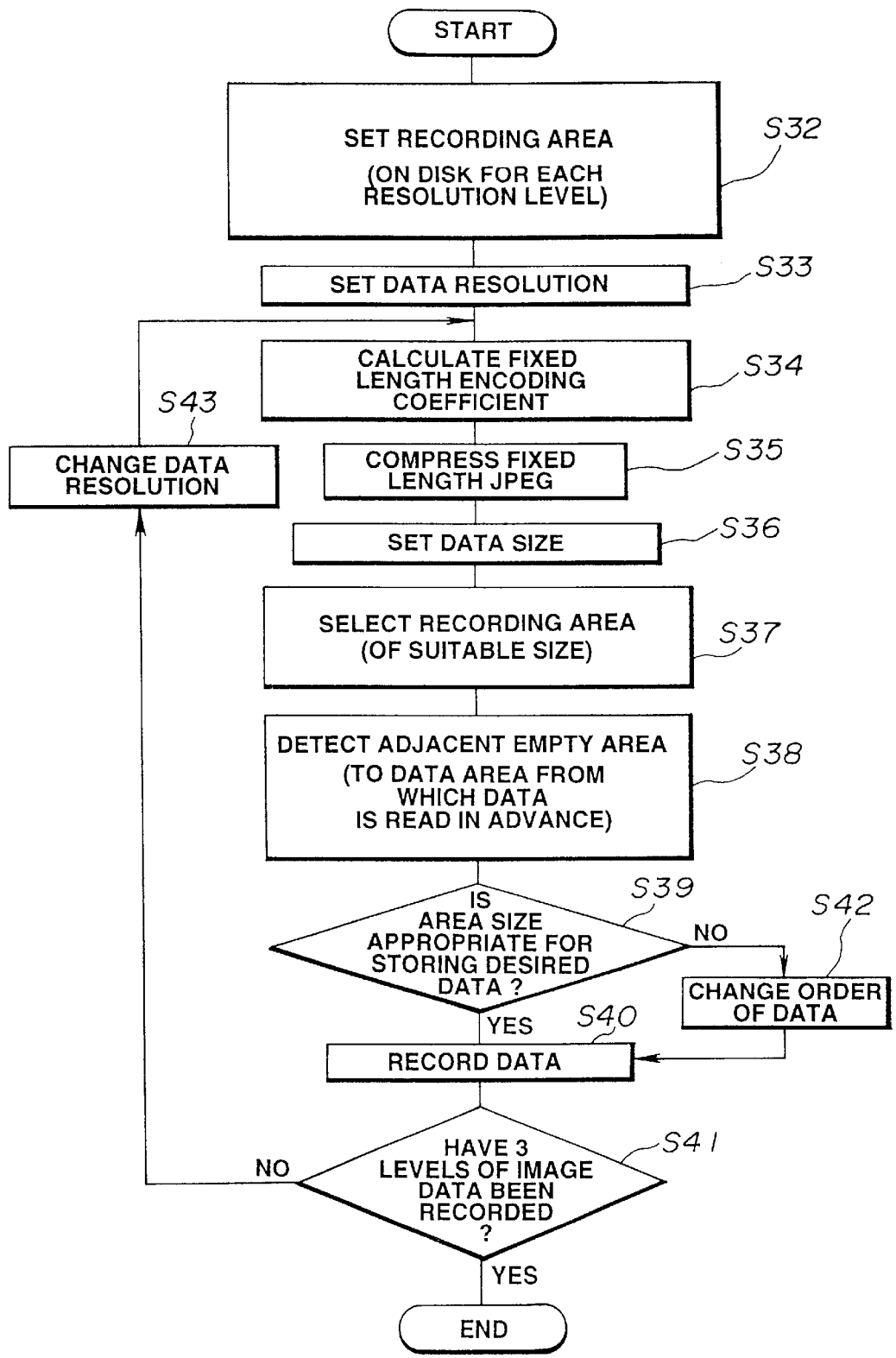
FIG. 12 is a flow chart explaining a third recording action of the still image recording/playback system.

The third recording procedure is shown in a flowchart of FIG. 12. The flowchart shown in FIG. 12 starts with the storage controller 5d of the storage 5 receiving a command of recording image data from the user. The procedure then goes to Step S32.

At Step S32, the system controller 6 directs the storage controller 5d to divide the entire recording area of the optical disk 20 into three different recording areas, from inner side to outer, a lower resolution image recording area IA for 14 clusters, a medium resolution image recording area MA for 200 clusters, and a high resolution image recording area PA for 1800 clusters, as shown in FIG. 11. After the three different recording areas IA, MA, and PA are confirmed, the procedure moves to Step S33.

At Step S33, the system controller 6 causes the decimation/compression/expansion controller 4i to activate the selector 4f for selecting the high resolution image data. This is followed by Step S34.

At Step S34, the system controller 6 directs the decimation/compression/expansion controller 4i to determine and impart a quantizing coefficient to the compression/expansion circuit 4h for quantization. Then, Step S35 follows.

At Step S35, the system controller 6 directs the decimation/compression/expansion controller 4i to activate the compression/expansion circuit 4h for carrying out a fixed length encoding so that the high resolution image data is turned to an 8-cluster fixed length code form. This is followed by Step S36.

At Step S36, the system controller 6 directs the storage controller 5d to register 8 clusters of data size to the disk recording/playback device 5c. Step S37 follows.

At Step S37, the system controller 6 directs the storage controller 5d to assign the disk recording/playback device 5c to the high resolution recording area PA. This is followed by Step S38.

At Step S38, the system controller 6 allows the storage controller 5d to activate the disk recording/playback device 5c for searching an available recording area suited for storing the 8 clusters of the data on the optical disk 20 with respect to the data size and the recording area registered. The procedure then goes to Step S39.

At Step S39, the system controller 6 directs the storage controller 5d to examine whether or not the available recording area found by the disk recording/playback device 5c is large enough to store the high resolution image data in the order of playback. If not, the procedure moves to Step S42. When it is large, the procedure goes to Step S40.

At Step S42, the system controller 6 allows the storage controller 5d to activate the disk recording/playback device 5c for reading the image data from its recording area PA and transmitting it to the RAM 6a of the system controller 6 shown in FIG. 1. The image data is then aligned in the order of playback in the RAM 6a of the system controller 6 and returned back to the disk recording/playback device 5c. This is followed by Step S40.

At Step S40, the system controller 6 directs the storage controller 5d to activate the disk recording/playback device 5c for recording the high resolution image data in the order of playback on the optical disk 20. Then, the procedure goes to Step S41.

At Step S41, the system controller 6 directs the storage controller 5d to examine whether the three, high, medium, and low, resolution levels of the image data have been recorded or not. When it is judged yes, the procedure is terminated. If not the procedure moves to Step S43.

At Step S43, the system controller 6 causes the decimation/compression/expansion controller 4i to activate the selector 4f for selecting the medium resolution image data. The procedure goes back to Step S34.

At Step S34, the system controller 6 calculates a quantizing coefficient for fixed length encoding the medium resolution image data to yield a two-cluster fixed length code form. This is followed by Step S35 where the fixed length encoding of the medium resolution image data is carried out with the quantizing coefficient determined at Step S34 to have a two-cluster fixed length code form of the medium resolution image data. At Steps S36 to S40, the data size and recording area MA for the medium resolution image data are registered and the two-cluster fixed length code form of the medium resolution image data is recorded in its corresponding recording area MA in the order of playback.

By now, both the high and medium resolution levels of the image data have been recorded. Thus, it is judged not at Step S41 and the procedure returns back to Step S43.

At Step S43, the system controller 6 directs the decimation/compression/expansion controller 4i to activate the selector 4f for selecting the low resolution image data. The procedure goes to Step S34.

At Step S34, the system controller 6 calculates a quantizing coefficient for fixed length encoding the low resolution image data to yield a $\frac{1}{15}$-cluster fixed length code form. This is followed by Step S35 where the fixed length encoding is carried out with the quantizing coefficient determined at Step S34 to have a $\frac{1}{15}$-cluster fixed length code form of the low resolution image data. At Steps S36 to S40, the data size and recording area IA for the low resolution image data are registered and the $\frac{1}{15}$-cluster fixed length code form of the low resolution image data is recorded in its corresponding recording area IA in the order of playback.

Then, the recording of the three resolution levels of the image data is completed. It is hence judged yes at Step S41 and the third recording procedure is terminated.

As described, the different resolution levels of the fixed length encoded image data are recorded in the order of playback and when requested, they are accessed easily and retrieved continuously in the order of playback in the auto-play or browsing mode without giving a seek time. This allows the auto-play and browsing modes to be implemented with ease and in a shorter time.

If the recording in the order of playback is not feasible at Step S39, the procedure goes to Step S42 where the image data is re-adjusted to the order. It is also possible to store the image data in the available recording area and after the recording, adjust its order for ease of playback. This results in reduction of the recording time at the user side as compared with realigning before the recording.

We also have invented an optical disk structure for storage of image data which allows faster recording and playing back the high, medium, and low resolution levels of the image data in addition to the foregoing recording/playback system, and a method of recording and playing back the image data on the optical disk structure. They will be described in conjunction with the following sections from 6 to 16:

6. Description of Optical Disk Format

A novel format for image data storage newly developed by us is explained.

7. Description of File and its Multi-level Structure

The multi-level structure of a file is explained for recording and playing back the image data on the optical disk format prescribed in Section 6.

8. Structure of File

The structure of both management and data files prescribed in Sections 6 and 7 is explained.

9. Recording Action

An action of recording the image data on the optical disk prescribed in Section 6 is explained referring to Sections 7 and 8.

10. Another Recording Action

Another action of recording the image data on the optical disk prescribed in Section 6 is explained referring to Sections 7 and 8.

11. Recording of Album Name

Recording e.g. an album name on the optical disk is explained.

12. Description of Playback Action

An action of playing back index image data and displaying it on the monitor is explained.

13. Playback and Display of Index Image

The playback action prescribed in Section 12 is explained in more details referring to the optical disk structure and the file multi-level structure prescribed in Sections 6, 7, and 8.

14. Retrieval of File and Image Directory

An action of retrieving an image file stored in the optical disk prescribed in Section 6 is explained referring to Sections 7 and 8.

15. Image Editing

An action of editing the image data of an image file stored on the optical disk prescribed in Section 6 is explained referring to Sections 7 and 8.

16. Production of Full Index File

An action of producing and recording a full index file on the optical disk prescribed in Section 6 is explained referring to Sections 7 and 8.

6. Description of Optical Disk Format

Before starting the description of the format on the optical disk 20, relevant terms will be defined.

Cluster

This is a unit of recording and playback on the disk. One cluster comprises a main data region of 32 sectors and a subdata region of 4 sectors.

Logical Block

A substantial area in the sector for actual storage of 2048 bytes of data. Then, 32 sectors equals to 32 blocks.

Logical Cluster

A unit for use as a data recording area in each cluster (being identical to the main data region). The logical cluster contains 32 sectors.

Allocation Block

A unit equal to the logical cluster. The size of a logical cluster is expressed as one allocation block. Therefore, the number of clusters is equal to that of allocation blocks on the disk. The location of a file on the disk is identified by the allocation block number.

Parts

Tracks arranged physically in a succession on the disk, where a series of data is saved.

Volume

A unit including all the parts where common data including image data are stored.

6-1 Cluster Structure

The recording (and playback) on the optical disk 20 is based on clusters. The cluster is equal to a track length of two or three circles. A plurality of the clusters are time connected to one another forming one data track. The cluster comprises 4 sectors of the subdata region and 32 sectors of the main data region. The sector holds 2352 bytes. Address is allocated to each sector.

In the sector, 2048 bytes are available for saving a data while the remaining bytes are allocated to a header including sync pattern and address information, an error correction code, and others.

The subdata region of 4 sectors is provided for saving a subdata or as a linking area. Therefore, TOC, audio, video, and other data are stored in the main data region of 32 sectors.

6-2 Track Structure

The area of the optical disk 20 is largely classified into a pit area for storing data in the form of embossed pits and an MO (magneto-optical) area having grooves, as shown in FIG. 13(*a*). The pit area serves as an exclusive playback control area where a P-TOC (premastered table of contents) is registered for controlling the optical disk 20. It comprises a series of P-TOC sectors which will be described later.

The pit area at the innermost end of the disk 20 is joined with the MO area extending up to a lead-out at the outermost end of the disk. The MO area is designated as a recordable area excluding the lead-out. The recordable area includes at its head a recording/playback control area which contains a storage of U-TOC used for controlling the recording and playing back of audio data, and a calibration field for trial writing of e.g. an intensity of laser power of an optical pickup.

The U-TOC is saved in three successive clusters of the recording/playback control area. An address cluster for indicating the location of U-TOC in the recording/playback control area is determined by the P-TOC.

The recording/playback control area is followed directly by the recordable area for storing the audio data and the image data. According to the embodiment, three audio data tracks M1, M2, and M3 holding the audio data, and three data files FL1, FL2, and FL3 holding the image data are allocated in the recordable area.

In addition, a data U-TOC for controlling the data files is saved on the inner side of the storage of the data files. More particularly, the data U-TOC is stored next to the FL1 data file.

The remaining of the recordable area is given as free areas for holding none of the audio and image data. The free areas are saved for storing extra image or audio data which may be loaded later.

In fact, the U-TOC designates the records on the disk shown in FIG. 13(*a*) as a pattern shown in FIG. 13(*b*). As apparent, the audio tracks M1, M2, and M3 are defined by corresponding start and end address information. The free areas are also specified by the same manner.

The three data files FL1, FL2, and FL3 holding the image data and the data U-TOC are designated as one data track by the U-TOC. EB in this data track is defined by the U-TOC as represents an area where no data file is saved.

The data U-TOC is located in a head region of the data track defined by the U-TOC as illustrated in FIGS. 13(*b*) and 13(*c*). The data U-TOC is provided for designating the data files FL1, FL2, FL3 and the unrecorded block EB as a chain of clusters.

On the recording medium for use with the image recording/playback system of the embodiment, the recordable area is allocated and controlled by the P-TOC and the data track in the recordable area is allocated and controlled by the U-TOC. The data U-TOC in the front of the data track is used to allocate and control the data files FL1, FL2, and FL3 holding the image data in the form of clusters in the data track.

According to the description of the track structure, the audio tracks M1, M2, and M3 are saved on the disk. However, the image recording/playback system of the embodiment requires recording of no audio data, allowing the entire recordable user area of the disk to be used as a data track.

6-3 Data Track

While the U-TOC controls the data track as parts, the management of each data file in the data track is conducted by the data U-TOC.

Figures 14A, 14B, 14C:
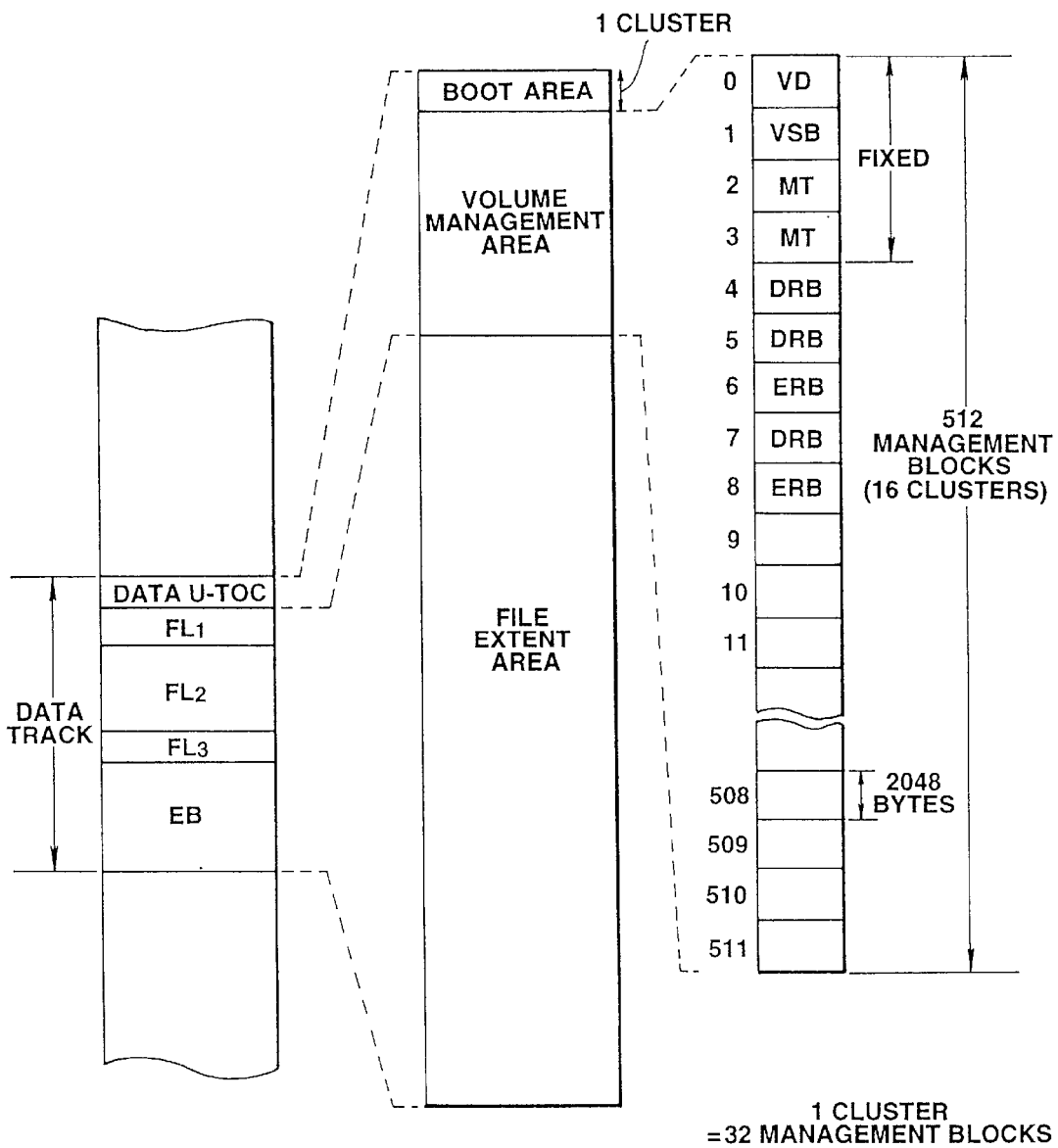
FIG. 14(a), FIG. 14(b), FIG. 14(c) are a diagram explaining a management block in a data U-TOC.

A structure of the data track is shown in FIG. 14. Referring to FIG. 4(*a*), the data track retains at its physical head the data U-TOC. The U-TOC is located in the innermost end of the data track on the disk. If the data track comprises a plurality of parts, the data U-TOC is joined to the first part located at the closest to the center of the disk.

The data U-TOC consists of a boot area of one cluster and a volume management area of 16 clusters, as shown in FIG. 14(*b*). The data U-TOC is joined with a file extent area. The file extent area holds the data files FL1 to FL3 of the image data as shown in FIG. 4(*a*). Also, more data files may be stored in the unrecorded area EB.

The volume management area comprises 512 management blocks numbered 0 to 511 as shown in FIG. 4(*c*). Each management block has a data size of 2048 bytes. The data in the management blocks carries control information for recording and playing back the data files.

The block numbers of the management blocks are 0 to 511. The management block 0 is a volume descriptor VD and the management block 1 is a volume space bit map VSB. The two management blocks 2 and 3 are management tables MT.

The four management blocks 0 to 3 are fixed as described above. The other management blocks 4 to 511 may be used as directory record blocks DRB and extent record blocks ERB depending on the usage of the file extent area.

The management block in the management area is equal to one logical block (a sector). For recording and playback, the logical block (management block) is a fundamental unit and is thus regarded as a unit of management in the management area.

For storing the image data in the file extent area, the allocation block comprising a logical cluster (of 32 sectors) is a minimum unit and considered as a unit of management in the file extent area.

6-4 Volume Descriptor

As the volume descriptor VD is the front end management block in the volume management area, it controls substantially the data track (volume) on the disk.

Figure 15:
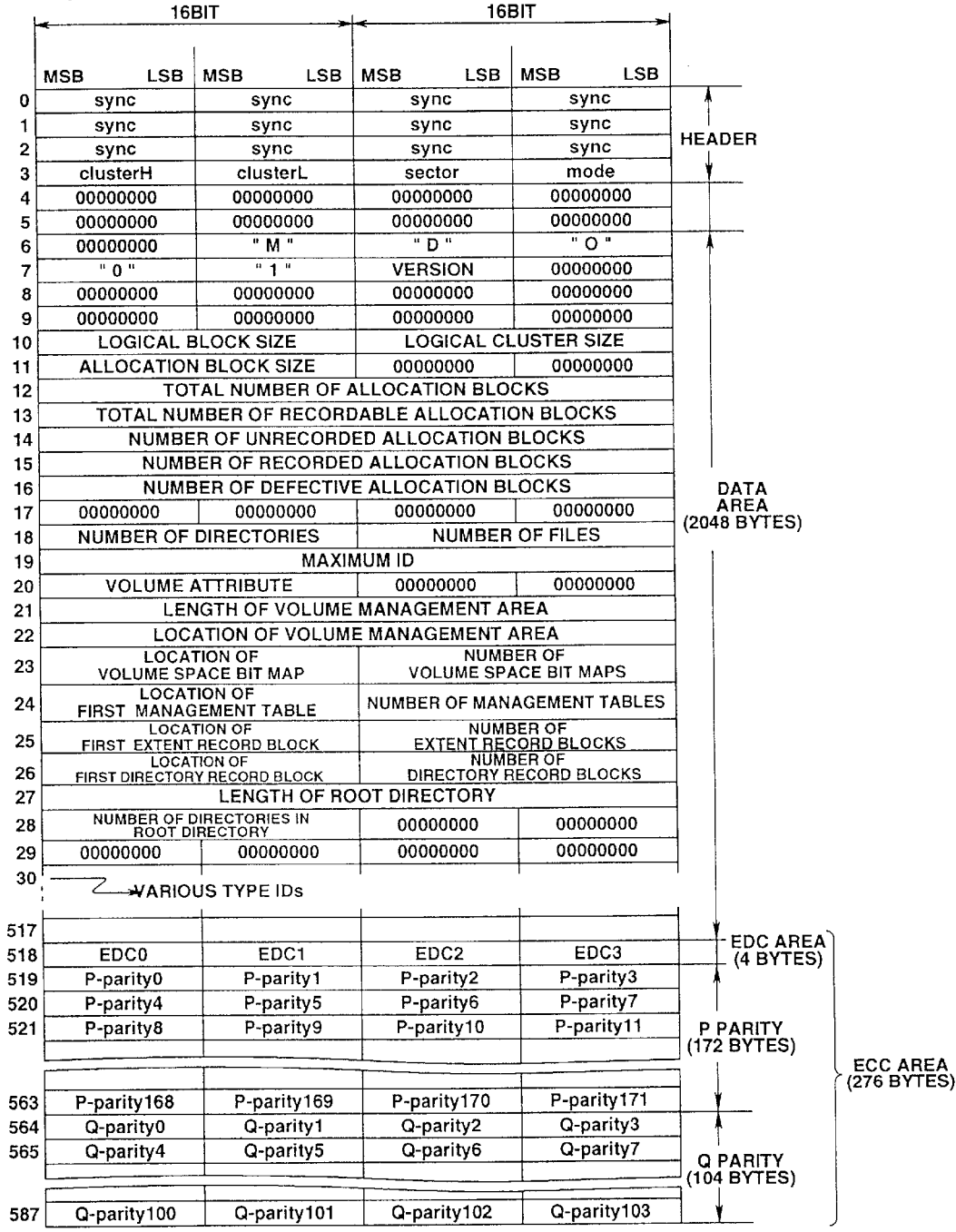
FIG. 15 is a diagram explaining a sector structure of a volume descriptor.

FIG. 15 illustrates a sector structure of the volume descriptor VD. The sector includes a header of sync pattern and address information followed by 2048 bytes of a data area where various control data are stored.

The second to sixth bytes in the data area represent a code "PICMD" of e.g. ASCII mode which is an ID indicative of the sector of the volume descriptor. This is followed by a version ID of the system.

Then, provided are data of a logical block size, a logical cluster size, and an allocation block size. The logical block is equivalent to the data area in the sector of the data track. The data area has a size of 2048 bytes out of the total of 2352 bytes. The logical block size is hence written as 2048 of a byte length.

The logical block is a minimum unit for recording and playback in the management area.

The logical cluster size represents the number of the logical blocks in one logical cluster. The logical cluster is a cluster for storing the control information and main data. One cluster equals to 36 sectors. As 32 of the sectors (32 logical sectors) are used for storing the data, the logical cluster size is 32.

The allocation block size represents the number of the logical blocks in one allocation block. The allocation block is identical in data amount to the logical cluster and used for storing the control information and data files in the data track.

For example, 32 sectors of the logical cluster in the volume management area or the file extent area are grouped as an allocation block. The allocation block is a minimum unit for recording and playback in the file extent area.

Then, the total number of the allocation blocks follows as is stored. This is a total number of the allocation blocks in the volume. On a hybrid disk for saving both audio and video data, the total number includes the allocation blocks in the pit area. The number of recordable allocation blocks represents initially a number of the allocation blocks located in the recordable area. A premastered disk has none of the recordable allocation blocks.

The number of unrecorded allocation blocks represents available ones of the recordable allocation blocks in the volume for storing data. Similarly, the number of recorded allocation blocks represents recorded ones of the recordable allocation blocks in the volume. Those records are followed by the number of defective allocation blocks which are classified as defectives because they may have flaws or the like. In succession, the number of directories in the volume and the number of data files in the volume are stored.

Then, a maximum of ID follows. The ID numbers are allocated in a sequence of production to the directories and data files and their largest is the ID maximum. This precedes a volume attribute.

The volume attribute holds attribute data determined through examining whether the volume management area has been recorded in a mirror mode or not, whether or not there are invisible files, whether write protect has been involved or not, and whether backup is needed or not.

The length of the volume management area then follows as is stored in the form of byte length. This is followed by the location of the volume management area on the disk which is denoted by the number of an allocation block located at front in the volume management area. Succeedingly, there are recorded the location of first allocation blocks and the number of allocation blocks for volume space bit map VSB, management table MT, extent record block ERB, and directory record block DRB which are produced with the use of management blocks in the volume management area as well as the volume descriptor. For example, the location of a first directory can be identified by the allocation block number of a first directory record block DRB.

This is followed by byte length of the directory and the number of subdirectories in the directory. Finally, various ID data and character set records are stored in the rest of the data area although shown in FIG. 15 is the ID data.

The rest of the data area saves a boot system ID, a volume ID and its character set code, a publisher ID and its character set code, a data preparer ID and it character set code, and an allocation ID and its character set code. Also, included are date and time of producing the volume, date and time of updating the volume, date and time of the end of validity, and date of the start of validity. The system extension area is 1024 to 2047 bytes in the data area.

The data area is followed by an EDC area of 4 bytes and an ECC area of 276 bytes. The ECC area comprises a P parity of 173 bytes and a Q parity of 104 bytes.

6-5 Volume Space Bit Map

The first, numbered 1, of the management blocks in the volume management area is used as a volume space bit map VSB. The volume space bit map VSB represents records in the file extent area in the form of allocation blocks of a data track.

Figure 16:
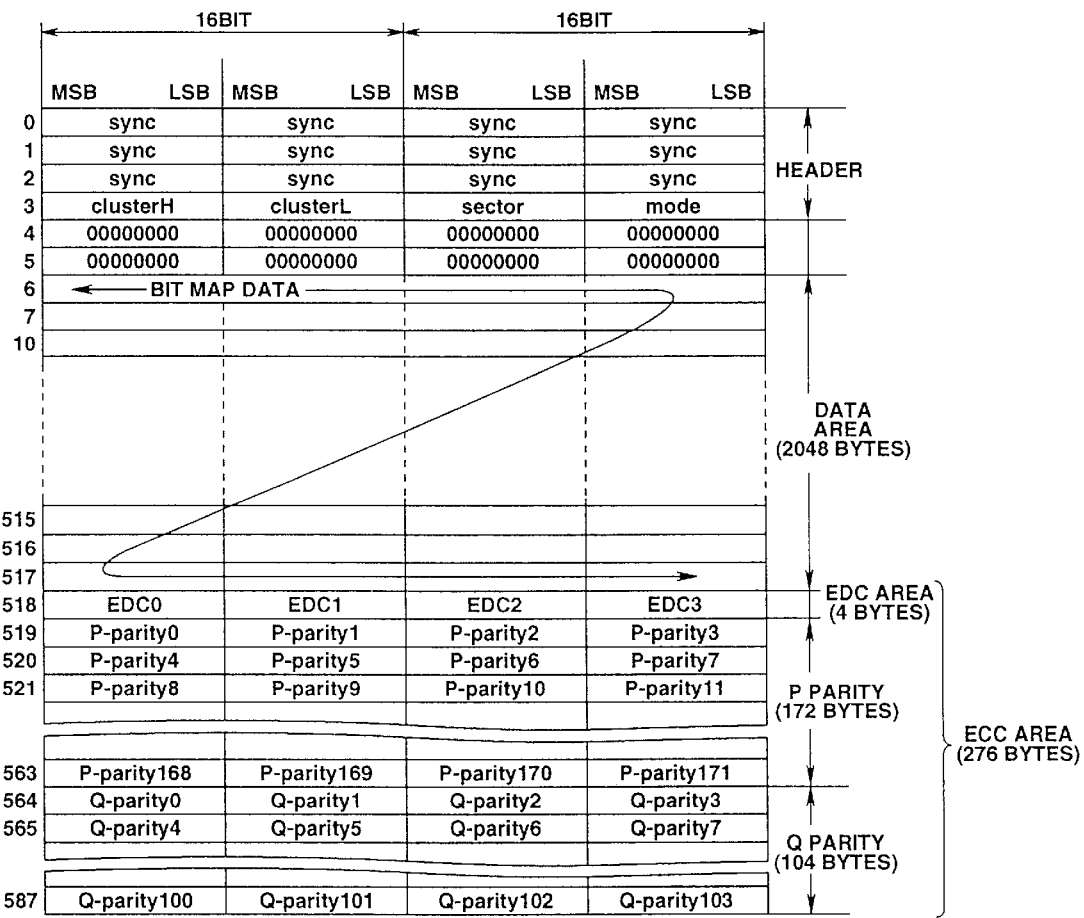
FIG. 16 is a diagram explaining a sector structure of a volume space bit map.

FIG. 16 shows a sector structure of the volume space bit map VSB. The sector starts with a header holding sync pattern and address information. The header is followed by a data area of 2048 bytes where two bits are allocated to each allocation block for indicating its type. The volume space bit map VSB also includes an EDC area and an ECC area after the data area.

Figure 17:
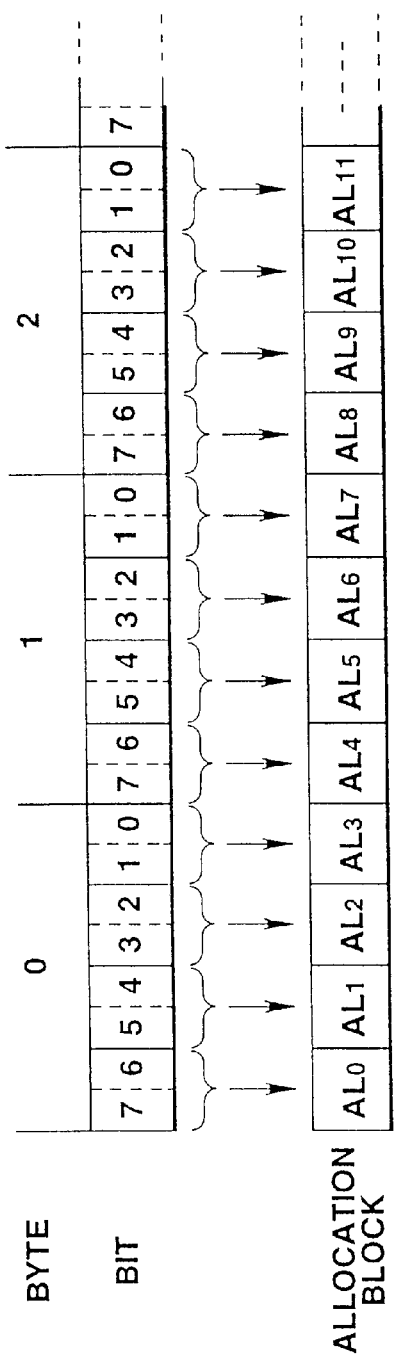
FIG. 17(a), FIG. 17(b) are a diagram explaining an arrangement of allocation blocks.

The data area is illustrated in more details in FIG. 17(a). The allocation blocks in the data track are numbered starting from 0. The first allocation block AL0 is composed of two bits, 7 and 6 of the first byte in the data area of the volume space bit map VSB. Similarly, two bits are allocated to each of the allocation blocks AL1, A12, and so on. The data area of the volume space bit map VSB may hold the allocation blocks AL0 to AL8191. As the disk for use with the image recording/playback system of the embodiment has 2200 clusters, the allocation blocks are actually AL0 to AL2199.

As shown in FIG. 17(b), the two bits are 00 for the unrecorded allocation block, 01 for the recorded allocation block, 10 for the defective allocation block, and 11for an undefined allocation block. The remaining of the data area where no allocation blocks are saved is expressed by 11.

6-6 Management Table

The two management blocks, numbered 2 and 3, in the volume management area are used as management tables MT.

Figure 18:
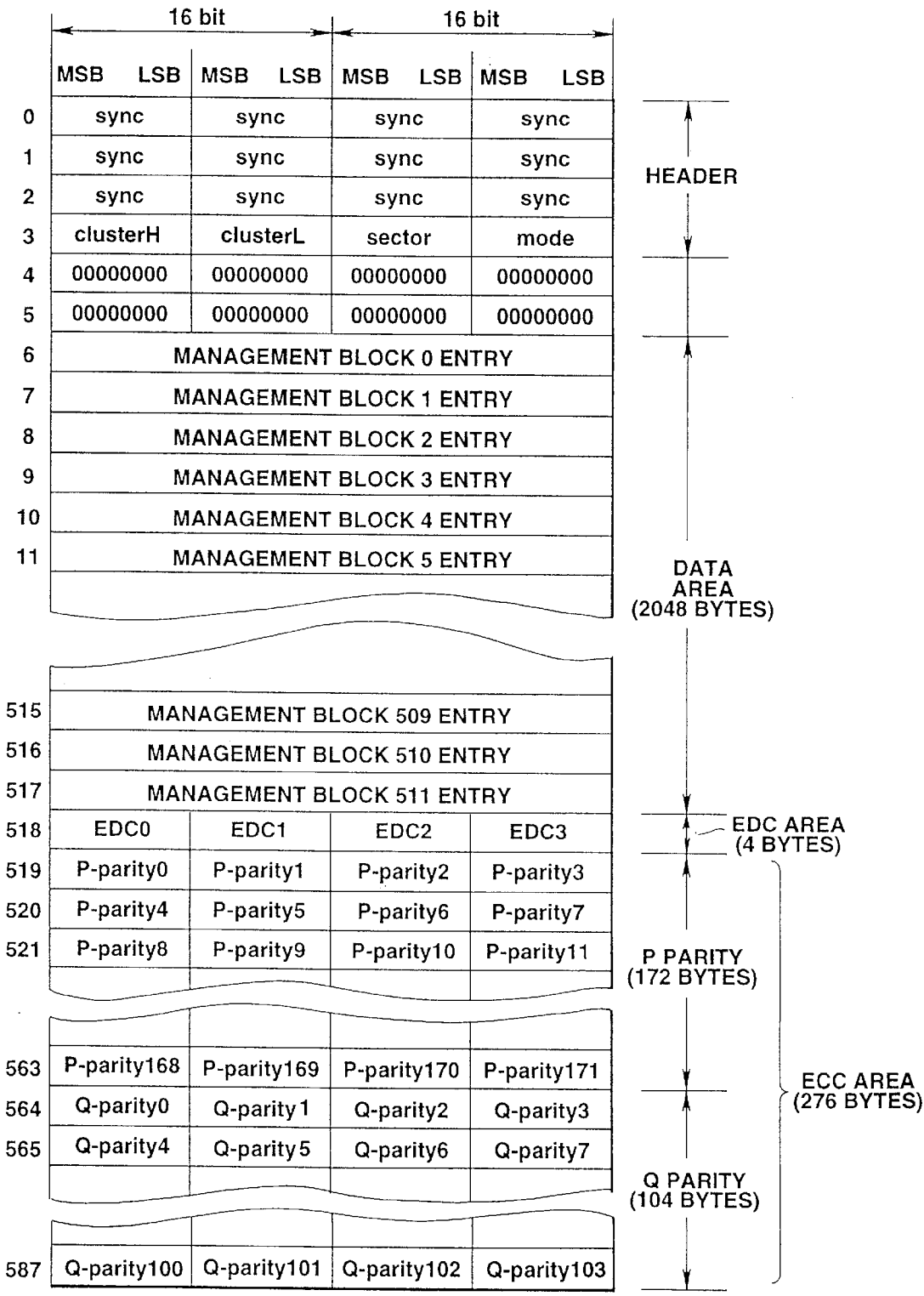
FIG. 18 is a diagram explaining a sector structure of a management table.

The management table MT indicates the usage of each management block in the volume management area. FIG. 18 shows a sector structure of the management table MT. The sector starts with a header holding sync pattern and address information. Then, a data area of 2048 bytes follows. 4 bytes in the data area are allocated to each management block for identification.

The management blocks in the volume management area, 512 in total, are specified in their applications by management block entries 0 to 511 of the table. The data area in the table is also followed by an EDC area and an ECC area.

Figure 19:
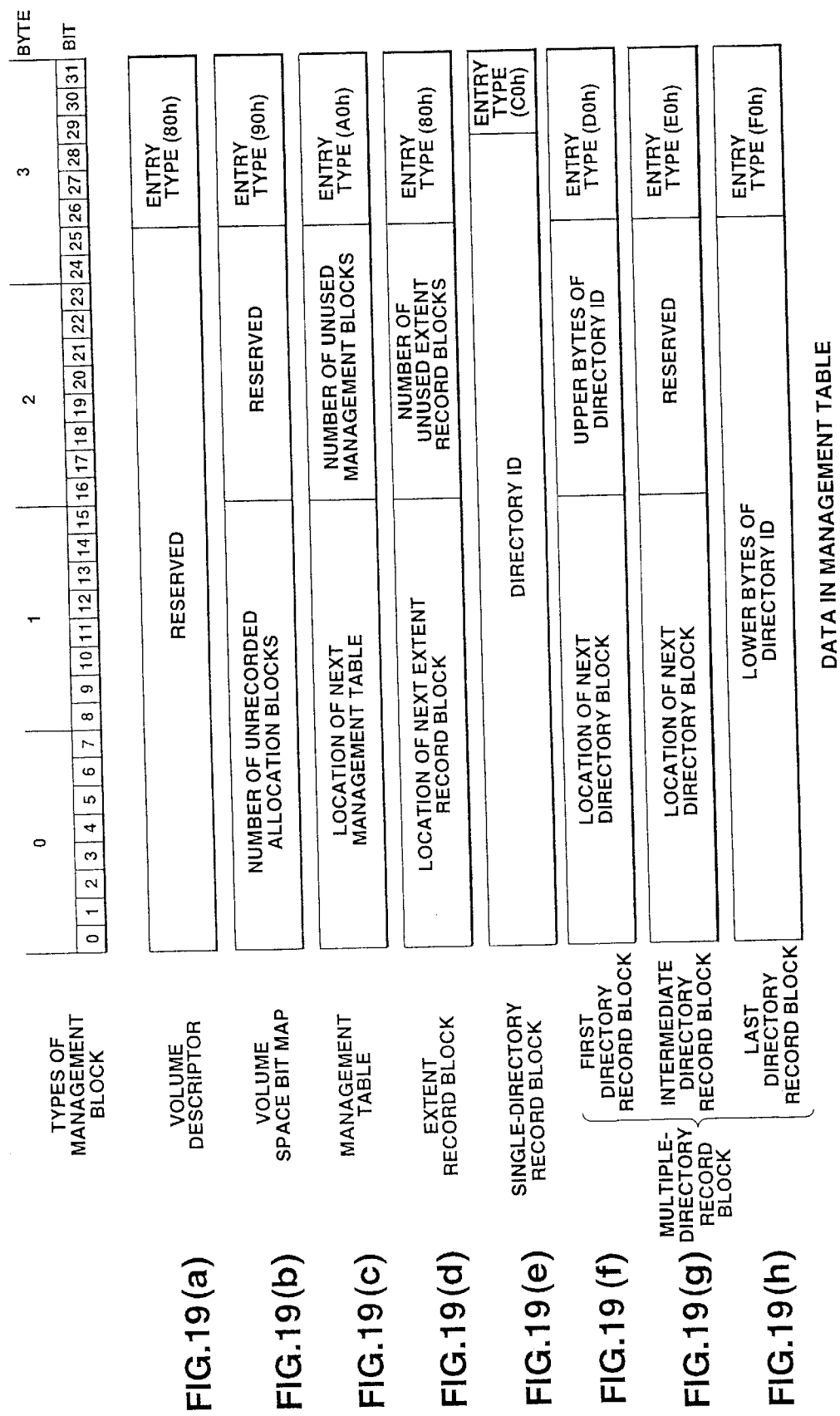
FIG. 19(a)–FIG. 19(h) are a diagram explaining allocation of data in the management table.

The contents of 4 bytes of the management block entries 0 to 511 are shown in FIG. 19. As explained, the first management block (management block 0) in the volume management area is the volume descriptor. The fourth byte of the management block entry 0 is expressed by 80h of an entry type to designate the management block 0 as the volume descriptor, as shown in FIG. 19(a).

The second management block (management block 1) is the volume space bit map as described. Hence, the fourth byte of the management block entry 1 is expressed by an entry type of 90h for designating the management block 1 as the volume space bit map, as shown in FIG. 19(b). The first and second byte of the entry 1 represent the number of unrecorded allocation blocks.

The management block entry for designating a management block as the management table specifies with its first and second bytes the location of the succeeding management table and with its third byte the number of unused management blocks, as shown in FIG. 19(c). The fourth byte is then denoted by an entry type of A0h indicating that the present management block is a management table.

The management block entry for designating a management block as the extent record block specifies with its first and second bytes the location of the succeeding extent record block and with its third byte the number of unused extend record blocks, as shown in FIG. 19(d). The fourth byte is then denoted by an entry type of B0h indicating that the present management block is an extent record block.

The directory record block is used in two different cases; when the directory record unit in a directory is defined by one single management block and when the directory record unit in a directory is expressed by two or more management blocks or directory record blocks. When the management block is a directory record block, its entry comprises a directory ID of 30 bits from 0 to 29, and an entry type of 00h of 2 bits, as shown in FIG. 18(e).

When the management block is the first one of the multiple directory record blocks, its entry specifies with its first and second bytes the location of the succeeding directory record block, and with its third byte an upper byte of the directory ID, as shown in FIG. 19(f). The fourth byte is then expressed by an entry type of D0h indicating that the present management block is the first directory record block.

Also, when the management block is an intermediate one (not the first or last) of the multiple directory record blocks, its entry specifies with its first and second bytes the location of the succeeding directory record block, as shown in FIG. 19(g). The fourth byte is then denoted by an entry type of E0h indicating that the present management block is an intermediate directory record block.

Furthermore, when the management block is the last one of the multiple directory record blocks, its entry saves in its first, second, and third bytes a lower byte of the directory ID, as shown in FIG. 19(h). The fourth byte is then expressed by an entry type of F0h indicating that the present management block is the last directory record block.

6-7 Directory Record Block

The management blocks, 3 and greater, in the volume management area are used as directory record blocks DRB. The directory record block DRB contains one or more directory record units. The directory record unit is classified into two types; a directory-dedicated type for forming a directory and a file-dedicated type for specifying the location of a data file. A combination of the directory-dedicated and file-dedicated directory record units are stored in the directory record block depending on files and subdirectories in the directory.

Figure 20:
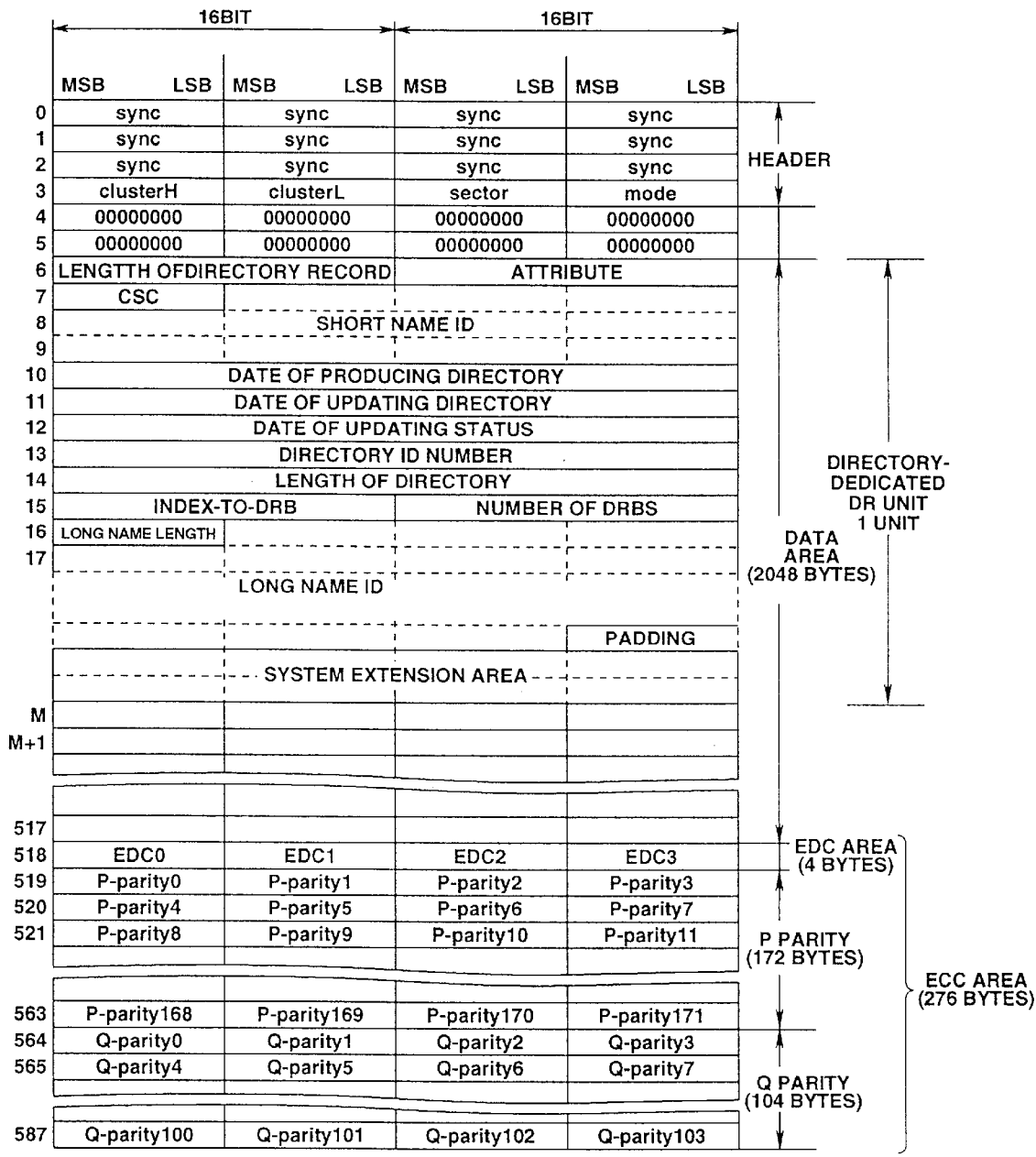
FIG. 20 is a diagram explaining a sector structure of a directory-dedicated directory record block.

FIG. 20 illustrates a sector structure of the directory record block DRB in which a group of the directory-dedicated directory record units forming the directory are saved. The sector starts with a header holding sync pattern and address information. The header is followed by a data area of 2048 bytes where one or more directory record units are stored.

One of the directory record units specifies a directory record length. As the directory record unit is variable in length, the directory record length represents a full size of bytes. This is followed by a directory attribute which indicates, for example, whether the current directory record unit is a directory-dedicated directory record unit or not and whether the directory in which the directory record unit is included is an invisible directory or a system directory. In other words, the directory attribute is indicative of the location of the data file being defined or not by extent record blocks which will be described later.

Then, a character set code and a short name ID follow as are recorded. The character set code indicates a character type of the short name ID. The short name ID is an ID comprising 11 bytes. More specifically, the short name ID of 11 bytes saves a directory name in the form of less than 11 characters of ASCII code.

This is followed by date and time of producing the directory, date and time of updating the directory, and date and time of updating a status which represent the date and time of updating the directory record unit. Also, a directory ID number and a directory length follow.

Further provided are an index-to-DRB and a number-of-DRB. The index-to-DRB indicates in the form of one of the management block numbers 0 to 511 the location of a first directory record block DRB holding information of a given subdirectory in the volume management area. The number-of-DRB specifies the number of directory record blocks identifying the directory with the number of the management blocks.

Succeedingly, a long name ID length precedes a long name ID of which size is identified by the long name ID length. The long name ID is variable in length. If the long name ID is not stored, the long name ID length is expressed by 00h. When the long name ID consists of an even number of bytes, the fractional byte is filled with a padding of 00h. Remaining bytes after the long name ID are used as a system extension area.

As the directory-dedicated directory record unit has the foregoing structure, two or more may be allocated in the data area of 2048 bytes.

The data area is then followed by an EDC area and an ECC area.

Figure 21:
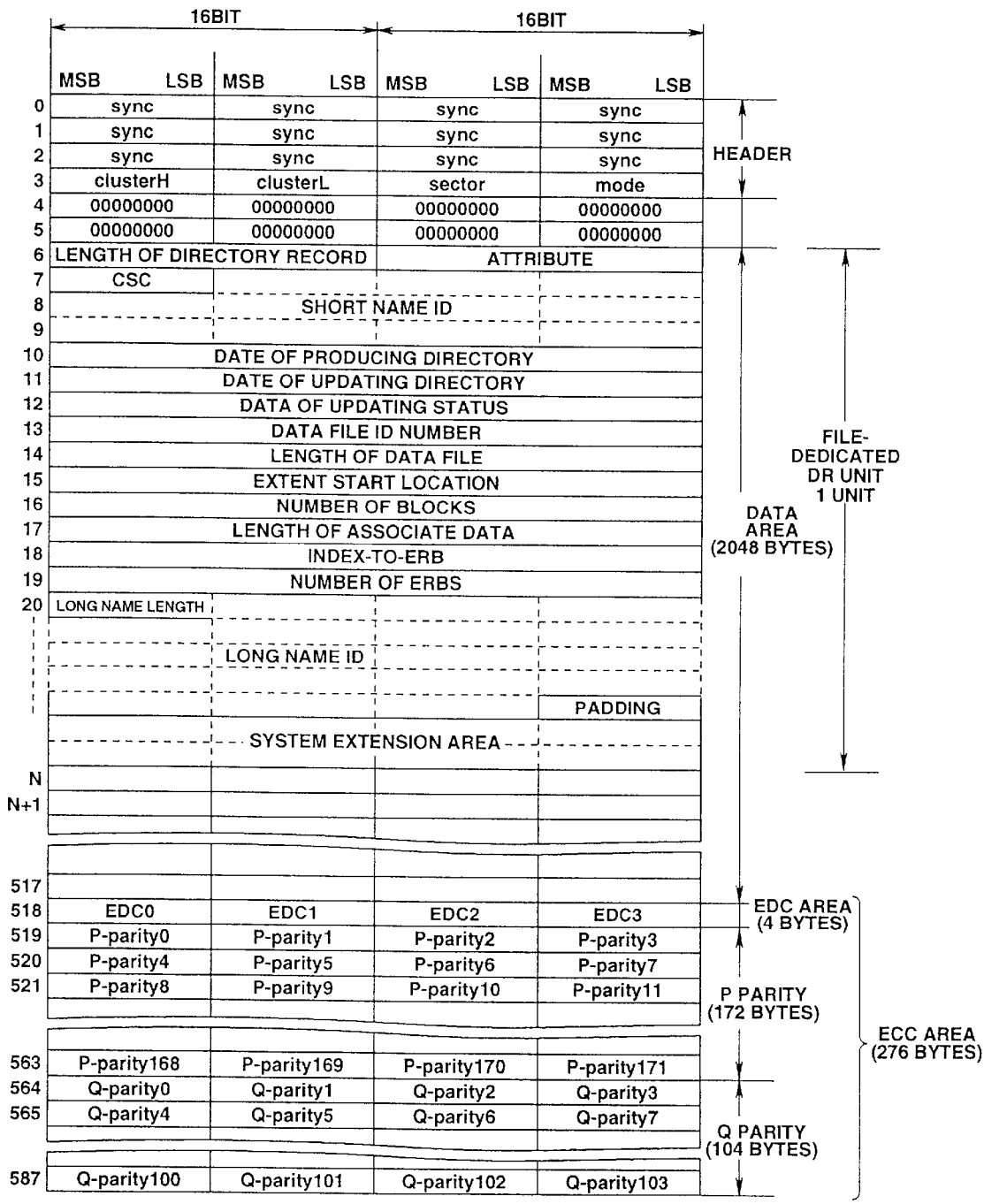
FIG. 21 is a diagram explaining a sector structure of a file-dedicated directory record block.

FIG. 21 shows a sector structure of the directory record block DRB in which a group of the file-dedicated directory record units forming the directory are saved.

The sector starts with a header holding sync pattern and address information. The header is followed by a data area of 2048 bytes where one or more directory record units are stored.

One of the directory record units specifies a directory record length similar to one shown in FIG. 20. The directory record length is followed by a directory attribute which indicates, for example, that the current directory record unit is not a directory-dedicated directory record unit, whether the target data file is an invisible file or a system file, and that the location of the data file is identified by extent record units.

Then, a character set code, a short name ID identifying a file name, date and time of producing the directory, date and time of updating the directory, and date and time of updating a status, similar to those of FIG. 20. The short name ID holds the data file name of less than 11 characters of ASCII code.

Those are followed by an ID number and a data file length. Further provided are an extent start location and a number of blocks. The extent start location indicates in the form of an allocation block number the location of a file stored in the file extent area. The number of blocks represents the number of allocation blocks engaged from the start position specified by the extent start location.

Then, an index-to-ERB and a number-of-ERB follow as are stored. The index-to-ERB indicates in the form of one of the management block numbers 0 to 511 the location of an extent record ERB in the volume management area which holds information of the location of the data file dispersed. The number-of-ERB specifies the number of extent record blocks identifying the dispersed data file with the number of the management blocks.

Succeedingly, a long name ID length precedes a long name ID of which size is variable and identified by the long name ID length. If the long name ID is not stored, the long name ID length is expressed by 00h. When the long name ID consists of an even number of bytes, the fractional byte is filled with a padding of 00h. Remaining bytes after the long name ID are used as a system extension area.

As the file-dedicated directory record unit has the foregoing structure, two or more may be allocated in the data area of 2048 bytes. The data area is then followed by an EDC area and an ECC area.

There are two different cases in recording a data file, e.g. an image file, on a disk. Thus, specifying the location of the data file is varied depending on the cases.

The first case is that there is available a recording area for storage of all the data of a desired image file to be recorded.

The image file is thus saved in the physically continuous recording area.

As each file comprises a chain of the allocation blocks, it is recorded in a physically continuous area on the disk. The location of the file is identified by the allocation block number saved as the extent start location of a file-dedicated directory record unit.

In the second case, a physically continuous recording area for storage of an image file to be recorded is not available on the disk. The image file has to be saved in discrete regions of the disk. In storage, the image file is separated into groups of the allocation blocks. The location of each group of the allocation blocks is identified by information saved in the extent record block of which location in the management area is defined by the management block number saved as the index-to-ERB of a file-dedicated directory record unit. The extent record block will be explained later in more details. The first case requires no storage of the index-to-ERB and the second case needs not to record the extent start location.

6-8 Extent Record Block

The management blocks, 4 or greater, in the volume management area are available for use as the extent record blocks ERB. The extent record block is provided for identifying the location of each group of the allocation blocks of a data file recorded in a separated area and holds information of the location of the allocation blocks in the separated area.

The extent record block includes a maximum of 64 extent record units (ER units). The ER unit is classified into two type, index-dedicated ER unit and descriptor-dedicated ER unit. The index-dedicated ER unit is assigned as a first one of the ER units in each ERB block for controlling the usage of the second and greater ER units. The second and greater ER units are descriptor-dedicated ER units for holding information of the allocation block numbers which are used to identify the location of separated records on the disk.

Figure 22:
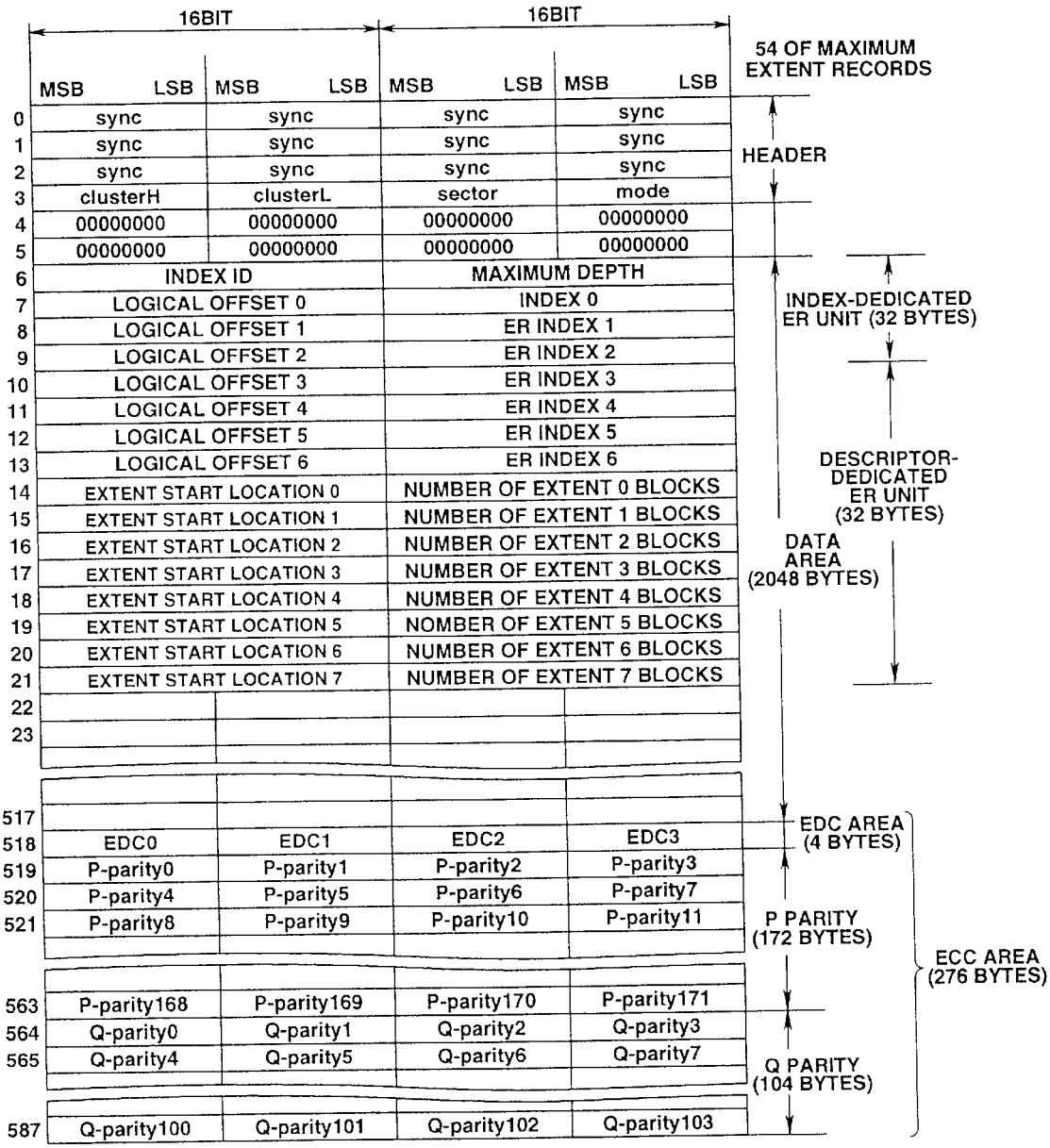
FIG. 22 is a diagram explaining a sector structure of an extent record block.

FIG. 22 shows a sector structure of the extent record block DRB. The sector starts with a header holding sync pattern and address information. The header is followed by a data area of 2048 bytes where 64 extent record units are saved at maximum. Each extent record unit consists of 32 bytes.

The first extent record unit of 32 bytes in the data area of FIG. 22 is an index-dedicated extent record unit.

The index-dedicated extent record unit includes an index ID at its head. The index ID is expressed by FFFF indicating that the current extent record unit is used as the index-dedicated extent record unit.

Then, a maximum depth follows. As a tree arrangement of extent records is determined by the index-dedicated extent record unit, the maximum depth indicates subtree levels composed of the extent record units. If the index-dedicated extent record unit specifies the extent record units including extent descriptors, the maximum depth is 0000h.

This is followed by a maximum of 7 logical offsets and of 7 ER indexes. The ER index is indicative of a recorded location information storing one out of the 64 recordable ER units in one extent record block. Hence, the number of the location ER unit, any of 0 to 63, is stored in the ER index. The logical offset is provided for indicating a level of the ER unit specified by the ER index for forming the data file.

The second and greater ER units shown in FIG. 22 are descriptor-dedicated ER units. The descriptor-dedicated ER unit holds a maximum of 8 extent start locations and a maximum of 8 numbers of allocation blocks. The extent start location holds an allocation block number indicating the location of a group of the allocation blocks saved in a given separate recording area. The allocation block number represents the number of allocation blocks saved in the separate recording area. Each of the separate recording areas is defined by a combination of the extent start location and the number of allocation blocks. As the descriptor-dedicated extent record unit save 8 of the extent start locations and 8 of the numbers of allocation blocks at maximum, it can specify a maximum of 8 separate recording areas. For specifying more than 8 of the separate recording areas, the third ER unit is designated as a descriptor-dedicated ER unit and linked to the second ER unit which has been assigned as the descriptor-dedicated ER unit by the index-dedicated ER unit.

Identifying with ERB the location of a data file saved in a plurality of separate recording areas will now be explained.

The location of an ERB in the management block area is specified by a corresponding index-to-ERB saved in the file-dedicated DR unit of DRB. The first ER unit of the ERB contains a data of FFFF and is thus identified as an index-dedicated ER unit. For identifying the first ER unit in a data file, 0000 of the logical offset is searched. Then, a ER index joined to the logical offset of 0000 in the index-dedicated ER unit is called for. The ER index is used to identify a corresponding descriptor-dedicated ER unit. A separate recording area is thus defined by 8 extent start locations and 8 numbers of allocation blocks in the descriptor-dedicated ER unit. This allows the location of the data file saved separately on the disk to be identified with information from the management area. Accordingly, each file can quickly be retrieved without accessing the entire recording area of the disk.

7. Description of File and its Multi-level Structure

A file for use with the image recording/playback system of the embodiment is classified into a management file, an image file, and an index image file.

The extension of a management file name is .PMF. When .PMF is detected, its file is identified as a management file. The management file is classified into overall data management file (OVF__INF.PMF), image data management file (PIC__INF.PMF), print data management file (PRT__INF.PMF), playback control management file (PMS__INF.PMF), and so on. Each of the management file types will be described later in more details.

The extension of an image file is .PMP. en .PMP is detected, its file is identified as an image data file. The image file is classified into a high resolution image file for high resolution image data HD and a medium resolution image file for medium resolution image data SD. The medium resolution image file comprises PSNnnnnn.PMP holding image data of 640×480 pixels at an aspect ratio of 4:3 and PSWnnnnn.PMP holding image data of 848×480 pixels at an aspect ratio of 16:9. The high resolution image file comprises PHPnnnnn.PMP holding image data of 1536×1024 pixels at an aspect ratio of 3:2 and PHWnnnnn.PMP holding image data of 1920×1080 pixels at an aspect ratio of 16:9. Also, another type of the high resolution image file for super-high resolution image data HD is expressed by PUP-nnnnn.PMP holding image data of 3072×2048 pixels at an aspect ratio of 3:2.

Each image file with the extension of .PMP is characterized with first three letters (e.g. PHP) of its name indicating a type of the image and succeeding five letters (e.g. nnnnn) indicating the number of the file given according to a sequence of production.

Figure 23:
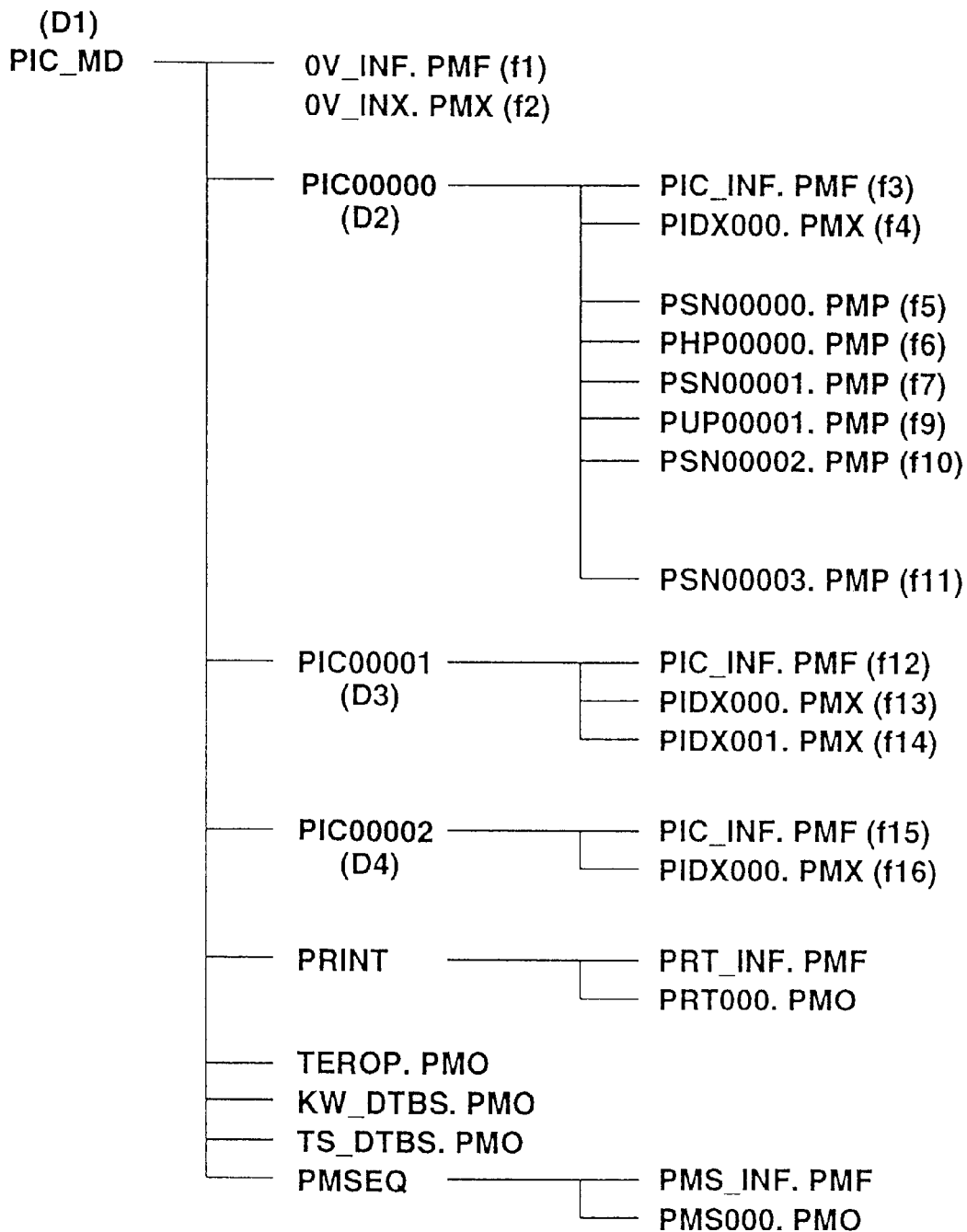
FIG. 23 is a diagram explaining a multi-level directory structure for management of the image data of different resolution levels in the still image recording/playback system.

Referring to FIG. 23, the optical disk format for use with the image recording/playback system of the embodiment has a multi-level directory structure comprising a main directory level D1 (PIC__MD), and a subdirectory level of 0th directory D2 (PIC00000) and 1st directory D3 (PIC00001). The directory number given according to a sequence of production of the directories is used to determine the five letters after PIC thus specifying a name of the directory.

The image data are saved on the optical disk 20 in the form of files which are managed by the main directory D1 (PIV_MD).

For example, the directory D1 includes of an overall data management file f1 (OV_INF.PMF) for controlling overall data, an overall index file f2 (OV_IDX.PMF) for controlling index files, and subdirectories for album image data D2 to D4 (PIC00000 to PIC00002). The directory (PIC_MD) also contains a print directory (PRINT) for managing print data including print color, print size, and rotation, a telop directory (TERO.PMO) for managing telop text including an image title displayed on a monitor, a keyword retrieve directory (KW_DTBS.PMO) for searching the number and keyword of a desired image, a time stamp directory (TS_DTBS.PMO) for managing the date and time of image recording, and a playback control directory (PMSEQ) for controlling the playback action of a program to reproduce only a desired image.

As shown, there are three subdirectories provided from the image data directory (PIC00000) numbered 00000 to the image data directory (PIC00002) numbered 00002.

The image directory (PIC00000) includes an image data management file f3 (PIC_INF.PMF) for controlling a plurality of image files specified with the directory number 00000, and an image index file f4 (PIDX000.PMX) holding a set of index images of the image directory D2.

The directory D2 (PIC00000) denoted by the directory number 00000 includes a medium resolution image file f5 (PSN00000.PMP) and a high resolution image file f6 (PHP00000.PMP), both produced from image data specified by the image number 00000. It also contains a medium resolution image file f7 (PSN00001.PMP) and a high resolution image file f9 (PHP00001.PMP), both produced from image data specified by the image number 00001. Furthermore, the directory D2 includes a medium resolution image file f10 (PSN00002.PMP) produced from image data specified by the image number 00002, and a medium resolution image file f11 (PHP00003.PMP) produced from image data specified by the image number 00003.

The image directory (PIC000001) defined by the directory number 00001 includes an image data management file (PIC_INF.PMF) and two index files (PIDX000.PMX) for controlling the index images. The two index files are used to control the index images corresponding to the image files saved in the subdirectory (PIC00001). In general, they are linked to each other in use.

The print directory (PRINT) includes a print data management file (PRT_INF.PMF) for controlling print data files, and a set of print data files (PRT000.PMO to PRTnnn.PMO) controlled by the print data management file.

The playback control directory (PMSEQ) includes a playback control management file (PMS_INF.PMF) for managing playback control data files saved in the PMSEQ directory, and a set of playback control data files (PMS000.PMO to PMSnnn.PMO) for controlling a sequence of images.

As described previously referring to FIG. 14(c), the management blocks numbered from 0 to 5111 are a sequence of the volume descriptor VD, volume space bit map VSB, management table MT, management table MT, directory record block DRB, directory record block DRB, extent record block ERB, directory record block DRB, extent record block ERB, and so on.

Figure 24:
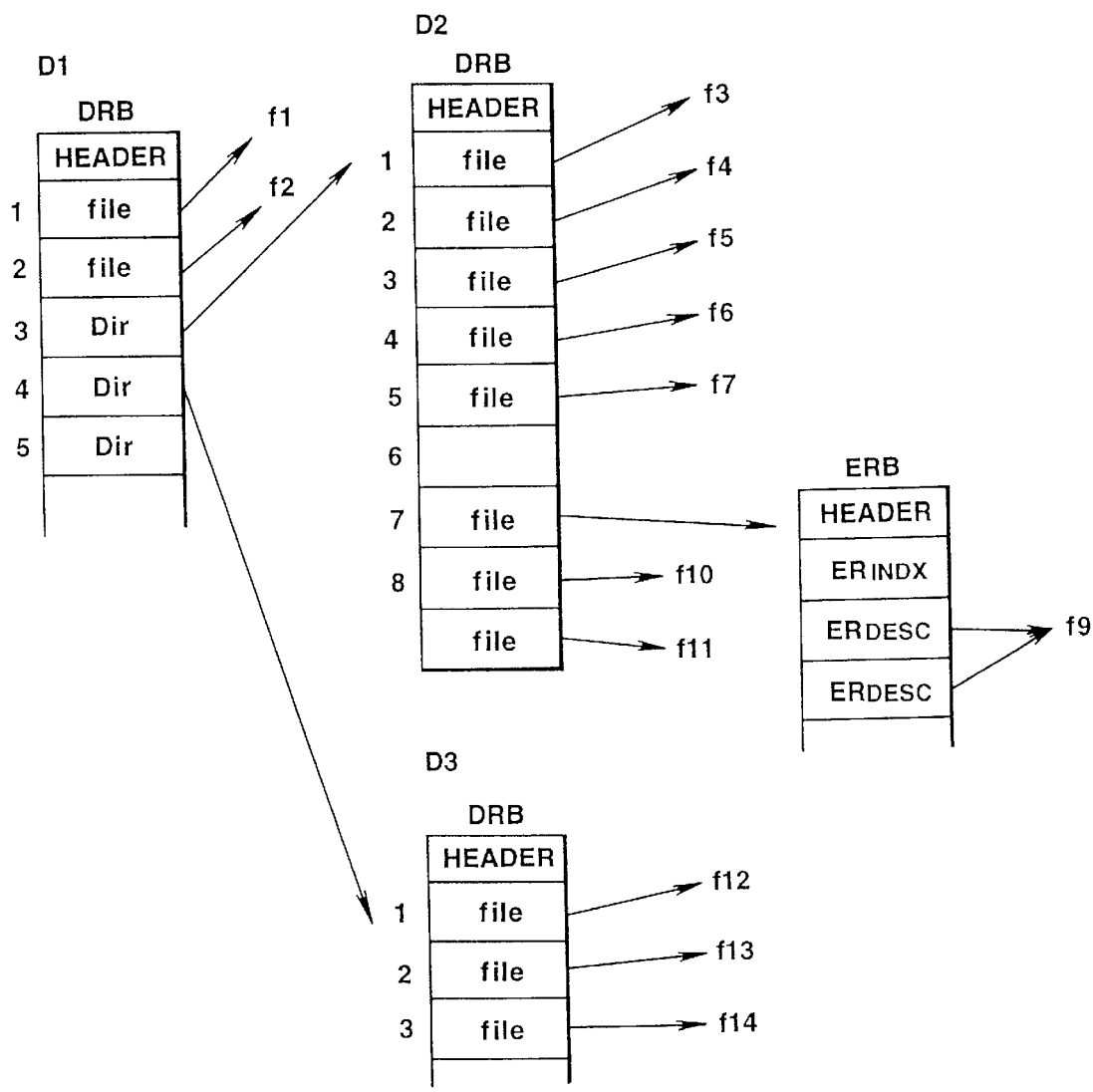
FIG. 24 is a diagram explaining DRB and ERB allocated in the management block.

It is clarified by information of the volume descriptor VD that the directory record block DRB indicating the directory D1 (PIC_MD) is a fourth management block. As shown in FIG. 24, the directory record block DRB of the fourth management block holds a header and two file-dedicated DR units preceded by the header for indicating the locations of the overall data management file f1 and the overall index data file f2 illustrated in FIG. 23. More particularly, first one of the two file-dedicated DR units holds an allocation block number saved in the form of the block of the overall data management file f1. Similarly, second one of the two file-dedicated DR units holds an allocation block number saved in the form of the extent start location, indicating the location of the allocation block of the overall index file f2. It should be noted that as both the overall data management file f1 and the overall index data file f2 are stored in two consecutive allocation blocks on the optical disk 20, the index-to-ERB of the file-dedicated DR unit holds no record.

The two file-dedicated DR units are followed by a third and a fourth unit which are a couple of directory-dedicated DR units for specifying the locations of the image directories D2 and D3 denoted by the directory numbers 00000 and 00001 respectively.

More specifically, the relative locations of DRB blocks attributed to the image directory D2 are specified by the management block numbers from 0 to 511 saved in the index-to-DRBs of the directory-dedicated DR units. In the illustrated case, the index-to-DRB in the third directory-dedicated DR unit holds a number of 005 indicating the location of the DRB attributed to the directory D2 in the management block area. Also, the index-to-DRB in the fourth directory-dedicated DR unit holds a number of 007 indicating the location of the DRB attributed to the directory D3 in the management block area.

As understood, the location of the DRB of the fifth management block is defined by information in the directory-dedicated DR unit which is a third unit in the DRB of the fourth management block.

The fifth management block DRB is a block holding data attributed to the image directory D2. The DRB includes 8 of the file-dedicated DR units preceded by the header.

The first to seventh file-dedicated DR units carry the location data of the image data management file f3, image index file f4, medium resolution image data file f5, high resolution image data file f6, medium resolution image data file f7, super-high resolution image data file f9, and medium resolution image data file f10 respectively. Similar to the prescribed directory-dedicated DR units, the locations of the image data management file f3, image index file f4, medium resolution image data file f5, high resolution image data file f6, and medium resolution image data file f7 are specified by the management block numbers saved in the index-to-DRBs of the file-dedicated DR units.

The seventh file-dedicated DR unit saves the location data of the super-high resolution image data file f9. The super-high resolution image data file may have a data length of 18 clusters. If the optical disk 20 fails to provide a single available recording area required for storing the file of 18 clusters, data of the file is divided into groups of the allocation blocks which are stored in separate recording areas respectively.

While the separate recording areas hold the data of a single file, their locations are identified not directly by the extent start locations in the file-dedicated DR unit but by data saved in the ERB which is located between the DRB and the image file f9.

As shown in FIG. 22, the ERB includes four of the extent record units (ER units) preceded by the header. The ER units may be saved 64 at the maximum.

The first ER unit is an index-dedicated ER unit and the second and third ER units are descriptor-dedicated ER units. The index-dedicated ER unit holds index data of the second and greater ER units. The index-dedicated ER unit also includes ER index and logical offset data of a number of the ER units saved. The ER index contains one of the ER unit numbers 0 to 63 indicative of the corresponding ER unit saved out of the 64 ER units. The logical offset indicates the location of the ER unit specified by the ER index for constructing a file.

The descriptor-dedicated ER unit includes 8 extent start locations and 8 numbers of extent blocks. The extent start location indicates the start location of one separate area with the number of the allocation block. The number of extent blocks is indicative of the data length of the separate area in the form of the number of allocation blocks. Eight of the separate areas can be specified at maximum by data of the extent start location and the number of extent blocks in one single descriptor-dedicated ER unit.

Figure 25:
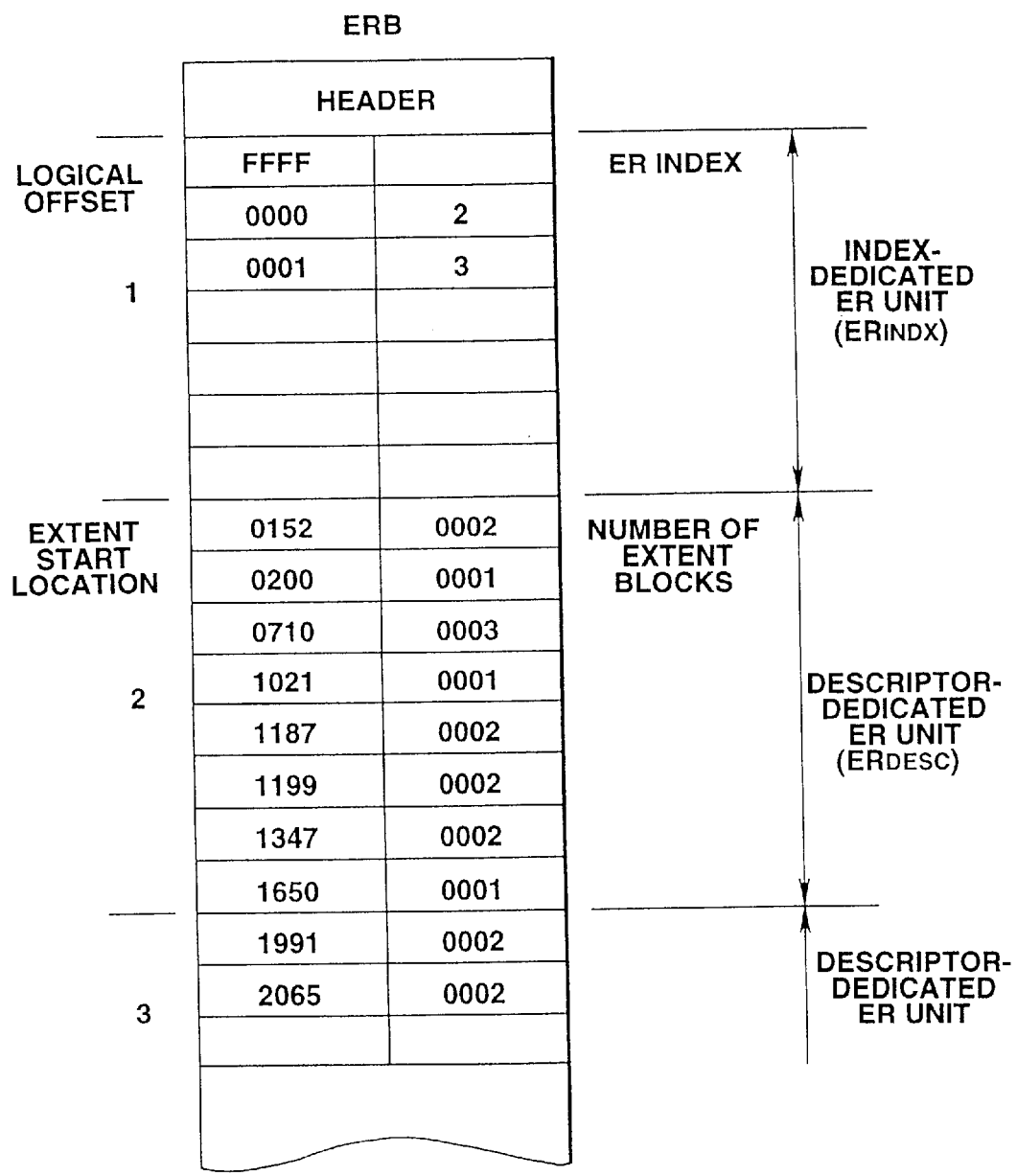
FIG. 25 is a diagram showing a structure of the ERB allocated in the management block.

More particularly, the first ER unit holds at its head a data of FFFF indicating that the current ER unit is an index-dedicated ER unit, as shown in FIG. 25. For specifying the first ER unit for constructing the super-high resolution image data file f9, 0000 of the logical offset is detected. In the index-dedicated ER unit, the ER index holds 2 when the logical offset is 0000. This means that the second ER unit is the first ER unit of the file f9.

Referring to the second ER unit (the descriptor-dedicated ER unit), the start location of a first separate area for saving the file f9 is denoted by 0152 of the allocation block number and the data length of the same is 0002 indicative of a number of the allocation blocks. Equally, this descriptor-dedicated ER unit holds data of the remaining separate areas, from second to eighth, in a succession.

Then, 0001 of the logical offset following 0000 is detected in the index-dedicated ER unit when the data in the descriptor-dedicated or second ER unit have been read. The ER index joined to 0001 of the logical offset is 3. This means the third ER unit follows the second ER unit. In the third ER unit (the descriptor-dedicated ER unit), there are saved the allocation block numbers indicating the start locations of ninth and tenth separate areas respectively and the numbers of allocation blocks indicating the data lengths of the same.

As explained, the descriptor-dedicated ER units of the ERB specify the locations of the allocation blocks in 10 separate recording areas. Even if one file is saved separately in different recording areas, the locations of the different areas can be identified by ERB data in the management blocks. This allows data of the file saved in the separate areas on the disk 20 to be accessed quickly and played back in a succession without searching the separate areas respectively.

According to the embodiment, the image file saved separately on the disk is a super-high resolution image data file having a data size of 18 clusters which may be too large to be stored in a given unrecorded area available on the disk thus requiring separate recording. The high resolution image data file may also be stored in separate recording areas if a recording space of 8 clusters is not available. When the recording space for saving data of 8 clusters continuously is available, both the super-high and high resolution image data files should be recorded in the unseparated, continuous space.

8. File Structure

Each of the prescribed files comprises a header and a data region. The data region may start with address data of a multiple of 4, giving priority to any upper byte when data consists of more than two bytes. The length of a data is expressed by a multiple of 4 excluding a fixed length code form of image data (but including the dummy data, 00h, applied for raster to block conversion of the low resolution image data). A string of letters is terminated with a null data (00h). An empty region may be provided between the header and the data region.

8-1 Structure of Header

The header comprises a plurality of tables which will now described in more details. The header starts with a format table indicative of a type of its file and multiple option tables for data of image processing follow in a succession. Each table has at its head address data of e.g. a multiple of 4. A distance between two adjacent tables is less than 256 bytes. It is also possible to have an empty space between any two adjacent tables.

More specifically, the header includes the format table (10h), a name table (11h), a comment table (12h), a disk ID table (14h), an image parameter table (20h), a record data table (21h), a color control parameter table (*22h* ), an option table (*90h* ), etc (a number in each parenthesis representing an ID mark of the table).

8-2 Format Table

The format table comprises, as shown in FIG. 26, a table ID (1 byte), a next table pointer (1 byte), a format version (2 bytes), a file type (1 byte), a file type version (1 byte), a total number of tables (1 byte), an empty region (reserved, 1 byte), a data start address (4 bytes), a data size (4 bytes), and an empty region (reserved, 4 bytes). All the data are saved in binary (B) format.

The file type of 1 byte is 00h for recording the overall data management file, 01h for the image data management file, 03h for the print data management file, 05h for the playback control management file, 10h for the image data file, 11h for the overall index file, and 12h for the image index filer. Also, it gives 30h, 32h, 33h, 34h, and 35h for recording a print data file, a telop data file, a keyword search data file, a time stamp search data file, and a playback control data file respectively.

8-3 Image Parameter Table

The image parameter table is saved in the header of each image file for recording a high or medium resolution image data file and includes in the form of parameters the image processing data for an original image data of the high or medium resolution level data file.

In the image recording/playback system of the embodiment, both the high and medium image data are produced from the original image read with its scanner or the like and saved in the form of high and medium resolution image data files respectively. The original image data itself has not been recorded onto the disk and is not present. The image parameter table saved in the header of each image file contains relevant image processing data indicative of the process of reading the original image of a high or medium resolution data file and the process of converting the original image into the high or medium resolution data file. Hence, when the image parameter table has been stored in the header of a file, its data remains unchanged and is not overwritten for saving the original image data.

The parameters of the image parameter table are, as shown in FIG. 27, 1 byte of table ID, 1 byte of next table pointer, 2 bytes of image size (in horizontal), 2 bytes of image size (in vertical), 1 byte of image component, 1 byte of matrix identity, 1 byte of wide ID, 1 byte of image data compressing rate, 1 byte of copy and edit right, and 1 byte of input device identity. The table also includes 3 bytes of empty region (reserved) and 1 byte of information whether the dummy data is present or not.

The image size represents a number of pixels of the image. The image component expresses 00h when a ratio of luminance (Y), chrominance (Cr), and color difference (Cb) is 4:2:0, 01h when orthogonal at 4:2:0, 10h when the ratio is 4:2:2, and 20h when orthogonal at 4:2:2. The orthogonal means that Y and C are identical to each other.

The matrix identity holds a (counter-clockwise) rotation data in image display. Its options are 00h for common display in a horizontal direction, 01h for displaying at an angle of 90 degrees to the horizontal, 02h for displaying at an angle of 180 degrees to the horizontal, and 03h for displaying in vertical or at an angle of 270 degrees to the horizontal. An option of FFh is undefined so far.

The parameter data all can be retrieved and displayed when requested. This allows the user to view and identify the relevant parameters when the parameter table being displayed on the monitor 9.

8-4 Overall Data Management File (First Management File)

The overall data management file is a management file for controlling comprehensively the data files in the PIC_MD directory.

The overall data management file consists of a header and a data region, as shown FIG. 28(*a*). The header comprises a format table (10h), a name table (11h), a comment table (12h), a disk ID table (14h), and an option table (90h).

The data region includes 2 bytes for the total number of images, 2 bytes for a next image directory number, 2 bytes for the total number of image directories, 1 byte for indicating the presence of a playback control directory, 1 byte for the number of playback control files, 1 byte for the number of print data files, and 1 byte for indicating the presence of a telop data file. Also, those are followed by 1 byte for indicating the presence of a search data file, 1 byte for an automatic start file number, 2 bytes for a last accessed image directory number, 2 bytes for a last accessed image number, 8 bytes for a password, 6 bytes for a narration language, 2 bytes for an empty region (reserved), and 48 bytes for N image directory data units (N being a number of the image directories). The data of bytes are saved in binary form.

The total number of images represents the number of images with a common resolution level (the medium resolution level) having an aspect ratio of 3:4. The next image directory number is the number of the last directory added by one. The number of image directories is expressed by N (the number of image directories). The presence of a telop data file is 00h if the telop data file is not present, and 01h when it is present.

The number of image directory data units composed of 48 bytes is stored in relation to the index images saved in the overall index file. The overall index file holds a set of the index images of the image directories selected one from each image directory by the user and arranged according the sequence of the image directories. As one index image is selected from each of the image directories, the number of the index images in the overall index file is N as identical to the number of the image directories.

The image directory data unit corresponds one of the index images saved in the overall index file. The number, e.g. m-th, of the image directory data unit is thus identical to the m-th index image saved in the overall index data file.

In other words, the image directory data units are saved identical in the number and sequence to those of the index images recorded in the overall index data file.

The image directory data unit comprises, as shown in FIG. 28(*b*), 2 bytes for a directory number, 2 bytes for an index image number, 2 bytes for the number of images in the directory, 1 byte for an index image individual data, 1 byte for a character identity code, 36 bytes for a directory name, and 4 bytes for an empty region. The data are saved in binary form excluding the directory name. The directory name is stored in ASCII code form (A). If the directory name is saved in the form of an ISO code, a JIS code, or other code than ASCII code form, its data type is expressed by C.

The directory number represents a number of the image directory in which the image file of the index image is saved. The index image number indicates a number of the image file corresponding to the index image. Upon the m-th index image in the overall index file being specified by the user, the m-th image directory data unit is accessed. As a corresponding directory number is read from the m-th image directory data unit, its directory is specified in which the desired index image is saved.

The index image individual data includes an index image display data, e.g. a rotation data, which is used for display the index image on the monitor.

8-6 Image Data Management File (Second Management File)

The image data management file is provided in each image directory for controlling the images saved in the directory.

The image data management file thus consists of a header and a data record, as shown in FIG. 29(*a*). Th e header includes a format table (10h), a name table (11h), a comment table (12h), a disk ID table (14h), and an option table (90h).

The data region comprises 1 byte for a link ID, 3 bytes for an empty region (reserved), 2 bytes for a next image number, 2 bytes for the number of images, 2 bytes for an empty region (reserved), 1 byte for the number of image index files, 1 byte for a next image index file number, 4×256 bytes for an index file data, and 16 bytes for N image data units (the number of images). The data of bytes are saved in binary form.

The number of images represents the total number (N) of images saved in the image directory. The index file data holds data arranged in a sequence of display and may consist of 256 entries regardless of the number of existing index files.

The image data unit is 16 bytes and recorded corresponding to the index image saved in the image index file explained below.

The image index file holds in a sequence of display a set of the index images indicative of all the image files stored in the image directory. Hence, the image index file has N index images identical in the number to N images saved in the directory.

Also, the image data unit corresponds one of the index images saved in the image index file. The number, e.g. m-th, of the image data unit is thus identical to the m-th index image saved in the image index data file.

In other words, the image data units are saved identical in the number and sequence to those of the index images recorded in the image index file.

The image data unit comprises, as shown in FIG. 29(*b*), 2 bytes for a directory number, 2 bytes for an image number, 1 byte for an image type data, 1 byte for an image individual data, 1 byte for a link number, 1 byte for a narration data, 2 bytes for a keyword search data number, 2 bytes for a time stamp search data number, 2 bytes for a telop number, and 2 bytes for an empty region (reserved). The data are all saved in binary form.

The directory number represents a number of the image directory in which the image file of the index image is saved. The image number indicates a number of the image file corresponding to the index image. Upon the m-th index image in the image index file being specified by the user, the m-th image data unit is accessed. As a corresponding directory number is read from the m-th image data unit, its directory is specified in which the desired index image is saved. Also, the image number tells the location of the image file in the image directory.

The image individual data holds data of its type including PSN of medium resolution level data file and PHP of high resolution level data file. When the high or medium resolution image data file is desired for the index image, the image individual data determines (the first three letters of) a file name.

8-7 Print Data Management File

The print data management file consists of a header and a data record, as shown in FIG. 30. The header includes a format table (10h), a name table (11h), a comment table (12h), and an option table (90h).

The data record comprises 1 byte for a next print data file number, 1 byte for the number of print data files, 2 bytes for an empty region (reserved), and 4×N bytes for print data file management information.

The next print data file number represents the number of the final print data file added by one. The number of print data files represents the total number of the print data files and the print data file management information indicates the number of print data files involved.

The print data file management information comprises, as shown in FIG. 30(b), 1 byte for a print data file number, 1 byte for a print execution ID, and 2 bytes for an empty region (reserved). The print data file number is a number of the print data file. The print execution ID represents 00h when no printing action is perform and 01h when printing is required.

8-8 Image Data File

Figure 31:
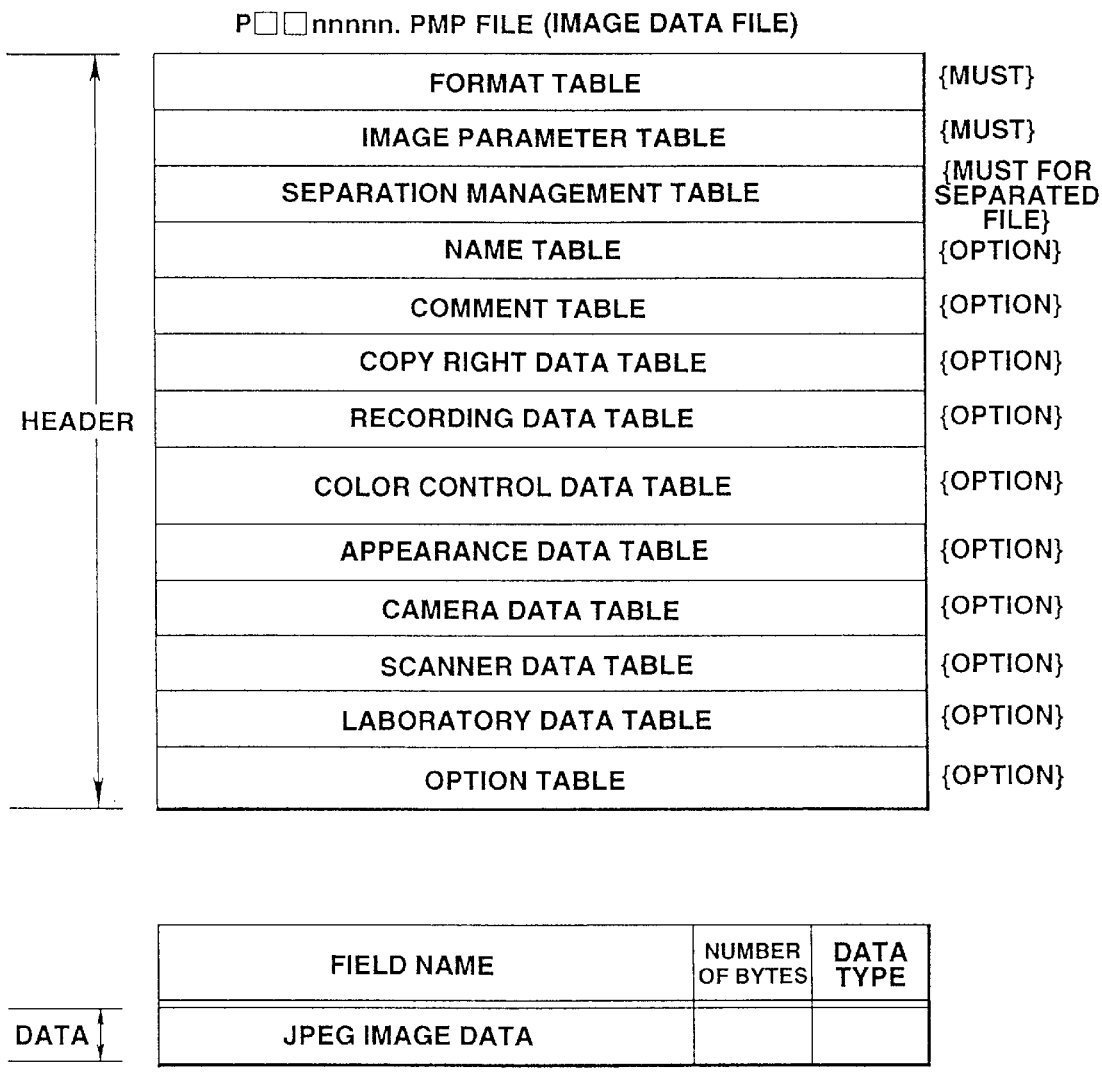
FIG. 31 is a diagram explaining an image data file in the multi-level directory structure.

The image data file consists of a header and a data record, as shown in FIG. 31. The header includes a format table, an image parameter table, a separate management table, a name table, a comment table, a copy right information table, a recording date table, a color control information table, an aberrance information table, a camera information table, a scanner information table, a laboratory information table, and an option table. The format table and the image parameter table are strictly essential for constituting the system while the other tables may be optional.

A data in each table is image processing information including various conditions in converting the original image into a high or medium resolution level image data. The image processing information in the tables thus remains unchanged and never overwritten during a common recording or playback action mode.

The data record of the image data file holds a fixed length code form of the high or medium resolution image data.

8-9 Overall Index File

The overall index file holds a set of index images selected by the user one from each image directory and stored in an order for monitor display. The number of the index images saved in the overall index file is identical to the number of the image directories.

The overall index file is a collection of index image data (of the low resolution level) and has no header. The number of the index images is specified by the number of directories in the overall data management file. The index images are indexed by the order of the management files.

More particularly, the overall index file comprises a plurality of index image data regions, numbered 0 to N, each having a size of 4096 bytes, as shown in FIG. 32(a). The index image data region consists of a header and a data record, as shown in FIG. 32(b). The header has a format table followed by an empty region where any user data can be stored. The data record holds the index image data (of the low resolution level) and also includes an empty region after the index image data.

8-10 Image Index File

The image index file holds a set of the index images indexing all the image files saved in the image directory. The number of the index images saved in the image index file is thus identical to the total number, N, of images in the image directory.

The image index file is a collection of index image data (of the low resolution level) and has no header, as shown in FIG. 33(a). Each image index data includes a header. The number of the image index data in the image index file is specified by the number of directories saved in the overall data management file. Also, the index images are indexed by the order of the management files.

More specifically, each the index image data comprises the header which consists of a format table and an empty region, and a data record which incorporates a fixed length code form of the low resolution image data and an empty region. A sum of the header size and the low resolution image data may be 4096 bytes. The header size is 256 bytes including its empty region.

8-11 Print Data File

Figure 34:
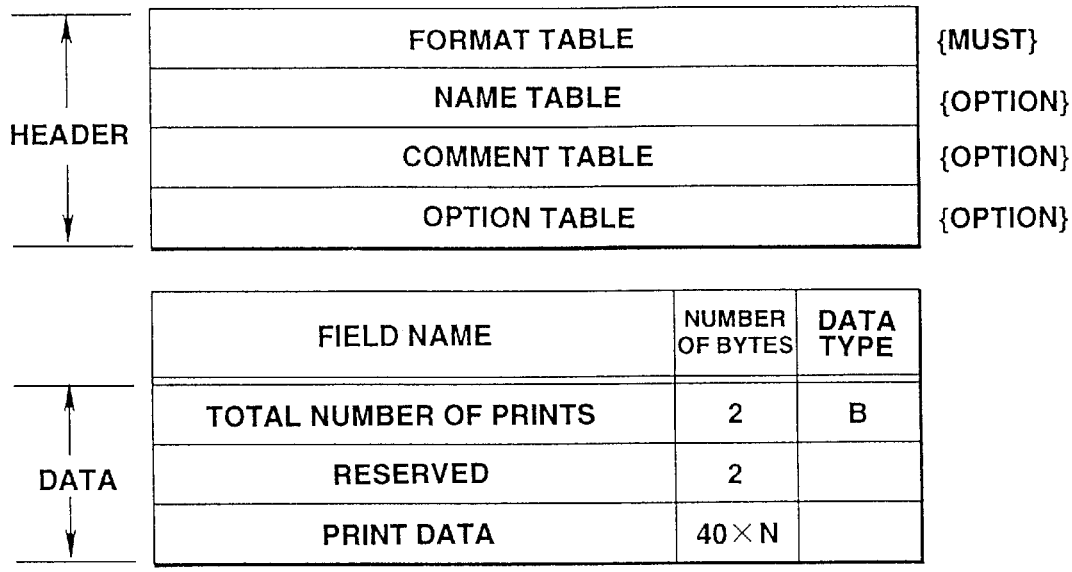
FIG. 34(a)–FIG. 34(b) are a diagram explaining a print data file in the multi-level directory structure.

The print data file consists of a header and a data record as shown in FIG. 34(a). The header includes a format table, a name table, a comment table, and an option table. The data record comprises 2 bytes for the number of prints, 2 bytes for an empty region (reserved), and 40×N bytes for print data.

The number of prints represents the total number of images to be printed. The print data has a size of 40 bytes by the number of prints. The data are saved in binary form.

More particularly, the print data is based on 2 bytes for an image directory number, 2 bytes for an image number, 1 byte for an image type, and 2 bytes for the number of copies. The number of copies represents a number of copies of the image to be printed.

9. Recording Action

Figure 35:
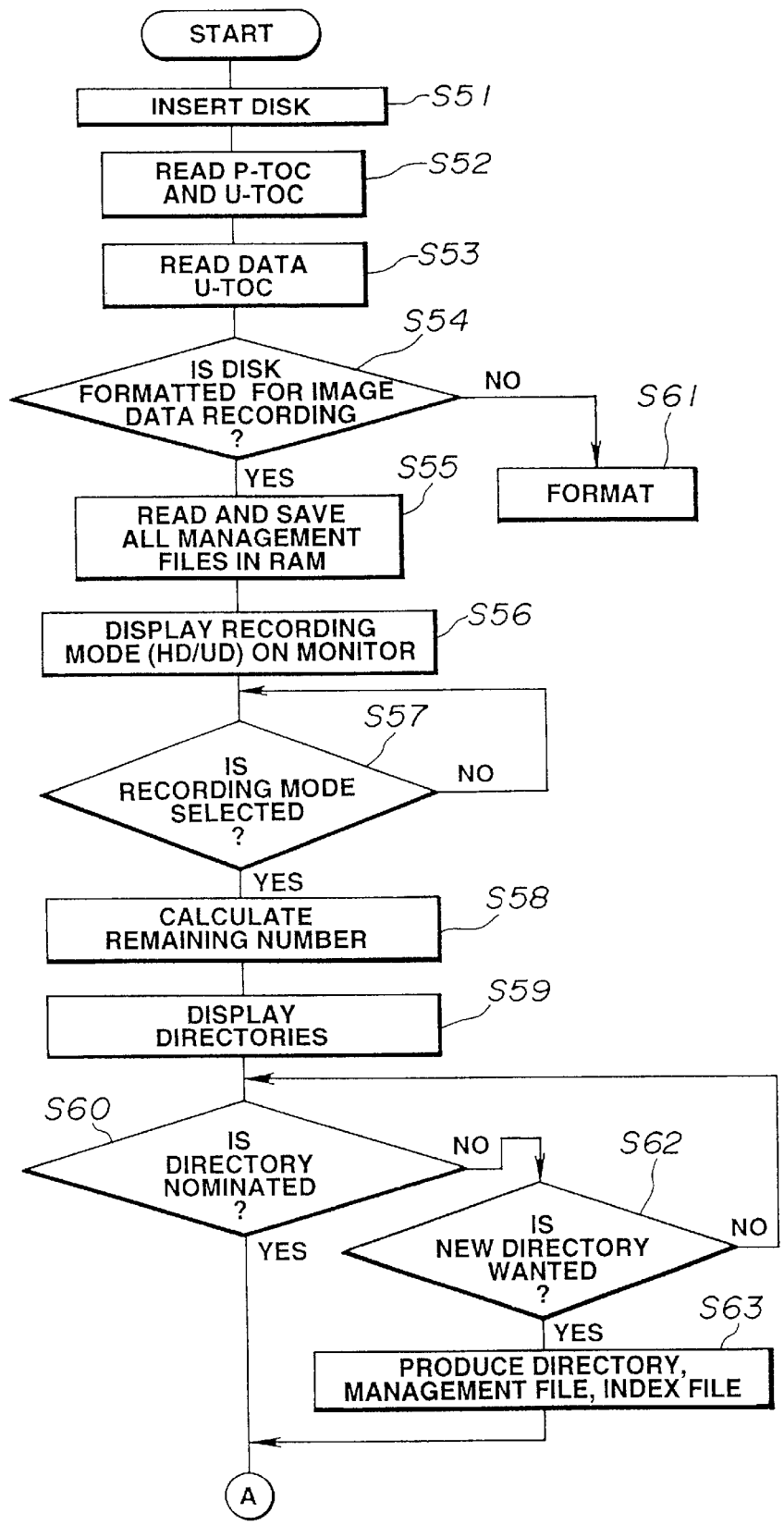
FIG. 35 is a flow chart explaining a first half of the recording action of the still image recording/playback system.

The recording action will now be described in conjunction with the above explained multi-level directory structure and the file structure. The recording action is shown in a flowchart of FIGS. 35 and 36. As shown in FIG. 35, the procedure of the recording action starts with the storage 5 turned to its standby state by the user switching on the power key 31 shown in FIG. 8. The procedure then moves to Step S51.

At Step S51, the optical disk 20 is loaded by the user through the disk insert inlet 30 shown in FIG. 8 and Step S52 follows. The optical disk 20 loaded through the disk insert inlet 30 is placed in the storage 5 enabling the recording of an image data.

At Step S52, the system controller 6 directs the storage controller 5d shown in FIG. 6 to activate the disk recording/playback device 5c for reading P-TOC and U-TOC from the optical disk 20. P-TOC and U-TOC are transmitted to the system controller 6 shown in FIG. 1. The system controller 6 upon receiving P-TOC and U-TOC examines whether the data U-TOC is present or not and if yes, detects the location of the data U-TOC on the disk. In fact, the data U-TOC is not eligible for handling the recording area where a data file is saved. When detecting the data file, the system controller 6 judges that the data U-TOC is present in the head of the data file. This is followed by Step S53.

Figures 13A, 13B, 13C:
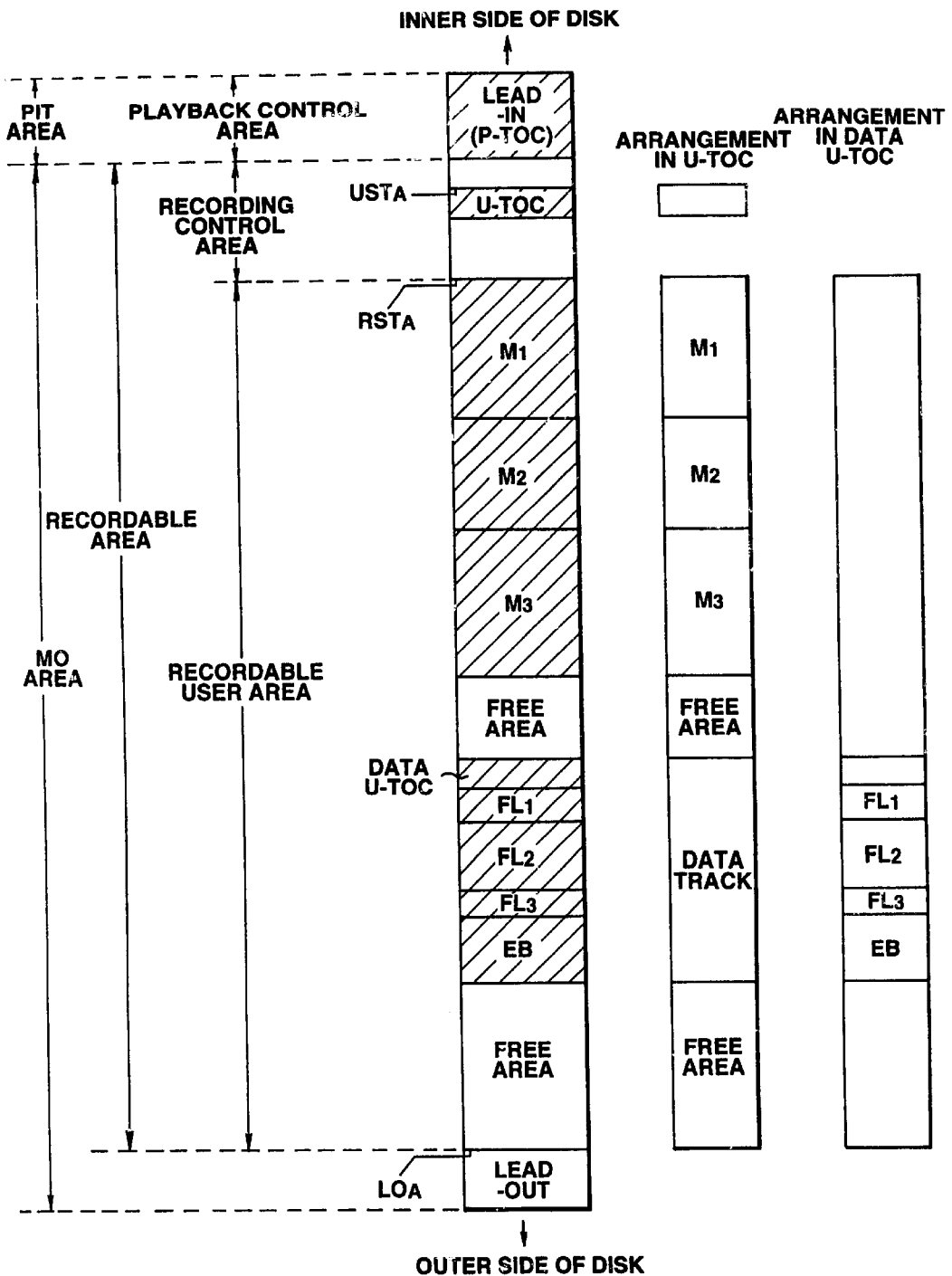
FIG. 13(a), FIG. 13(b) FIG. 13(c) are a diagram explaining a data structure of the image data stored on the optical disk.

At Step S53, the system controller 6 causes the storage controller 5d to activate the disk recording/playback device 5c for reading the data U-TOC, shown in FIG. 13(a), from the optical disk 20. The data U-TOC is transmitted to the RAM 6a of the system controller 6. The system controller 6 retrieves the data U-TOC saved temporarily in the RAM 6a to identify the locations of the image directories and files. This is followed by Step S54. The procedure of searching the location of a recorded file will be described later in the section of Description of search action.

At Step S54, the system controller 6 examines the data U-TOC from the RAM 6a whether or not the directory (PIC_MD) and overall data management file are included to establish a format on the optical disk 20 suited for image data recording. If not, the optical disk 20 is formatted and the procedure of this routine is terminated giving a standby state for awaiting for a fresh command of recording. If it is judged yes, the procedure goes to Step S55.

At Step S55, the system controller 6 directs the storage controller 5d to activate the disk recording/playback device 5c for retrieving all the management files and saves them temporarily in its RAM 6a. Then, Step S56 follows.

At Step S56, the system controller 6 drives the monitor 9 to display a screen for selecting a desired recording mode to record image data. More particularly, the selection screen on the monitor 9 provides two options; an HD recording mode for recording a high definition image of 1024×1536 pixels and a UD recording mode for recording a super-high definition image of 2048×3072 pixels.

As described, the medium resolution image data is recorded in a fixed length mode of two clusters. It is also possible to add another recording mode for storing the medium resolution image data in a one-cluster fixed length form. This allows the user to select from the two, one-cluster and two-cluster, fixed length code recording modes. When the two-cluster fixed length recording mode is selected, the medium resolution image data is saved at a higher definition rate. When the one-cluster fixed length recording mode is selected, the medium resolution image data is recorded at a not higher definition rate but increased in the number of recorded images.

At Step S57, the system controller 6 examines the action of the operating module 10 whether any of the HD and UD recording modes is selected or not. If not, Step S57 is repeated until the selection is made. When it is judged yes, the procedure advances to Step S58.

At Step S58, the system controller 6 calculates a number of images recordable in the hD or UD recording mode through examining the number of recorded images (of the medium resolution level) saved in the overall data management file and the number and type of images to be recorded saved in the image data management file from the RAM 6s.

More specifically, the optical disk 20 has a recording space of up to 200 images comprising a combination of the 2-cluster medium resolution image data and the 8-cluster high resolution image data, or up to 100 images comprising a combination of the 2-cluster medium resolution image data and the 18-cluster super-high resolution image data. When the number of recorded images is subtracted from the entire recording space of the optical disk 20, an available size is given for storing the images in either the HD or UD recording mode.

At Step S59, the system controller 6 reads the image directory data units in the overall management file from the RAM 6a and directs the monitor 9 to display their contents including a directory name, a directory number, and a number of images in the directory. This is followed by Step S60.

At Step S60, the system controller 6 examines the action of the operating module 10 whether or not the image directory is demanded by the user. If not, Step S62 follows. When it is judged yes, the procedure moves to Step S71 shown in FIG. 36.

At Step S62, with the image directory being not demanded, the system controller 6 examines again the action of the operating module 10 whether creation of a new image directory other than the existing image directory is requested or not. If not, Steps S60 and S62 are repeated until the creation of a new image directory is demanded. If it is judged yes, the procedure goes to Step S63.

At Step S63, the system controller 6 upon receiving a demand for creating a new image directory gives a number to the new image directory through reviewing the existing image directory numbers in the overall data management file, and builds an image data management file and an image index file in the new image directory. This is followed by Step S71 shown in FIG. 36.

Figure 36:
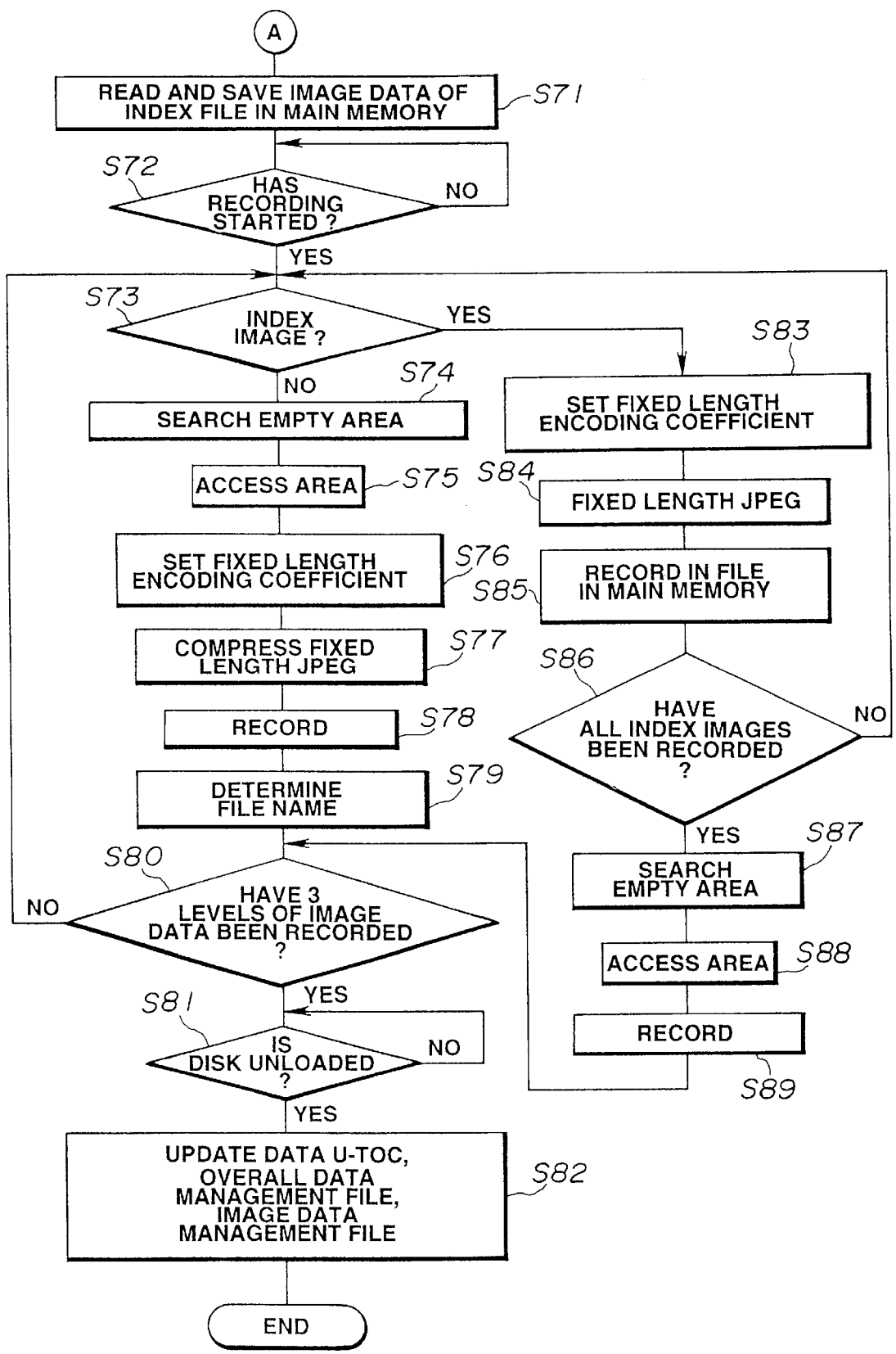
FIG. 36 is a flow chart explaining a second half of the recording action of the still image recording/playback system.

At Step S71 shown in FIG. 36, the system controller 6 directs the storage controller 5d to activate the disk recording/playback device 5c for reading all the image data from the index file in the selected image directory and transmits the image data to the main memory 11 shown in FIG. 4. Then, the procedure goes to Step S72. The image data retrieved from the index file has a fixed length code form accompanied with a header and is directly imparted to the main memory 11a without being expansion decoded. If the index file contains no image data, the main memory 11a receives none.

At Step S72, the system controller 6 examines the action of the operating module 10 whether a command of starting the recording action is given or not by the user. If not, Step S72 is repeated until the start command is entered. When it is judged yes, the procedure goes to Step S73.

At Step S73, the system controller 6 examines whether or not the data to be recorded is of an index image or not. If not, the procedure moves to Step S74 and when yes, to Step S83.

At Step S83, a signal indicating the data to be recorded is of the index image is supplied to the decimation/compression/expansion controller 4i shown in FIG. 5. The decimation/compression/expansion controller 4i upon receiving the signal imparts the fixed length encoding coefficient for the index image to the compression/expansion circuit 4h. Then, Step S84 follows.

At Step S84, the decimation/compression/expansion controller 4i directs the compression/expansion circuit 4h to carry out a compression encoding process of the ¼ decimated image data with the fixed length encoding coefficient to yield a 1/15-cluster fixed length code form of the image data. This is followed by Step S85.

At Step S85, the system controller 6 drives the memory controller 13 to add a header to and record the index image of 4096 bytes in the index file saved in the main memory 11a shown in FIG. 4. This is followed by Step S86.

At Step S86, the system controller 6 examines whether or not all the index images have been stored in the main memory 11a. If not, the procedure moves back to Step S73 and when yes, it goes to Step S87.

At Step S87, the system controller 6 detects an unrecorded area by recognizing 00 (a code representing an available allocation block) of the 2-bit entry of the allocation block number in the volume space bit map VSB of the data U-TOC saved in the RAM 6a. This is followed by Step S88.

At Step S88, the system controller 6 directs the storage controller 5d to activate the disk recording/playback device 5c for accessing the unrecorded area on the optical disk 20. Then, Step S89 follows.

At Step S89, the system controller 6 directs the storage controller 5d to activate the disk recording/playback device 5c for recording the index file including the index images on to the unrecorded area of the optical disk 20. The procedure goes to Step S80.

For recording a number of the index images of the fixed length code form on the optical disk 20, the index images are temporarily stored in a given sequence in the main memory 11a before recorded on the optical disk 20. This allows the number of the index images to constitute one index file in the main memory 11a which is then recorded in a physically continuous recording area of the optical disk 20.

As prescribed, the image has a $1/15$-cluster fixed length code form. For storing the $1/15$-cluster fixed length code form of the image data on the optical disk 20, each $1/15$-cluster of the code form has to be accompanied with a dummy data of $14/15$-cluster length to yield one cluster length. If the index image of the $1/15$-cluster code form is directly recorded on the optical disk 20, the recording space is needed more for storing the dummy data than for storing the index image data. Hence, the recording space of the optical disk 20 will hardly be used at efficiency.

In the still image recording/playback system of the present invention, data of the index images is temporarily saved in the main memory 11a in the form of an index file. After completion of saving all the index image data, the index file of the index images is retrieved from the main memory 11a and stored on the optical disk 20. It is assumed that an index file having 25 index images is to be recorded. 15 of the 25 index images (15×$1/15$-cluster) is saved in one cluster size region while 10 of the same (10×$1/15$-cluster) and a dummy data of $5/15$-cluster are saved in another cluster size region. This allows the amount of the dummy data recorded on the disk to be decreased considerably, contributing to the efficient use of the recording space of the optical disk 20.

Also, the still image recording/playback system of the present invention allows data of the index images to be temporarily saved in the main memory 11a in the form of an index file which is then recorded in a physically continuous recording area of the optical disk. Thereby, the index file stored on the disk remains continuous without a break. The index file on the optical disk 20 can thus be read at a higher speed.

For adding another index image to the index file, the index image data in the index file is first read and transferred to the main memory 11a. After the dummy data joined to the last index image saved in the file is deleted, the additional index image is stored in an area next to the last index image in the index file (this process is unnecessary if the dummy data is not present).

When not is given at Step S73, the procedure goes to Step S74 where the system controller 6 seeks an unrecorded area on the optical disk 20 for storing the medium or high resolution image data. This is followed by Step S75.

More particularly, the system controller 6 detects the unrecorded area by identifying 00 (a code representing an available allocation block) of the 2-bit entry of the allocation block number in the volume space bit map VSB of the data U-TOC saved in the RAM 6a.

At Step S75, the system controller 6 directs the storage controller 5d to activate the disk recording/playback device 5c for accessing an optimum one of the unrecorded areas detected at Step S74.

Most preferably, the optical recording area is located after the (last) recorded file of the same directory stored on the disk and also has a physically continuous area size (several clusters) suited for recording the current image data.

There is a case that the image data is great in size, e.g. (8-cluster) high resolution image data or (18-cluster) super-high resolution image data, and the recording space available on the optical disk 20 is too small to spare any physically continuous unrecorded area after the last recorded image file. In that case, an extent record block ERB is produced in the management block and used for linking two or more separate unrecorded areas to store the entire file.

At Step S76, the system controller 6 directs the decimation/compression/expansion controller 4i to determine a fixed length encoding coefficient for 8-cluster high resolution image data or 18-cluster super-high resolution image data. Step S77 follows.

At Step S77, the decimation/compression/expansion controller 4i drives the compression/expansion circuit 4h to produce an 8-cluster high resolution image data or 18-cluster super-high resolution image data with the fixed length encoding coefficient. This is followed by Step S78.

At Step S78, the system controller 6 directs the storage controller 5d to activate the disk recording/playback device 5c for recording the image data of a fixed length code form on the optimum recording area of the optical disk 20. The procedure then moves to Step S79.

At Step S79, the system controller 6 upon saving the image data determines a file name of the image data according to its resolution level as well as data of the image data management file in the image directory. This is followed by Step S80.

In particular, the process of recording six, first to sixth, images scanned from a negative film into the image directory PIC00001 in the HD recording mode will now be explained.

Prior to the recording, it is clarified from the image data management file in the RAM 6a that no image is saved in the HD recording mode. The high resolution level (HD) of the first image is expressed by PHP00000.PMP and the medium resolution level (SD) is PSN00000.PMP. As the first to sixth images have been saved, their files PHP00000.PMP to PHP00005.PMP of the high resolution level and PSN00000.PMP to PSN0005.PMP of the medium resolution level are created.

The process of recording index images of the six images is then involved. The six index images are allocated in a sequence to PIDX000.PMX saved in the RAM 6a and no new index file is produced. However, if the number of index images saved in the first index file exceeds a predetermined number (e.g. 25), the second index file is created e.g. PIDX001.PMX.

At Step S80, the system controller 6 examines whether the three, high (or super-high), medium, and low (for index image), resolution levels of the image data all have been stored or not. If not, the procedure goes back to Step S73 for saving the image data of not recorded resolution level. When it is judged yes, the procedure advances to Step S81.

At Step S81, the system controller 6 examines whether the eject key 32 of the operating module 10 is activated or not. If not, Step S81 is repeated. When it is judged yes, the procedure goes to Step S82.

At Step S82, the system controller 6 updates the data U-TOC, overall data management file, and image data management file stored on the disk with data of the data U-TOC, overall data management file, and image data management file saved in the RAM 6a. Then, the procedure of start routine steps shown in FIGS. 35 and 36 is terminated.

In other words, the volume descriptor (VD), volume spaced bit map (VSB), management table (MT), directory record block (DRB), and extent record block (ERB) in U-TOC are substantially overwritten.

In the VD, replaced are contents of the allocation block data (recordable allocation block data), the number of directories (when creation of a new directory is requested), the number of files, the DRB data (when a new directory or file is produced), and the ERB data (when a new file is stored in physically separated recording areas which are linked to one another by ERB).

In the VSB, the two-bit codes representing the allocation block attributes are rewritten.

In the MT, new entries are added when the DRB and ERB are increased in number. Addition of one directory record unit to the existing DRB does not require the updating of MT data.

In the DRB, one directory-dedicated directory record unit is added when a new directory is created. Similarly, one file-dedicated directory record unit is added when a new file is produced.

The ERB is rewritten when the file is specified by the DRB and saved in physically separated recording areas. During the formatting, this is not involved.

For the updating, the total number of images, next image directory number, number of directories, and image directory data unit in the overall data management file are mainly overwritten. When a new image directory is created, the image directory data units are increased by one.

When a new image directory is established, its image data management file is also created. Accordingly, the number of images, number of image index files, next image index file number, index file data, and image data unit are substantially updated. The index file data is updated when a new index file is produced. The number of indexes is updated when the number of indexes in the index file is increased. The image data units are attributed to their respective index images and are increased by a number corresponding to added images. In a routine action, the data in the image data unit is not updated. The updating is made in case that an order of the index images is changed and their image numbers are altered.

10. Description of Other Recording Action

Another procedure of recording the image data of different resolution levels will be described referring to a flow chart shown in FIG. 37. The flow chart of FIG. 37 starts upon the procedure of Steps S35 to S63 shown in FIG. 35 being completed. Step S91 follows where the system controller 6 reads all the image data from the index file of a desired image directory. At Step S92, a demand of starting the recording from the user is fed to the system controller 6. Then, the procedure goes to Step S93.

Figure 37:
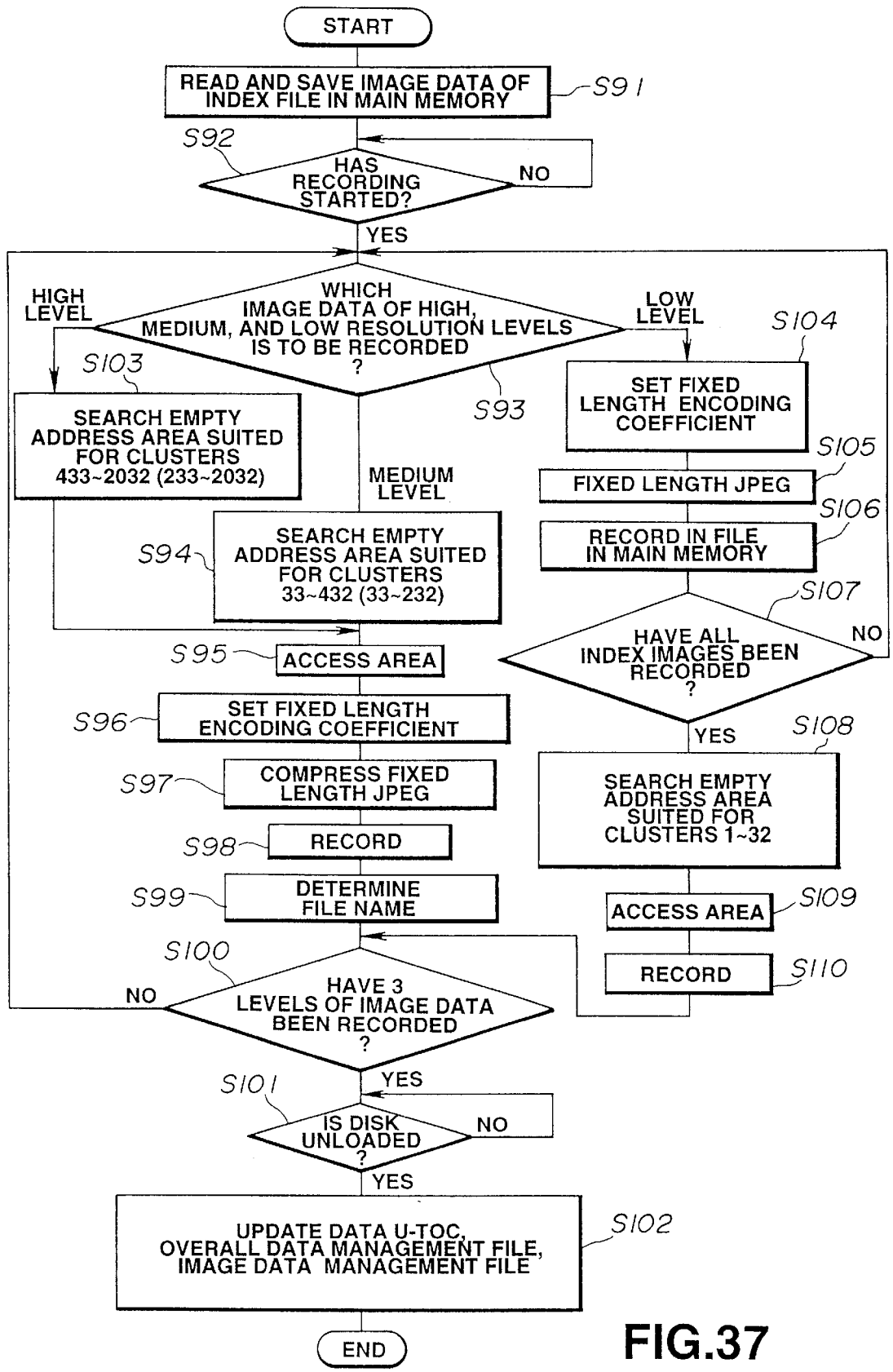
FIG. 37 is a flow chart explaining actions of recording the different resolution levels of the image data in the still image recording/playback system.

Steps S91 and S92 of FIG. 37 are identical to Steps S71 and S72 of FIG. 36.

At Step S93, the system controller 6 examines whether the image data to be recorded is of the high resolution level (HD or UD), medium resolution level (SD), or low resolution level (for index image). When it is judged that the image data is of the low resolution level, the procedure goes to Step S104. When of the medium resolution level, the procedure moves to Step S94. When of the high resolution level, the procedure advanced to Step S103.

When it is judged at Step S93 that the low resolution image data is to be recorded, the procedure goes to Steps S104 and S110 which are identical to Steps S83 to S89 of FIG. 36.

At Step S104, the system controller 6 transmits a signal indicating that the image data to be recorded is of index image to the decimation/compression/expansion controller 4i shown in FIG. 5. The decimation/compression/expansion controller 4i upon receiving the signal calculates and imparts a fixed length encoding coefficient for index image to the compression/expansion circuit 4h. This is followed by Step S105.

At Step S105, the system controller 6 directs the decimation/compression/expansion controller 4i to activate the compression/expansion circuit 4h for conducting a compression encoding process of the ¼ decimated image data with the fixed length encoding coefficient to yield a 1/15-cluster fixed length code form of the index image. This is followed by Step S106.

At Step S106, the system controller 6 drives the memory controller 13 to add a header to and record the index image of 4096 bytes in the index file saved in the main memory 11a shown in FIG. 4. Then, Step S107 follows.

At Step S107, the system controller 6 examines whether or not all the index images have been stored in the main memory 11a. If not, the procedure moves back to Step S93 and when yes, it goes to Step S108.

At Step S108, the system controller 6 detects an unrecorded area by recognizing 00 (a code representing an available allocation block) of the 2-bit entry of the allocation block number in the volume space bit map VSB of the data U-TOC saved in the RAM 6a. This is followed by Step S109.

At Step S109, the system controller 6 directs the storage controller 5d to activate the disk recording/playback device 5c for accessing the unrecorded area on the optical disk 20. Then, Step S110 follows.

At Step S110, the system controller 6 directs the storage controller 5d to activate the disk recording/playback device 5c for recording the index image on to the unrecorded area of the optical disk 20. The procedure goes to Step S100.

Detected are the unrecorded area for storing the low resolution image data at Step S108, an unrecorded area for the medium resolution image data at Step S94, and an unrecorded area for the high (or super-high) resolution image data at Step S103 respectively. For detecting the unrecorded areas, 00 (a code representing an available allocation block) of the 2-bit entry of the allocation block number in the volume space bit map VSB of the data U-TOC saved in the RAM 6a is searched. At the time, the address to be sought for each resolution level has to be specified.

In common recording of the low resolution image data (Step S108), the HD recording mode allows up to 200 index images to be stored. In any of the HD and UD recording modes, the index image has a 1/15-cluster fixed length code form. Therefore, the area required for recording the index image is calculated from 200 times 1/15-cluster equaling 13.33 clusters. If the image directories are increased in number, they may allows one or two index images for each directory to be saved. The image directories are registered 20 at maximum and their index images are proportionally increased in number. The space for recording the index images is thus increased to at least 32 clusters of a size. Accordingly, the system controller 6 first searches allocation block codes defined by the addresses of 32, first to thirty-second, clusters from the innermost of the disk before starting the detection of unrecorded areas. No other available areas are accessed at the time.

Also in recording of the medium resolution image data (Step S94), the HD recording mode allows up to 200 images to be stored. As the medium resolution (SD) image data is based on a two-cluster fixed length unit, the space required for recording the medium resolution image data is calculated from 200×2=400 clusters. Accordingly, the system controller 6 searches allocation block codes defined by the addresses of 400 clusters after the index image clusters (1 to 32), i.e. the thirty-third to four-hundred-thirty-second clusters from the innermost of the disk, to identify the locations of unrecorded areas. This is followed by the Step S95.

The UD recording mode allows up to 100 medium resolution images to be stored while the medium resolution (SD) image data is based on the two-cluster fixed length unit. Hence, the space required for recording the medium resolution image data is calculated from 100×2=200 clusters. Accordingly, the system controller 6 searches allocation block codes defined by the addresses of 200 clusters after the index image clusters (1 to 32), i.e. the 33rd to 232nd clusters from the innermost of the disk, to identify the locations of unrecorded areas. This is also followed by the Step S95.

Furthermore in recording of the high and super-high resolution image data (Step S103), the HD recording mode allows up to 200 images to be stored. As the high resolution image data is based on an eight-cluster fixed length unit, the space required for recording the high resolution image data is calculated from 200×8=1600 clusters. Accordingly, the system controller 6 searches allocation block codes defined by the addresses of 1600 clusters after the index image clusters (1 to 32) and the medium resolution image clusters (33 to 432), i.e. the 433rd to 2032nd clusters from the innerside of the disk, to identify the locations of unrecorded areas. Then, Step S95 follows.

The UD recording mode allows up to 100 images to be stored while the super-high resolution image data is based on the 18-cluster fixed length unit. Hence, the space required for recording the super-high resolution image data is calculated from 100×18=1800 clusters. Accordingly, the system controller 6 searches allocation block codes defined by the addresses of 1800 clusters after the index image clusters (1 to 32) and the medium resolution image clusters (33 to 232), i.e. the 233rd to 2032nd clusters from the innerside of the disk, to identify the locations of unrecorded areas. This is followed by the Step S95.

As the searching of unrecorded areas is completed, the procedure goes to Step S95 where the system controller 6 storage controller 5d to activate the disk recording/playback device 5c for accessing optimum one of the unrecorded areas detected. This is followed by Step S96. The optimum recording area is determined with no relation to the directory and may be any first accessed area. As an available recording area is found, it is filled with the data. As the result, the data is saved from the front of each unrecorded area.

At Step S96, the system controller 6 drives the decimation/compression/expansion controller 4i to determine a fixed length encoding coefficient for high or super-high resolution image data. This is followed by Step S97.

At Step S97, the system controller 6 directs the decimation/compression/expansion controller 4i to activate the compression/expansion circuit 4h for producing an 8-cluster high resolution image data or 18-cluster super-high resolution image data with the fixed length encoding coefficient. This is followed by Step S98.

At Step S98, the system controller 6 directs the storage controller 5d to activate the disk recording/playback device 5c for recording the image data of a fixed length code form on the optimum recording area of the optical disk 20. The procedure then moves to Step S99.

At Step S99, the system controller 6 upon saving the image data determines a file name of the image data according to its resolution level as well as data of the image data management file in the image directory. This is followed by Step S100.

At Step S100, the system controller 6 examines whether the three, high (or super-high), medium, and low (for index image), resolution levels of the image data all have been stored or not. If not, the procedure goes back to Step S93 for saving the image data of not recorded resolution level. When it is judged yes, the procedure advances to Step S101.

At Step S101, the system controller 6 examines whether the eject key 32 of the operating module 10 is activated or not. If not, Step S101 is repeated. When it is judged yes, the procedure goes to Step S102.

At Step S102, the system controller 6 updates the data U-TOC, overall data management file, and image data management file stored on the disk with data of the data U-TOC, overall data management file, and image data management file saved in the RAM 6a. Then, the procedure of routine recording steps shown in FIG. 37 is terminated.

Steps S95 to S102 of this procedure are identical to Steps S75 to S82 shown in FIG. 36.

In this procedure of recording the image data, the addresses of the allocation blocks in the VSB saved in the RAM 6a are examined to determine the recording locations of the low, medium, and high (or super-high) resolution levels of the image data. In other words, the recording space on the disk is separated by assigning the addresses read from the VSB in the RAM 6a.

For example, the recordable locations on the disk may physically be identified before recording. However, the area size (for the medium and high resolution image data) is varied between the HD recording mode and the UD recording mode. It is thus needed to spare as a large area as predicted. More specifically, there is requested a size of 400 clusters for recording the medium resolution image data in the HD mode or 1800 clusters for storing the high resolution image data in the UD mode. This will decline the efficient use of a given recording space.

Although the addresses are designated in the order of, from the innermost of the disk, index data, medium resolution level data, and high resolution level data in the above description, a reverse order, from the outermost of the disk, index data, medium resolution level data, and high resolution level data may be used as well as any order depending on the design for application.

11. Process of Recording Album Name or Like

The album is designated as one image directory assigned in a lower level of the directory. In the still image recording/playback system of the embodiment, the process of recording the image data of different resolution levels is followed by entry of an album name, an image title in each album, a keyword for searching a desired image, and a disk name.

The entry action starts with the write key 53 of the operating module 10 being switched on by the user. The system controller 6 upon detecting the switching-on of the write key 53 activates a write mode for entering the data of characters.

This allows the user to operate the up, down, left, and right keys 54. In response to the activation of the up, down, left, and right keys 54, the system controller 6 drives the display 26 to display in a sequence a group of options including an album name, an image title, a keyword, and a disk name. The user selects one of the options displayed on the display 26 and hits the EXEC key 55 of the operating module 10 for entering the selected option. The system controller 6 then recognizes the entry of the option.

This is followed by operation of the ten-key pad of the operating module 10. Corresponding to a series of the activations of the ten-key pad, the system controller 6 shows a set of characters on the display 26. When the characters on the display 26 represents a desired item, e.g. an album name, their data is loaded by the user hitting the EXEC key 55.

The system controller 6 upon detecting the reactivation of the EXEC key 55 terminates the write mode and directs the disk recording/playback device 5c to record the entered data of e.g. an album name, as an ASCII code form on the optical disk 20.

More specifically, for storing a desired image name, the user turns on the write key 53 to shift the system controller 6 to the write mode and operates the up, down, left, and right keys 54 to select and display an option of the image name before entering it with the ten-key pad 50. The system controller 6 converts the entered image name to an ASCII code form which is loaded to the disk recording/playback device 5c. Finally, the disk recording/playback device 5c records the ASCII code form of the image name on to the optical disk 20.

The image name may be expressed by 16 letters and the album name may be by 32 letters. The letters are selected from alphabets, Japanese Katakanas, Chinese characters, and other symbols. Displayed on one screen are up to 432 letters (16 letter×25 images plus 32 letters of an album name).

12. Description of Playback Action

The procedure of playing back the image data from the optical disk 20 and displaying it on the monitor 9 in the still image recording/playback system of the present invention will be described.

The procedure starts with the album key 33 of the operating module 10 being switched on by the user. In response to the switching on of the album key 33, the system controller 6 directs the disk recording/playback device 5c and the display 26 to reproduce and display album data respectively. As the optical disk 20 carries 4 albums, the activation of the album key 33 allows display of each of the 4 albums on the display 26.

The user then selects a desired one out of the 4 albums and hits the first index key 38a. In response to the activation of the first index key 38a, the system controller 6 directs the disk recording/playback device 5c to play back low resolution image data for index display and ASCII code form (of album name data and image name data) of the selected album.

One album may consist of 50 images. If 50 images are displayed at once on the screen, each image will be decreased in size and viewed by the user with more difficulty for selection. For compensation, the system controller 6 controls the disk recording/playback device 5c for loading 25 images of low resolution level data on each request. In response, the disk recording/playback device 5c reads out the low resolution image data of 25 images, and the ASCII code form of album name and image name data from the optical disk 20 in a sequence from the innermost. The image data is then transmitted through the EFM circuit 21 to the compression/expansion circuit 4h and the ASCII code data is sent directly to the buffer circuit 4b.

The compression/expansion circuit 4h subjects the image data to expansion process and transmits it through the raster-to-block converter circuit 4g and the selector 4f to the buffer circuit 4b. The buffer circuit 4b saves the image data and the ASCII code data temporarily.

When the image data and ASCII code data have been saved in the buffer circuit 4b, the decimation/compression/expansion controller 4i directs the buffer circuit 4b to transfer the image data and ASCII code data at a high speed. The image data and ASCII code data are thus transferred quickly through the interface 4a to the video memory 11b shown in FIG. 4 without control action of the system controller 6.

The video memory 11b has a storage size of 2048 pixels in vertical by 2048 pixels in horizontal. The storage size is divided into an area (image area) of 1024×1536 pixels (vertical×horizontal) for storing the image data, and the remaining area or a command area of 16×32 pixels (512 bytes) for storing the ASCII code data.

The memory controller 13 directs the video memory 11b to save the image data and the ASCII code data received from the buffer circuit 4b in the image data area and the command area respectively.

When the image data and ASCII code data have been saved in the video memory 11b, the main controller 13 reads out the ASCII code data from the command area and translates it to an image data which is then stored in the video memory 11b.

For example, an ASCII code of 41H read from the command area represents A of the alphabet letter. The memory controller 13 converts the letter A to a visual data of 24×24 pixels which is then saved in the video memory 11b so that A can appear in a lower of its corresponding image screen.

After the action of storing both the image data and the ASCII code data of a visual form (which are referred to as the image data for simplicity hereinafter) in the video memory 11b is completed, the memory controller 13 retrieves the image data from the video memory 11. The image data is then converted by the D/A converter to an analog video signal which is transmitted to the monitor 9.

Accordingly, the monitor 9 displays on its screen the album name and 25 index images with their titles superimposed thereon, as shown in FIG. 41.

When the user wants to view 25 images of the remaining half of the album on the monitor, its command is given through operating the operating module 10. In response, the system controller 6 directs the disk recording/playback device 5c to retrieve the low resolution image data and ASCII code data of the 25 images. The low resolution image data and ASCII code data of the 25 images are quickly transferred in the same manner as above described to the monitor 9 for display.

While 25 index images being displayed on the monitor 9, any desired one can be selected by the user manipulating the operating module 10.

In response to the activation of the operating module 10, the system controller 6 directs the disk recording/playback devices 5c to read out data of the desired image of the medium resolution level from the optical disk. The medium resolution image data for display is then read from the optical disk 20 by the playback action of the disk recording/playback device 5c and transmitted to the video memory 11b as described.

Upon the video memory 11b receiving and saving the medium resolution image data temporarily, the memory controller 13 reads out and transmits the medium resolution image data through the D/A converter to the monitor 9. As the result, the image of the medium resolution level selected by the user is displayed on the full screen of the monitor 9.

It is also true that the still image recording/playback system of the present invention allows any desired image to be selected and displayed on the monitor 9 without producing the index display.

When the number of a desired image to be displayed and the album name in which the image is saved are known by the user, they are entered by controlling the ten-key pad 50 of the operating module 10.

As the album holds 50 images with their numbers, the number of the desired image is entered by hitting a corresponding key(s) of the ten-key pad 50. When the number has been entered, the playback key 41 is switched on.

The system controller 6 upon detecting the switching on of the playback key 41 directs the disk recording/playback device 5*c* to read out the medium resolution image data of the desired image in the album. The medium resolution image data for display is then read from the optical disk 20 and transmitted to the monitor 9 for display.

This action may be carried out using the search key 52 of the operating module 10. When the search key 52 is pressed, the system controller 6 turns to a search mode. The search mode of the system controller 6 allows the options including an image name, a keyword, a recording date, and a recording time to be displayed in a sequence on the display 26 by controlling the up, down, left, and right keys 54. When a desired option of the image name, keyword, recording date, or recording time is selected by the user, it is entered through manipulating the ten-key pad 50 and loaded by hitting the EXEC key 55.

The system controller upon detecting the activation of the EXEC key 55 starts a searching action. The image data designated by its name and keyword is accessed and its album number, album name, title, and identity number are displayed on the display 26. If more than one of the image data is desired, a corresponding number of the album names and album numbers are displayed on the display 26.

The user then selects the image with any of the up, down, left, and right keys 54 from the option screen of the display 26 and switches on the playback key 41.

The system controller 6 upon detecting the switching on of the playback key 41 directs the disk recording/playback device 5*c* to retrieve data of the selected image.

Accordingly, the image data is read out from the optical disk 20 and transferred to the monitor 9 for display.

If a desired image is requested by the user to be played back from the disk of which album names are unknown, the second index key 38*b* of the operating module 10 is used.

In recording image data of the low resolution level on the optical disk 20, a group of low resolution images taken from the first image in each album are stored in the form of an index file.

In response to activation of the second index key 38*b*, the system controller 9 directs the disk recording/playback device 5*c* to play back the index file. The first images of the low resolution level of their respective albums in the index file are then read out from the optical disk 20 and transmitted through the video memory 11*b* to the monitor 9 for display.

Accordingly, the first images (A1 to Y1) of their respective albums (A to Y) are displayed on the monitor 9 allowing the user to identify the album in which the desired image is saved.

It may be easier to identify a target album while viewing a more number of images of each album than the first images of their respective albums. For the sake, the third index key 38*c* is provided on the operating module 10.

Similarly at the time of recording image data of the low resolution level on the optical disk 20, a group of low resolution images taken from the first to fifth images in each album are stored in the form of an index file.

In response to activation of the third index key 38*c*, the system controller 9 directs the disk recording/playback device 5*c* to play back the index file.

The first to fifth images of the low resolution level of their respective albums in the index file are then read out from the optical disk 20 by the playback action of the disk recording/ playback device 5*c* and transmitted through the video memory 11*b* to the monitor 9 for display.

Consequently as shown in FIG. 42, the first to fifth images (A1–A5, B1–B5, C1–C5, D1–D5, and E1–E5) of their respective albums (A to E) are displayed on the monitor 9 allowing the user to identify with much ease the album in which the desired image is saved.

It may also be easier to identify a target album while viewing multiple images of each album selected at equal intervals than the consecutive images. For the sake, the fourth index key 38*d* is provided on the operating module 10.

Similarly at the time of recording image data of the low resolution level on the optical disk 20, a group of low resolution level images of respective albums which are selected at equal intervals of ten in each album are stored in the form of an index file.

In response to activation of the fourth index key 38*d*, the system controller 9 directs the disk recording/playback device 5*c* to play back the index file.

The images, selected at the intervals of ten, of the low resolution level of their respective albums in the index file are then retrieved and transmitted through the video memory 11*b* to the monitor 9 for display.

Accordingly, the images selected at the intervals of ten (A1, A11, A21, A31, A41, B1, B11, B21, B31, B41, C1, C11, C21, C31, C41, D1, D11, D21, D31, D41, E1, E11, E21, E31, and E41) of their respective albums (A to E) are displayed on the monitor 9 allowing the user to identify with much ease the album in which the desired image is saved.

When multiple images of the albums are displayed on one screen of the monitor, they may appear with poor visibility. For compensation, the first album search key 56 is provided on the operating module 10.

In response to activation of the first album search key 56, the system controller 9 directs the disk recording/playback device 5*c* to play back the first images of the medium resolution level of their respective albums in a succession.

The first images of the medium resolution level of their respective albums are then read out in a succession from the optical disk 20 by the playback action of the disk recording/ playback device 5*c* and transmitted to the video memory 11*b*. As soon as the medium resolution images having been received and saved in the video memory 11*b*, it is read out by the memory controller 13 and sent to the monitor 9 for display.

Figure 43:
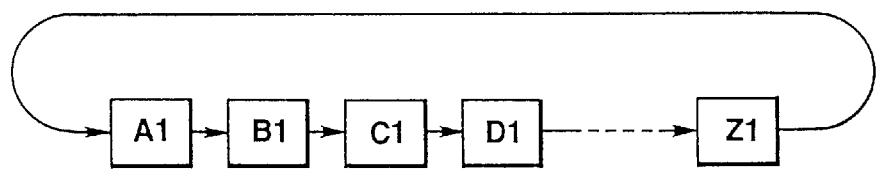
FIG. 43 is a diagram explaining a first album searching action of the still image recording/playback system.

Accordingly, the first images (A1 to Z1) of their respective albums (A to Z) are displayed in a succession on the monitor 9, as shown in FIG. 43, allowing the user to identify the album quickly.

For selecting a desired one of the albums (images) displayed continuously, the user hits the stop key 42 upon an image that represents the desired album appearing on the screen. The system controller 6 when detecting the activation of the stop key 42 recognizes the image displayed at the moment as of the desired album and then commences a playback or edit action of the album.

When the first images of their respective albums are displayed on the screen continuously, they may give minimum information of the albums and fail to identify a target album. For compensation, the second album search key 57 is provided on the operating module 10.

In response to activation of the second album search key 57, the system controller 9 directs the disk recording/ playback device 5*c* to play back more than one, e.g. the first to third, of the medium resolution level images of each album continuously.

The first to third images of the medium resolution level of their respective albums are then read out in a succession from the optical disk 20 by the playback action of the disk recording/playback device 5c and transmitted to the video memory 11b. As soon as the medium resolution images having been received and saved in the video memory 11b, it is read out by the memory controller 13 and sent to the monitor 9 for display.

Figure 44:
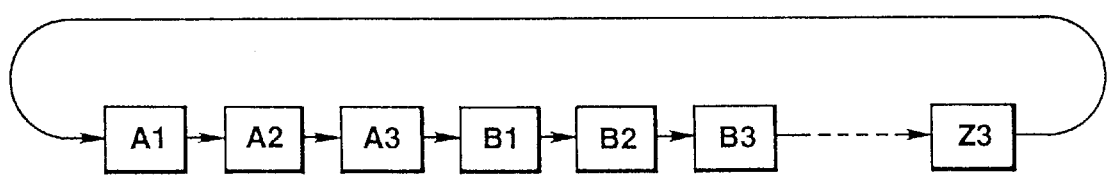
FIG. 44 is a diagram explaining a second album searching action of the still image recording/playback system.

Accordingly, the first to third images (A1–A3, B1–B3, C1—C3, . . . ) of their respective albums (A to Z) are displayed in a succession on the monitor 9, as shown in FIG. 44, allowing the user to identify the album quickly.

For selecting a desired one of the albums (images) displayed continuously, the user hits the stop key 42 upon an image that represents the desired album appearing on the screen. The system controller 6 when detecting the activation of the stop key 42 recognizes the image displayed at the moment as of the desired album and then commences a playback or edit action of the album. As apparent, the optical disk 20 has a given number of low resolution image data stored thereon as the index file. The index file is read by activating any of the index keys 38a to 38d and its low resolution image data are displayed on one screen indicating contents of each album (image directory)i. This allows the user to search a desired image or album (image directory) at a higher speed.

As the index file containing a given group of the low resolution image data has been saved in the optical disk 20, it is individually accessed and read from the disk upon request of the index display. Accordingly, its low resolution image data of the group are rapidly displayed thus speeding the index display.

Also, the still image recording/playback system of the embodiment allows a desired image to be displayed directly on the monitor 9 without showing the index image data.

For the purpose, the user has acknowledged the number of a desired image and its album and enters their data by operating the album key 33, ten-key pad 50, backward key 39, and forward key 40 on the operating module 10 before hitting the playback key 41.

In response to the activation of the playback key 41, the system controller 6 directs the disk recording/playback device 5c to read out the medium resolution level data of the desired image in the album. The medium resolution image data labeled with the number is thus retrieved from the optical disk 20 and displayed on the monitor 9.

Furthermore, the still image recording/playback system of the embodiment allows searching of a desired image with the search key 52 provided on the operating module 10.

In response to activation of the search key 52, the system controller 6 starts its search mode. The search mode of the system controller 6 causes the display 26 to indicate in a succession the relevant information of image data including an image name, a keyword, a recording date, and a recording time according to the actions of the up, down, left, and right keys 54. This is followed by the user selecting any option of the image name, keyword, recording date, and recording time which is indicative of the desired image, entering its number using the ten-key pad 50, and switching on the EXEC key 55.

The system controller 6 upon detecting the switching on of the EXEC key 55 starts a searching action. With the disk recording/playback device 5c being controlled, the desired image is searched by referring its relevant information, e.g. the image name or keyword, and its low resolution level image data is read out. If more than one of images are accessed, the system controller 6 directs the disk recording/playback device 5c to read the low resolution image data of all the images.

The low resolution image data read out is then transmitted to the video memory 11b. Upon the video memory 11b receiving and saving the low resolution image data, the memory controller 13 retrieves and transfers the low resolution image data to the monitor 9.

This allows the user to identify the desired image from the display screen on the monitor 9, enter its number and album number with the ten-key pad 50, and hit the playback key 41. In response, the system controller 6 directs the disk recording/playback device 5c to read the medium resolution image data of the desired image labeled with the entered number.

Then, the desired image of the medium resolution level is transmitted through the video memory 11b to the monitor 9 where it is displayed as requested.

13. Playback and Display of Index Image

The procedure of playing back and displaying the low resolution image data for index display explained in the previous section, "12. Description of playback action", will be described in more details referring to a flow chart shown in FIG. 38 in conjunction with the optical disk structure and file multi-level structure explained in 6. Description of optical disk format, 7. Description of file and file multi-level structure, and 8. File structure.

Figure 38:
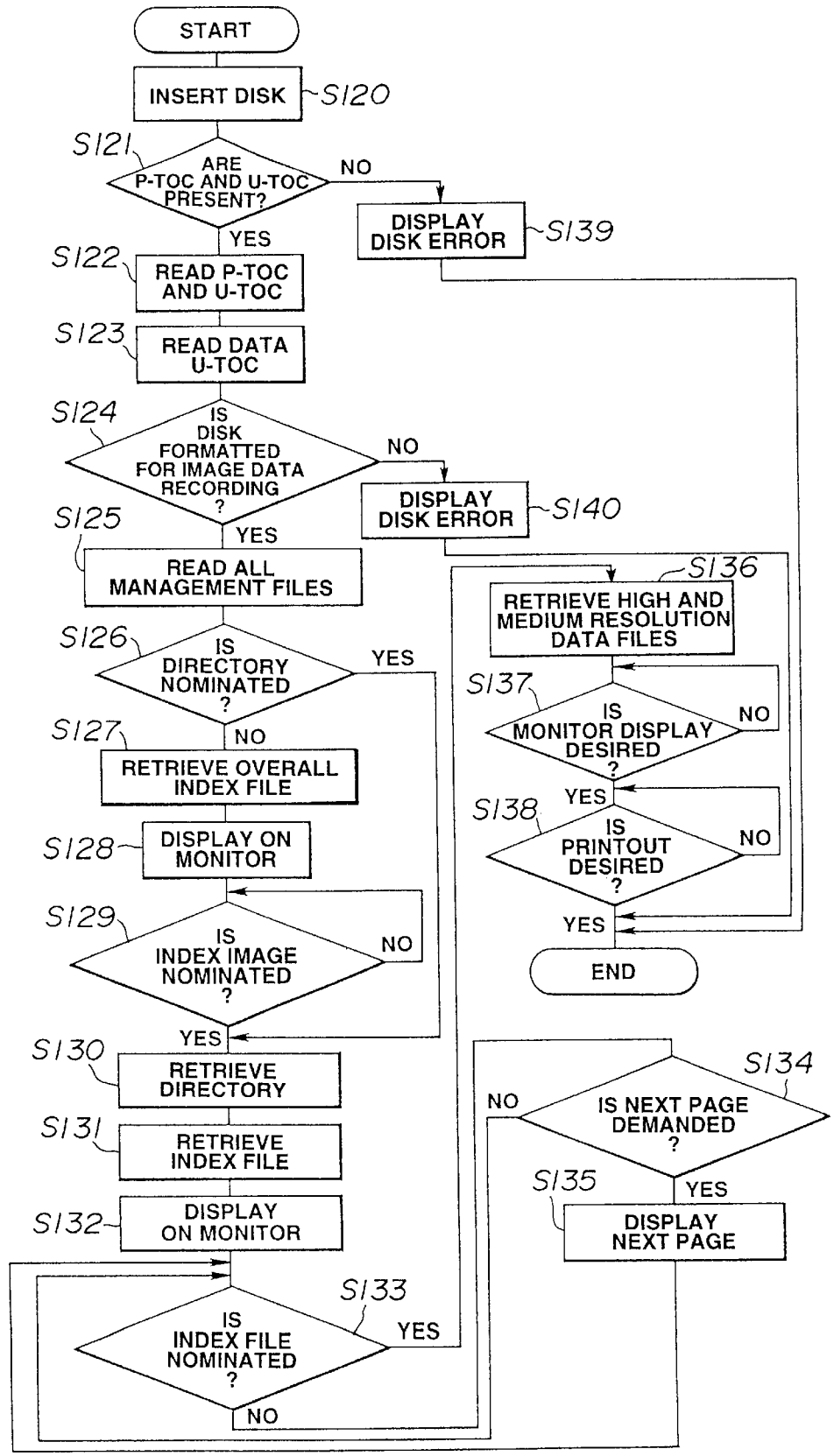
FIG. 38 is a flow chart explaining a playback action of the still image recording/playback system.

The flow chart shown in FIG. 38 starts with the power key 31 shown in FIG. 8 being turned on by the user to turns the storage 5 to the standby state. The procedure then goes to Step S120.

At Step S120, the optical disk 20 is inserted into the disk insert inlet 30 shown in FIG. 8. This is followed by Step S121. The optical disk 20 inserted from the disk insert inlet 30 is loaded in the storage 5 and ready for its image data being played back.

At Step S121, the system controller 6 directs the disk recording/playback device 5c to examine and read P-TOC and U-TOC from the optical disk 20. More specifically, it is examined whether or not P-TOC and U-TOC are saved on the optical disk 20 and if not, the procedure moves to Step S139 where a message of "disk error" is displayed on the display 26. When it is judged yes, the procedure goes to Step S122.

At Step S122, the system controller 6 directs the disk recording/playback device 5c to read P-TOC and U-TOC from the optical disk 20 and examine the location of the data U-TOC. Then, Step S123 follows. More specifically, as the recorded area where data files are stored is not controlled by U-TOC, it is determined that the data U-TOC must be joined to the front end of the data files.

At Step S123, the system controller 6 saves the data U-TOC on the RAM 6a while recognizing the locations of the directory and files. This is followed by Step S124.

At Step S124, the system controller 6 examines whether or not the optical disk 20 has been formatted for image recording. More particularly, the system controller 6 examines the data U-TOC from the RAM 6a whether there are stored or not the directory (PIC_MD), overall data management file, image directory (at least one), image data management file, and image index file to specify the optical disk 20 being formatted for image recording. If not, the procedure goes to Step S140 where the display 26 is activated for displaying "disk error" message and is then terminated. When it is judged yes, Step S125 follows.

At Step S125, the system controller 6 directs the storage controller 5d to activate the disk recording/playback device 5c for reading all the management files (including the overall data management file, image data management file of each directory, print control data management file, and playback control management file). The management files are then read and stored in the RAM 6a temporarily, and the procedure goes to Step S126.

At Step S126, the system controller 6 examines whether the image to be displayed is specified or not. When it is judged yes, the procedure moves to Step S130 and if not, to the Step S127.

At Step S127, the system controller 6 operates searching the overall index file on the optical disk 20. This is followed by Step S128.

If the image directory is not specified, it is needed to display the image data saved in each image directory for allowing the user to identify a desired image. At Step S128, the system controller 6 directs the disk recording/playback device 5c to read and display the overall index file stored on the optical disk 20. Step S129 follow. The overall index file contains a group of index images, one for each image directory, selected from the index images saved in the image index files of their respective image directories and arranged in an order of monitor display. While the index image data in the overall index file being displayed, the user can identify a desired image directory, At Step S129, the system controller 6 upon detecting the activation of the operating module 10 examines whether a target one of the index images displayed on the monitor is selected or not by the user. If not, Step S129 is repeated until the selection is made. When it is judged yes, the procedure goes to Step S130.

At Step S130, the system controller 6 searches the image directory defined by the selected index image. This is followed by Step S131.

The image directory units (of 48 bytes) in the overall data management file saved in the RAM 6a are identical in the number to the index images displayed (of which number also equals the number of image directories), and stored in a sequence corresponding to the order of the index images. It is now assumed that the second index image displayed from the overall data file is selected. The image directory data unit of 48 bytes representing the second index image is stored at the second position from the front and its directory number is 00001. Hence, the directory where the second index image is saved is PIC00001 indicating the second of the image directories.

At Step S131, the system controller 6 accesses the image index file in the directory determined at Step S130. This is followed by Step S132.

At Step S132, the system controller 6 drives the monitor 9 to display a first one (including 25 index images) of the image index files in the directory. Step S133 follows.

At Step S133, the system controller 6 examines the action of the operating module 10 whether or not a desired one is selected out of the index images displayed on the monitor 9 by the user. If not, the procedure goes to Step S134 and when it is judged yes, to Step S136.

At Step S134, the system controller 6 examines the action of the operating module 10 whether display of the next group of the index images (including the remaining 25 index images) is commanded or not. If not, the procedure moves back to Step S133. When it is judged yes, Step S135 follows.

At Step S135, the system controller 6 directs the monitor 9 to display the remaining 25 index images. Then, the procedure returns to Step S133.

When it is judged at Step S133 that a desired index image is selected, the procedure goes to Step S136 where the high or medium resolution image data file defined by the index file is accessed by the system controller 6. This is followed by Step S137.

More specifically, the system controller 6 upon checking the image directory where the displayed index file is included selects one of the image data management files of their respective image directories saved in the RAM 6a. The number of the image data units (of 16 bytes) saved in the image data management file selected is identical to the number (N) of index data in the image index file. The image data units are also arranged in a sequence corresponding to the order of the displayed index images.

It is now assumed that the fourth index image is selected from the 25 index images of the index file in the first image directory which are displayed. As the index file on the display is derived from the first image directory, the system controller 6 accesses the first image data management file in the RAM 6a. When the fourth index image is selected by the user, the fourth image data unit in the image data management file is retrieved. The fourth image data unit contains 00000 of the directory number and 00003 of the file data. It is thus specified from the index image that the corresponding image file of high resolution level data is PHP000003 in the PIC00000 image directory and of medium resolution level is PSN00003 in the PIC00000 image directory.

For selecting the index image and accessing the high and medium resolution image data files corresponding to the index image, contents of the image data units in the image data management file are examined.

When the location of the index images is changed, for example, due to an edit action described later, the order of displaying the index images may be mismatched with the image numbers in the image file. In the still image recording/playback system of the embodiment, the order of displaying the index images matches with the image numbers in the image file. When the order of displaying the index images is changed, the relationship between the index images and their respective image files of high and medium resolution level image data is maintained by contents of the image data units in the image data management file. This will be explained later in more details in the section of "Image editing".

Returning to Step S137, the system controller 6 examines the action of the operating module 10 whether display of the medium resolution image data of image file is commanded or not. When it is judged yes, the procedure goes to Step S138. If not, Step S137 is repeated.

At Step S138, the system controller 6 directs the disk recording/playback device 5c to read the medium resolution image data of the image file, and the monitor 9 to display the same. The system controller 6 also examines whether printing of the high resolution image data of the image file is commanded or not. If not, Step S138 is repeated. When it is judged yes, the system controller 6 directs the disk recording/playback device 5c to read and transmit the high resolution image data of the image file through the main memory 11a to the printer 2. Then, the entire procedure of routine steps for playback and display of the index images shown in FIG. 38 is terminated.

In the printer 2, the high resolution image data of the image file is received as R, G, and B components and converted to a set of yellow(Y), magenta (M), and cyan (C) color data which are fed to the thermal head for printing on a sheet of printing paper as starting with the Y data.

14. Searching of File and Image Directory

Figure 45:
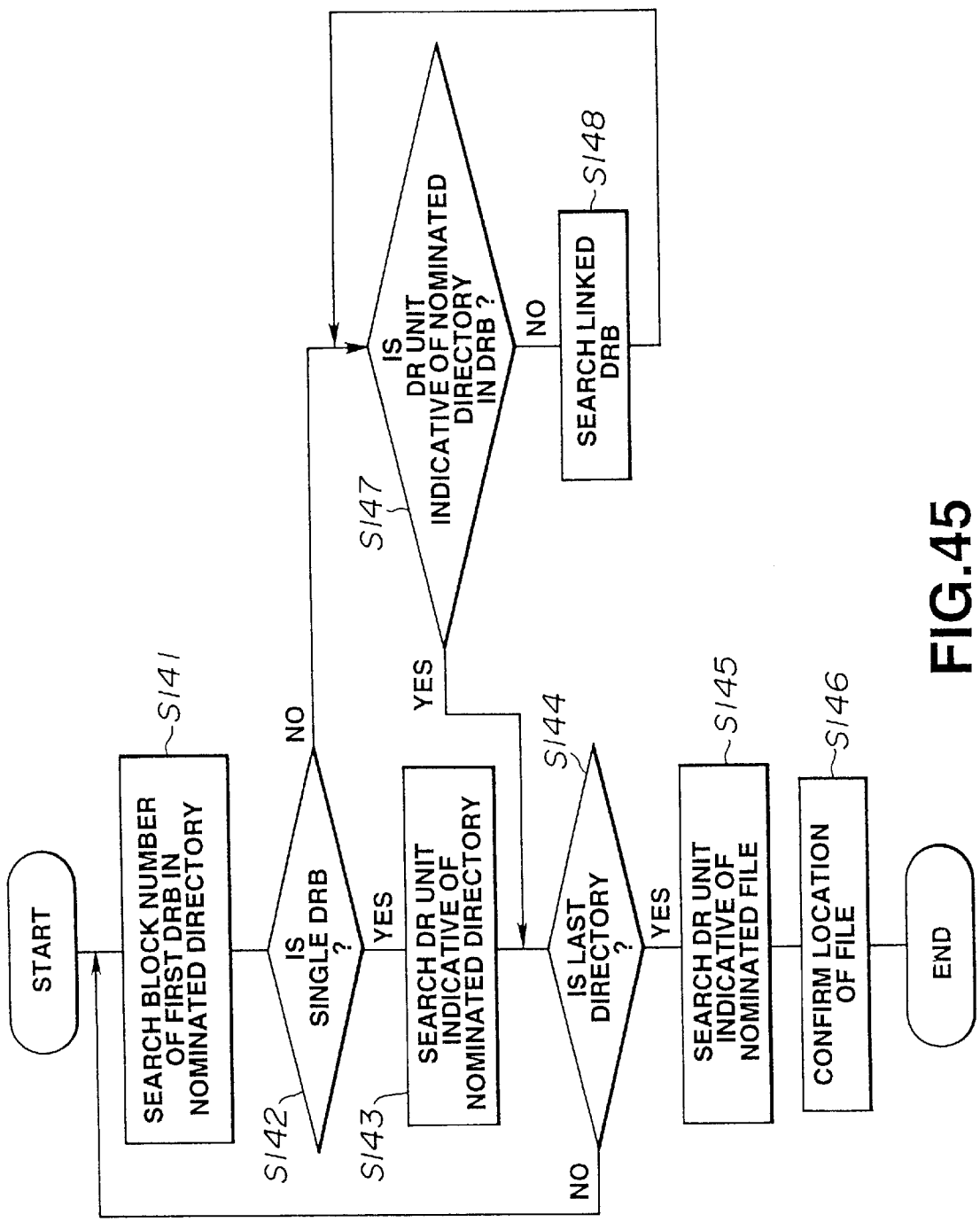
FIG. 45 is a flow chart explaining an action of retrieving a specified image data in the still image recording/playback system.

The procedure of searching, for example, the image file f5 (PSN00000.PMP) will be described referring to the multi-level structure of the files prescribed with FIG. 23. FIG. 45 illustrates a flow chart of the searching action. The flow chart of FIG. 45 starts with desired image directory and file name being specified by the user when the data U-TOC has been read and saved in the RAM 6*a*. The procedure then goes to Step S141.

At Step S141, the system controller 6 accesses the block number of the first directory record block (DRB) indicative of the directory (PIC_MD) by reviewing the volume descriptor (VD) in the volume management area. Step S142 follows.

More particularly, the location of the directory record block (DRB) in the management block area is labeled with the block number defined by data saved in the VD. In the still image recording/playback system of the embodiment, the block number of the first DRB is 0004. Accordingly, the DRB indicative of the directory D1 (PIC_MD) is determined by the management block number of 0004 as recognized by the system controller 6.

At Step S142, the system controller 6 examines the entry of the management block saved in the MT whether the directory record block determined represents a single DRB or a group of DRBs. When the block is the single DRB, the procedure goes to Step S143. When it is judged the group of DRBs, Step S147 follows.

In case that the multi-level structure of the file is as shown in FIG. 24, 00 04 of the management block number represents a single DRB. Then, the procedure goes to Step S143.

At Step S143, the system controller 6 selects out of the DR units in the DRB of the directory D1 a directory-dedicated DR unit indicating the location of the image directory D2 (PIC00000) in the image file f5. As third DR unit in the DRB of the directory D1 in the multi-level file structure shown in FIG. 24 represents the directory-dedicated DR unit indicating the location of the image directory D2, it is picked up. The third directory-dedicated DR unit holds the index-to-DRB. Hence, by reading the management block number saved in the index-to-DRB, the location of the DRB indicative of the image directory D2 is specified. More specifically, the index-to-DRB is 0005 in the multi-level file structure shown in FIG. 24, and the DRB indicative of the image directory D2 is identified by the management block number of 0005.

At Step S147, the system controller 6 examines the DR units in the DRB in a sequence whether the directory-dedicated DR unit indicative of the image directory is present or not. If not (i.e. it is judged that the DR unit indicative of the image directory is not present in the first one of the DRBs linked to one another), the procedure goes to Step S148. When yes is given (i.e. it is judged that the DR unit indicative of the image directory is present in the first one the DRBs linked to one another), Step S144 follows. In case of searching the image file f5 with the multi-level file structure of FIG. 24, both the directory record blocks indicative of the directory ID (PIC_MD) and the image directory D2 (PIC00000) are single DRBs, and Steps S147 and S148 are not used.

At Step S144, it is examined whether or not the directory-dedicated DR unit picked up at Step S143 is a directory-dedicated DR unit indicative of the selected directory. The file structure used in the still image recording/playback system of the present invention has a tree construction as shown in FIG. 24. This requires Step S144 to permit the picked up directory being a final directory (at the lowest level) during access to the selected directory. For searching the image file f5 with the multi-level file structure of FIG. 24, the image directory D2 defined at Step S143 is a final level directory. It is thus given yes at Step S144 and the procedure moves to Step S145.

At Step S145, the system controller 6 selects a file-dedicated DR unit indicative of the location of the image file f5 out from the DR units in the DRB determined at Step S143 representing the image directory D2. In the multi-level file structure of FIG. 24, the third DR unit in the DRB representing the image directory D2 is the file-dedicated DR unit indicative of the image file f5 and it is picked up. The file-dedicated DR unit includes the extent start location where the allocation block number is saved. Referring to the allocation block number, the location of the image file f5 is identified. This is followed by Step S146.

At Step S146, system controller 6 accesses the allocation block in the file extent area determined at Step S145 to confirm that the image file f5 starts from the allocation block. It is thus allowed to read the image file f5 by starting at the access point.

The still image recording/playback system of the embodiment allows the image file to be accessed by the foregoing manner, whereby the number of physical reading actions for file searching will be decreased. Any image file in the image directory having a multi-level directory structure can hence be accessed and read easily and quickly.

The information of the multi-level directory structure all is stored in the second region (volume management area). When the information required for searching a desired file is wanted, it can be obtained by simply accessing the volume management area. As the recorded location of files has been recognized, the number of access actions will be minimized thus speeding up the process of reading the image files.

The volume management area holds not excess amounts of data such as the image data but the management data which is eligible to be saved in a limited storage of RAM. While the management data is being saved temporarily in the RAM, the number of actions of access to the optical disk for searching a file will further be reduced.

15. Image Editing

The process of editing the index image will be carried out at user's option after the recording of image data is completed, as briefly described in the previous sections, "9. Recording action" and "10. Other recording action." The image editing includes transfer of image data from one image directory to another, and positional exchange of index images in one image directory for altering the order of displaying the index images.

An example of the image editing will be described referring to a flow chart shown in FIG. 46 where the fifth index image in the first image directory is moved to the tenth position in the second image directory.

Figure 46:
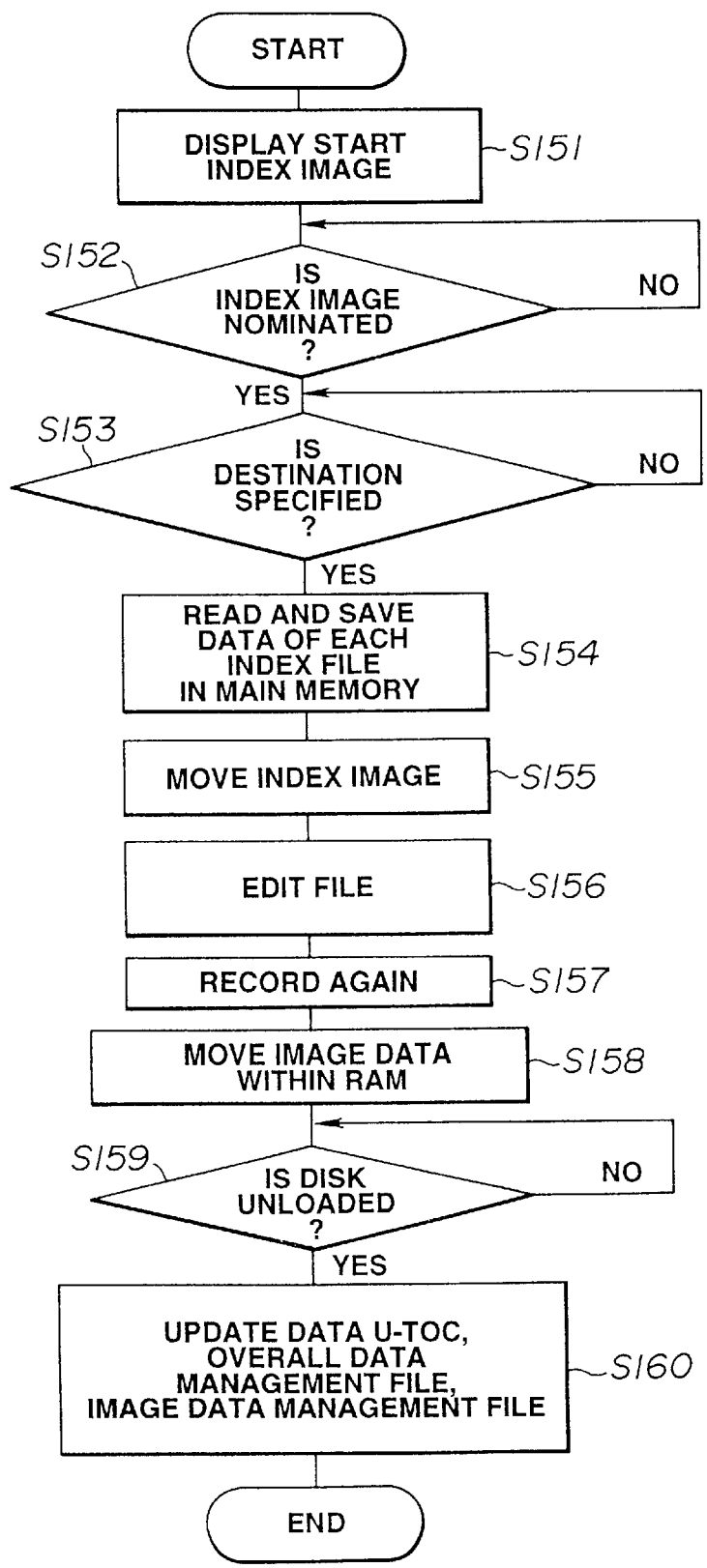
FIG. 46 is a flow chart explaining an action of editing the image data in the still image recording/playback system.

The flow chart of FIG. 46 starts with the edit command key being activated by the user after an action of the image recording is completed. This is followed by Step S151.

At Step S151, the system controller 6 directs the disk recording/playback device 5*c* to read out the index file of the (first) image directory of the start location for displaying its 25 index images (See "Playback action"). This is followed by Step S152.

At Step S152, the system controller 6 examines whether the index image to be moved from the start image directory has been nominated or not (i.e. whether the fifth index image in the first image directory has been selected). If not, Step S152 is repeated. When it is judged yes, the procedure goes to Step S153.

At Step S153, the system controller 6 examines the action of the operating module 10 whether the image directory of the destination and the destination of movement are specified or not (in this case, to the tenth position in the second directory). If not, Step S153 is repeated. When it is judged yes, the procedure goes to Step S154.

At Step S154, the system controller 6 directs the disk recording/playback device 5*c* to read and save in the main memory 11a all the index images in the index file of the start image directory and all the index images in the index file in the destination image directory. This is followed by Step S155.

At Step S155, the system controller 6 directs the main controller 13 to move a desired group of index images (with headers) from the index file of the start (first) image directory to the index file of the destination (second) image directory. Then, Step S156 follows.

The index image in the image index file comprises 4096 bytes of a header and a data record. As the fourth index image (with its header) is specified by 4096 bytes after 4096×3 bytes from the front end of the image index file, its location in the image index file is clearly identified. Similarly, the destination point of the index image (4096 bytes) to be moved is denoted by an area after 4096×9 bytes from the front end of the destination (second) image index file. The target index image is then moved to the destination area. More specifically, it is inserted into between the eighth index image and the ninth index image but not overwritten on the ninth index image.

At Step S156, the system controller 6 directs the memory controller 13 to delete the index image in the start index file for updating and add the same to the destination index file. As the destination index file has been updated, the procedure goes to Step S157.

At Step S157, the system controller 6 allows both the start and destination index files edited to be stored in their respective original locations on the disk. This is followed by Step S158. The recording locations of the two index files are not limited to their original areas but may be stored in any available areas.

At Step S158, the system controller 6 shifts the fifth one of the image data units (16 bytes) in the image data management file of the start (first) directory to the tenth position of image unit in the image data management file of the destination (second) directory in the RAM 6a without changing its data. This is followed by Step S159. Meanwhile, the files of the high and medium resolution image data stored on the disk remain intact with no updating.

At Step S159, the system controller 6 examines whether the eject key 32 on the operating module 10 is switched on or not for commanding a disk eject action. If not, Step S159 is repeated. When it is judged yes, the procedure goes to Step S160.

At Step S160, the system controller 6 directs the disk recording/playback device 5c to read the data U-TOC, overall data management file, and image data management file from the RAM 6a and write them on the disk for data updating. The procedure of image editing steps is now ended up.

There may be provided a recording medium on which a header containing data for matching with the order of displaying index images is joined to the front end of a high or medium resolution image data file. For editing such a recording medium, the matching with the order of displaying the index images is implemented by rewriting data of the header. It is however needed for rewriting the header to read out all data from the image file (including image data). This will result in increasing the duration of the playback process on the disk.

The editing action of the embodiment causes the index files to be exchanged in the physical storage location on the optical disk according to the order of display, but allows the high and medium resolution image date to remain unchanged on the disk. Instead, data of the image data units in the image data management file read and saved in the RAM 6a are handled for relocation so that the relationship between the order of displaying the index images and the high and medium resolution image data files can be maintained. Rewriting is only needed for exchanging the index images between different index files and updating the image data management file in the RAM 6a. This allows the amount of data for rewriting to be decreased thus speeding up the rewriting process.

Also, the physical locations of the index images on the disk are changed to match the order of displaying the index files thus contributing the speed up of reading the index files.

It is possible to use an equal manner for changing the order of displaying the index images in the index file of an image directory. For example, the procedure of displaying the seventh index image in the index file in the second position starts with all the data of the index file being read and saved in the main memory 11a. The seventh index image is moved to the second position in the index file on the main memory 11a and then recorded back on to the disk. Also in the RAM 6a, the seventh image data unit of 16 bytes is inserted in the second position without changing its data. Accordingly, for changing the order of displaying index images in the same image directory, the index file and the image data unit in the RAM are only rewritten while the image data themselves remain unchanged.

16. Creation of Overall Index File

The procedure of storing the index image data in the overall index file (OV INDX.PMX) with the system controller 6 while storing the high and medium resolution image data on to the optical disk 20, which is briefly described in "9. Recording action" or "Other recording action".

The overall index file is controlled by the overall data management file and has a data indicative of the locations of the index images in each image directory.

In case that there are five image directories, each having 25 index images, the overall index file includes 5 index images taken one from each directory and arranged in a sequence. If the number of the image directories is small, the overall index file may be created by taking first five index images from each directory.

The overall index file is created during formatting the display data and has been saved in recording the images.

Figure 47:
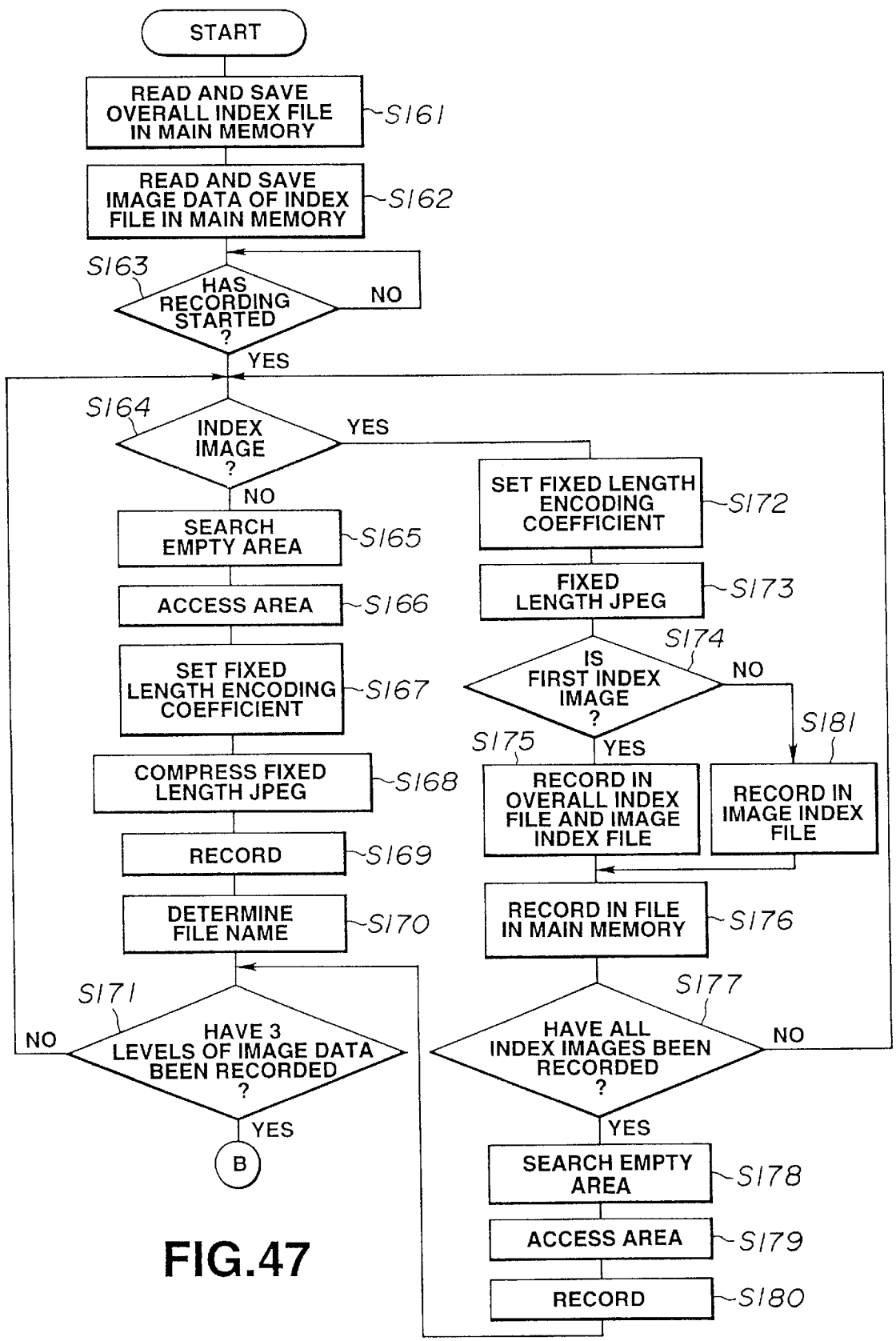
FIG. 47 is a flow chart explaining a first half of an action of producing the overall index file in the still image recording/playback system.

The procedure of creating the overall index file is shown in a flow chart of FIG. 47. The flow chart of FIG. 47 starts with following Step S60, shown in FIG. 35, which is ended at (A) point. The steps before (A) point are identical and will not be repeated.

At Step S161 of the flow chart shown in FIG. 47, the system controller 6 reads and saves the overall index file in the main memory 11a. This is followed by Step S162.

At Step S162, the system controller 6 directs the storage controller 5d to activate the disk recording/playback device 5c for reading out all the image data in the image index files of a target image directory. Step S163 follows.

At the time, the image data of a fixed length code form saved with their header in the image index file and overall index file are retrieved and transferred to the main memory 11a without being subjected to expansion decoding process. If the image data is not stored in the image index file or overall index file, it is not loaded to the main memory.

At Step S163, the system controller 6 upon detecting the activation of the operating module 10 examines whether or not a command of starting the recording action is given by the user. If not, Step S163 is repeated until the command of starting the recording action is released. When it is judged yes, the procedure goes to Step S164.

At Step S164, the system controller 6 examines whether the image to be recorded is an index image or not. If not, the procedure moves to Step S165 and when yes, to Step S172.

At Step S172, the system controller 6 supplies the decimation/compression/expansion controller 4i shown in FIG. 5 with a signal indicating that the image to be recorded is an index image. In response to the signal, the decimation/compression/expansion controller 4i determines and imparts a fixed length encoding coefficient for the index image to the compression/expansion circuit 4h. This is followed by Step S173.

At Step S173, the system controller 6 directs the decimation/compression/expansion controller 4i to activate the compression/expansion circuit 4h for compression encoding a ¼ decimated image data with the fixed length encoding coefficient to yield a ¹⁄₁₅-cluster fixed length code form of the index image. Then, the procedure goes to Step S174.

At Step S174, the system controller 6 examines with reference to the overall data management file saved in the RAM 6a whether or not the fixed length code form of the index image from Step S173 is a first index image in the image directory to be stored. If not, the procedure moves to Step S181 and when it is judged yes, to Step S176.

At Step S181, the system controller 6 stores the fixed length code form of the index image in the image index file. This is followed by Step S176.

At Step S175, the system controller 6 stores the first index in both the overall index file and image index file. This is also followed by Step S176.

At Step S176, the system controller 6 directs the memory controller 13 to save 4096 bytes of the index image with its header added in each index file of the main memory 11a shown in FIG. 4. The procedure goes to Step S177.

At Step S177, the system controller 6 examines whether or not all the index images have been saved in the main memory ila. If not, the procedure goes back to Step S164. When it is judged yes, Step S178 follows.

At Step S178, the system controller 6 searches 00 (a code indicative of an available allocation block) of the two-bit entry of the allocation block number in the volume space bit map VSB of the data U-TOC saved in the RAM 6a to locate an unrecorded area. This is followed by Step S179.

At Step S179, the system controller 6 directs the storage controller 5d to activate the disk recording/playback device 5c for accessing the unrecorded area on the optical disk 20. This is followed by Step S180.

At Step S180, the system controller 6 directs the storage controller 5d to activate the disk recording/playback device 5c for recording the index image data in the unrecorded area of the optical disk 20. This is followed by Step S171.

As described, the index images of the fixed length code form are temporarily saved in the main memory Ila in a sequence before stored on the optical disk 20. In the main memory 11a, an index file is produced from selected ones of the index images and stored in a physically continuous area of the optical disk 20.

If it is judged no at Step S164, the procedure goes to Step S65 where the system controller 6 detects the unrecorded area on the optical disk 20 for storing the medium or high resolution image data. Then, Step S166 follows.

More particularly, the system controller 6 searches 00 (a code indicative of an available allocation block) of the two-bit entry of the allocation block number in the volume space bit map VSB of the data U-TOC saved in the RAM 6a to locate an unrecorded area.

At Step S166, the system controller 6 detects an optimum one of the unrecorded areas located at Step S165 and directs the storage controller 5d to activate the disk recording/playback device 5c for accessing the optimum area. This is followed by Step S167.

At Step S167, the system controller 6 directs the decimation/compression/expansion controller 4i to determine a fixed length encoding coefficient for the high or super-high resolution image. The procedure goes to Step S168.

At Step S168, the decimation/compression/expansion controller 4i directs the compression/expansion circuit 4h to yield 8 clusters of the high resolution image data or 18 clusters of the super-high resolution image data with the fixed length encoding coefficient. This is followed by Step S169.

At Step S169, the system controller 6 directs the disk recording/playback device 5c to record the fixed length code form of the image data in the optimum recording area of the optical disk 20. This is followed by Step S170.

At Step S170, the system controller 6 determines data in the image data management file of the target directory and a file name of the image data file of each resolution level while controlling the recording of the image data. Then, Step S171 follows.

At Step S171, the system controller 6 examines whether the three, low (index display), medium, and high (or super-high), resolution levels of the image data have been recorded or not. If not, the procedure returns back to Step S164 where the remaining resolution level image data is stored. When it is judged yes, the procedure goes to Step S191 shown in FIG. 48.

As the image data required have been stored, the user is allowed to exchange the overall index image data. For example, the overall index file produced simultaneously with image files of the high and medium resolution image data and index data files is designed to save the first index images of their respective directories. When the user requests, a group of the first index images saved in the overall management file will be replaced with a desired set of index images.

Figure 48:
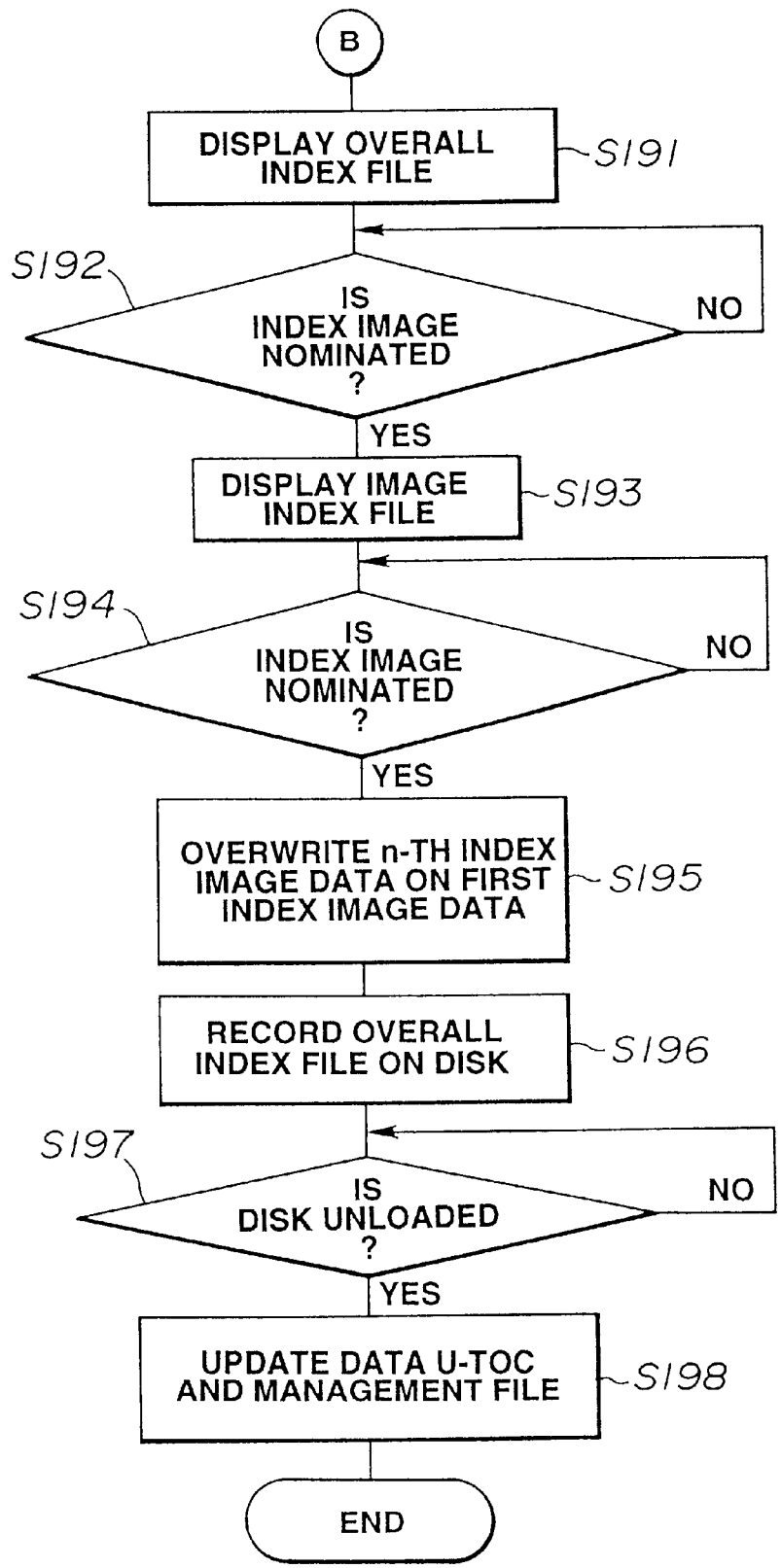
FIG. 48 is a flow chart explaining a second half of the action of producing the overall index file in the still image recording/playback system.

The replacement of the index images is shown in a routine after Step S191 of FIG. 48.

At the Step S191, the system controller 6 conducts display of the overall index image data. This is followed by Step S192.

At Step S192, the system controller 6 examine the activation of the operating module 10 whether a desired index image to be displayed is determined or not. If not, Step S192 is repeated. When it is judged yes, the procedure goes to Step S193.

More specifically, the desired index image is selected at Step S192 from the overall index file. This means selecting the image directory where the desired index image is saved. The image directory selected is referred to as an n-th directory stored hereinafter.

At Step S193, the system controller 6 reproduces and displays on the monitor the image index file in the n-th image directory selected at Step S192. This is followed by Step S194.

At Step S194, the system controller 6 examines the activation of the operating module 10 whether or not the desired image is identified out of the index images of the image index file displayed on the monitor. If not, Step S194 is repeated. When it is judged yes, the procedure goes to Step S195.

More specifically, the desired index image is selected at Step S192 in the n-th image directory for replacing the first index image. Hence, the desired index image is referred hereinafter to as an m-th index image saved in the image index file.

At Step S195, the system controller 6 directs the main controller 13 to write the m-th index image of the image index file in the n-th image directory over the n-th index image of the overall index file. Simultaneously, 00001 of the index image number saved in the image directory data unit of the n-th image directory or in the n-th image directory data unit is replaced with 0000m of the index image number representing the m-th index image. Then, Step S196 follows.

At Step S196, the system controller 6 directs the disk recording/playback device 5c to record the overall data management file on the optical disk 20. This is followed by Step S197.

At Step S197, the system controller 6 examines whether the eject key 32 on the operating module 10 is activated or not. If not, Step S197 is repeated. When it is judge yes, the procedure advances to Step S198.

At Step S198, the system controller 6 updates data in the data U-TOC, overall management data file, and image data management file stored in the disk with the data U-TOC, overall management data file, and image data management file of the RAM 6a. Then, the procedure of routine steps is terminated.

Although the overall index file described saves the first index image of each image directory, it may hold a number, e.g. five, of consecutive index images for each directory when the number of the image directories involved is small.

If there are 4 image directories and five index images of each image directory are registered, 20 of the image directory data units are produced, as shown below, representing 20 index images, 5×4 directories, in the overall index file.

|  | Directory No. | Index image No. |
| --- | --- | --- |
| 1st image directory data | 00 | 00 |
| 2nd image directory data | 00 | 01 |
| 3rd image directory data | 00 | 02 |
| 4th image directory data | 00 | 03 |
| 5th image directory data | 00 | 04 |
| 6th image directory data | 01 | 00 |
| 7th image directory data | 01 | 01 |
| 8th image directory data | 01 | 02 |
| 9th image directory data | 01 | 03 |
| 10th image directory data | 01 | 04 |
| 11th image directory data | 02 | 00 |
| 12th image directory data | 02 | 01 |
| 13th image directory data | 02 | 02 |
| 14th image directory data | 02 | 03 |
| 15th image directory data | 02 | 04 |
| ... |  |  |

17. Printing Action

The action of the still image recording/playback system of the present invention for printing images captured through the scanner 1 or video input 8, or stored in the optical disk 20.

For printing the image captured through the scanner 1 or video input 8, the user controls the operating module 10 to display on the monitor 9 the image captured through the scanner 1 or video input 8. When the image displayed on the monitor 9 is a correct one, its printing is commanded by controlling the operating module 10.

The image data captured through the scanner 1 or video input 8 is saved in the main memory 11a. In response to the command from the operating module 10, the system controller 6 directs the memory controller 13 to read the image data from the main memory 11a. The image data read from the main memory 11a is then transmitted to the data converter circuit 2a of the printer 2.

The data converter circuit 2a converts the image data from the main memory 11a into a printable form. More particularly, the image data of R, G, and B or Y, Cr, and Cd forms is converted by color coordinates transformation into Y (yellow, M (magenta), and C cyan) color signals which are then transmitted to the thermal head 2c for printing.

The thermal head 2c prints the image data in the form of a matrix of dots at a resolution of e.g. 300 dpi on a print sheet 2d of A6 size. As the result, the image data captured through the scanner 1 and video input 8 is printed.

If an extra process for characterizing the image data with an optional feature such as enlargement, reduction, or rotation is desired, the memory controller 13 transfers the image data from the main memory 11a to the image processor circuit 12. Upon the image data being received by the image processor circuit 12, the image processing controller 14 directs the image processor circuit 12 to perform its extra process. The image data processed by the image processor circuit 12 is fed to the printer 2 which in turn produces a print of the image data with the optional feature such as enlargement or reduction, For reproducing and printing an image stored on the optical disk 20, the user commands in the same manner to display its index images on the monitor 9. The desired image is selected from the index images and substituted for the index images on the monitor 9.

When the image displayed on the monitor 9 is a correct one, its printing is commanded by the user controlling the operating module 10. In response, the system controller 6 directs the disk recording/playback device 5c to read out the data of the desired image (of the high or super-high resolution level) displayed on the monitor 9.

As described, the optical disk 20 holds the image data of the three different resolution levels, the low resolution for index display, the medium resolution for monitor display, and the high resolution for printing. The optical disk 20 also carries printing information for printing the image data. In action, the system controller 6 reads and examines the printing information data to determine the number, color setting, size, and location of prints on the printer 2. Simultaneously, the high resolution image data is read from the optical disk 20 and transmitted to the printer 2.

Accordingly, one or more of the high resolution image data from the optical disk 20 are printed on the print sheet(s) 2d in a form determined by the printing information.

Figure 49:
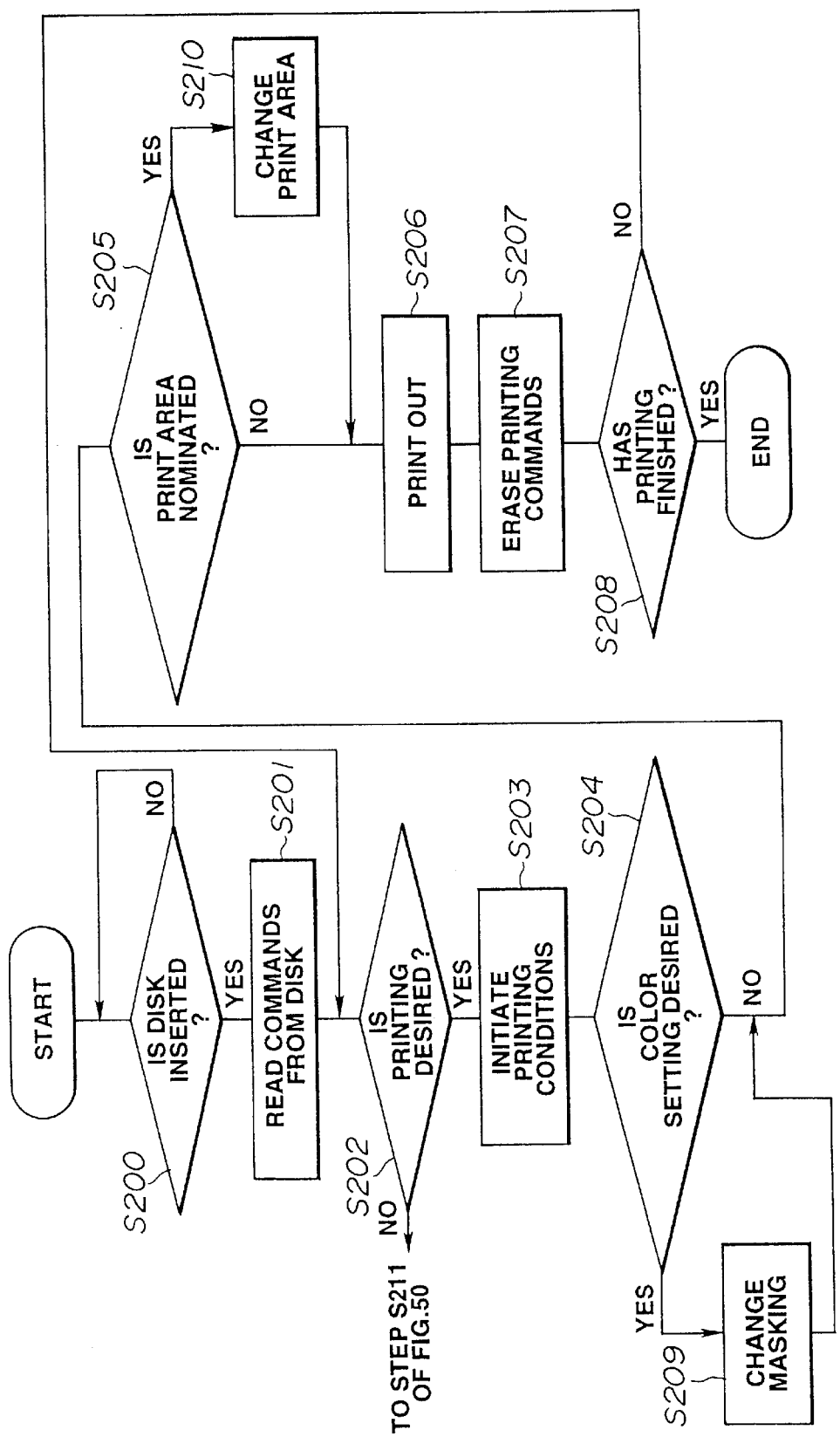
FIG. 49 is a flow chart explaining a printing action of the still image recording/playback system.
Figure 50:
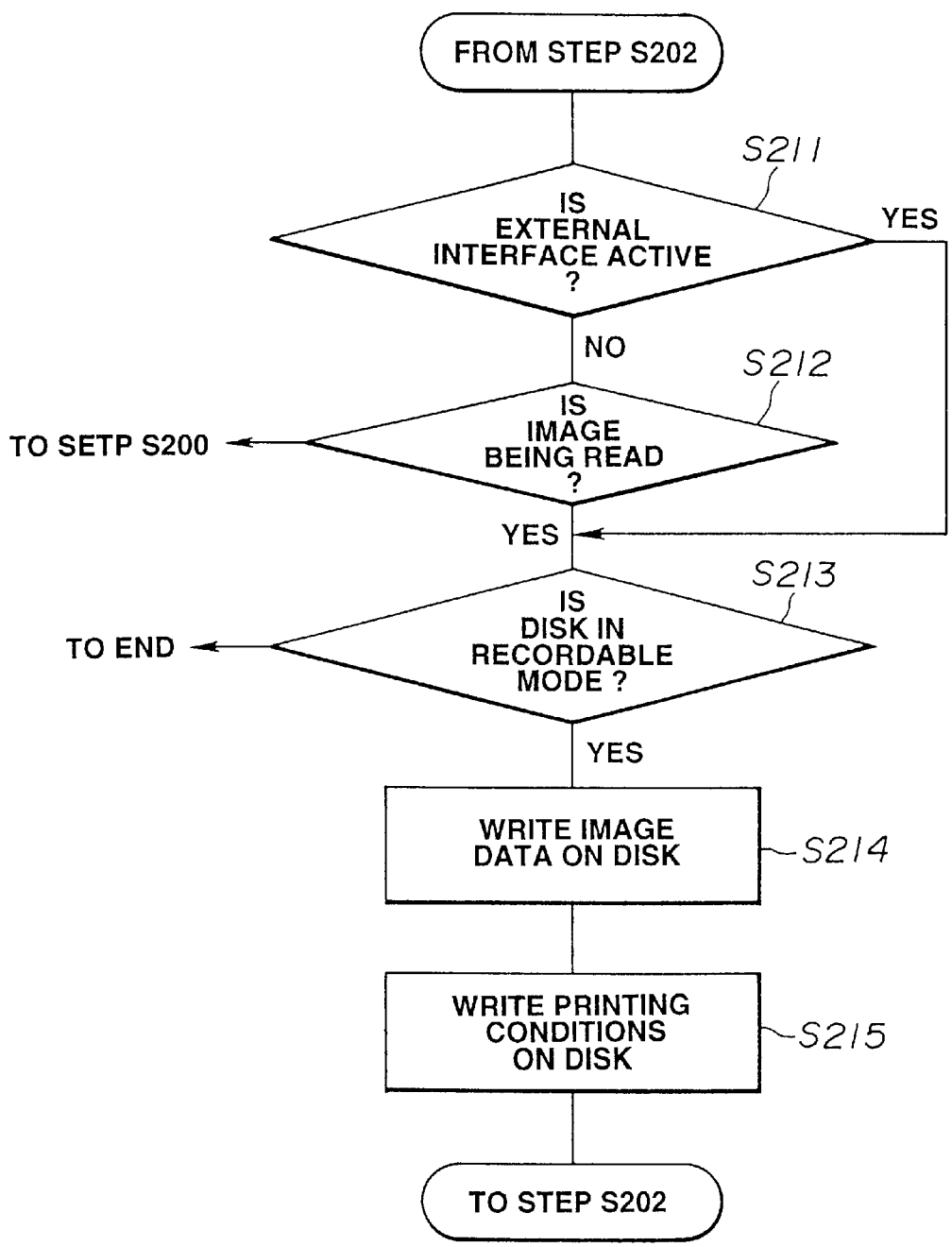
FIG. 50 is a flow chart explaining a subroutine of the printing action.

The procedure of saving the printing information with the image data, and printing action on the printer 2 is shown in a flow chart of FIGS. 49 and 50.

The flow chart of FIG. 49 starts with the main power supply in the still image recording/playback system of the present invention being turned on. The procedure then moves to Step S200.

At Step S200, the system controller 6 communicates with the storage controller 5d of the storage 5 and examines whether or not the optical disk 20 is loaded in the storage 5. If not, Step S200 is repeated until the optical disk 20 is loaded. When it is judged yes, the procedure goes to Step S201.

At Step S201, the storage controller 5d directs the disk recording/playback device 5c to read the printing information from the optical disk 20 and transfer it to the system controller 6. This is followed by Step S202.

At Step S202, the system controller 6 examines the printing information from the storage 5 whether printing of the image is requested or not. If not, the procedure goes to Step S211 shown in FIG. 50 and when it is judged yes, to Step S203.

At Step S211 shown in FIG. 50, the system controller 6 examines whether or not input of the image data from the scanner 1 or video input 8 is requested. If not, the procedure goes back to Step S200 of FIG. 49 for repeating the steps S200 to S202. When it is judged yes, Step S213 follows.

At Step S213, the system controller 6 communicates with the storage controller 5d and examines whether or not the optical disk 20 is ready for recording. If not, the routine shown in FIG. 50 is terminated. When it is judged yes, the procedure goes to Step S214.

At Step S214, the storage controller 5d directs the disk recording/playback device 5c to record on the optical disk 20 the image data received from the scanner 1 or video input 8. This is followed by Step S215.

At Step S215, the system controller 6 transfers the printing information from the user to the storage controller 5d and directs the storage controller 5d to activate the disk recording/playback device 5c for recording on the optical disk 20 the image data along with the printing information. The procedure then goes back to Step S202 shown in FIG. 49 and the above routine is repeated.

At Step S203 shown in FIG. 49, the system controller 6 determines printing conditions (number of prints, color setting, sheet size, etc) for the printer 2. This is followed by Step S204.

At Step S204, the system controller 6 examines whether the color setting of the printing conditions specified by the printing information is commanded or not. When it is judged yes, the procedure goes to Step S209 and if not, to Step S205.

At Step S209, the system controller 6 selects a masking in the printer 2 to meet the color setting determined. This is followed by Step S205.

At Step S205, the system controller 6 examines whether the printing location of the printing conditions specified by the printing information is commanded or not. When it is judged yes, the procedure goes to Step S210 and if not, to Step S206.

At Step S210, the system controller 6 controls the printer 2 to set the printing location determined. This is followed by Step S206.

At Step S206, the system controller 6 directs the printer 2 to perform a printing action under the predetermined printing conditions. Step S207 follows.

At Step S207, the system controller 6 erases the printing conditions determined previously. This is followed by Step S208.

At Step S208, the system controller 6 examines whether the printing action has been finished or not. If not, the procedure goes back to Step S202 and the above routine is repeated. When it is judged yes, the procedure is terminated.

As the printing information has been stored together with its image data on the optical disk 20, it is read and used to automatically control the settings of the printer 2 for printing. This eliminates troublesome resetting of the printing conditions. Also, the color setting, e.g. tint, is constantly maintained at optimum, preventing fault printing.

The printer 2 is allowed to read and receive the image data directly from the optical disk 20 during the printing action. As the optical disk 20 is substituted for the frame memory 11, the frame memory 11 itself will be omitted or its storage capacity will be decreased to minimum.

As the optical disk 20 carries the printing information of the image data, it can be utilized on another printer, which is compatible with the printer 2 of the embodiment, for producing e.g. a predetermined number of prints with the optimum tint level. Accordingly, the system of the present invention is novel for producing still image prints.

As set forth above, the image recording apparatus, image recording method, image playback method, recording medium, and management method according to the present invention allow still images of photograph or print to be stored and controlled with ease. The still image system of the present invention incorporating the above methods is thus advantageous over conventional still image systems for storing still images of photograph.

What is claimed is:

1. A playback apparatus for playing back image data stored in a recording medium which has an image file having a plurality of high resolution image files containing high resolution image data, at least one index file containing more than one low resolution image data produced from the high resolution image data, a management file containing management data for displaying the high resolution image files specified by their respective low resolution image data, and a management data table containing location data for identifying relative recording locations of the image file and the management file on the recording medium based on recording units of the recording medium, comprising:

a playback means for retrieving the image file from the recording medium and playing back the image data in the image file;

a display means for displaying images of the image data played back by the playback means; and a controller means for retrieving a single one of the at least one index file from the recording medium by referring to the management data in the management file and the location data in the management data table and controlling the playback means so that the more than one low resolution image data in the retrieved single index file is displayed on the display means.

2. A playback apparatus according to claim 1, wherein the controller means includes a memory means for saving data of the management file and the management data table, and the controller means is arranged responsive to the data of the management file and the management data table in the memory means for directing the playback means to play back the image file.

3. A playback apparatus according to claim 1, wherein the playback means includes a decoding means for decoding the image data of the image file.

4. A playback apparatus according to claim 2, wherein:

the recording medium has a multi-level directory structure comprising a directory and subdirectories provided in a lower level than the directory;

the management file comprises a first management file allocated in the directory and a second management file allocated in each subdirectory; and the single one of the at least one index file comprises a first index file allocated in the directory and a second index file allocated in the subdirectory.

5. A playback apparatus according to claim 4, wherein the controller means is arranged to control the playback means for producing on the display means a first screen display of a specific number of the low resolution image data retained in the first index file with reference to the data of the first management file and the management data table saved in the memory means, and for producing on the display means a second screen display of a given number of the low resolution image data retained in the second index file with reference to the data of the second management file and the management data table saved in the memory means.

6. A playback apparatus according to claim 5, wherein:

the first screen display is composed of the specific number of the low resolution image data indicating the subdirectories leveled lower than the directory; and the second screen display is composed of the given number of the low resolution image data indicating all the image files in the subdirectories.

7. A playback apparatus for playing back image data stored in a recording medium which has an image file consisting of a plurality of high resolution image files containing high resolution image data and at least one index file containing a predetermined number of low resolution image data produced from the high resolution image data, a management file containing management data for displaying the high resolution image files specified by their respective low resolution image data, and a management data table containing location data for identifying the relative recording locations of the image file and the management file on the recording medium on the basis of recording units of the recording medium, comprising:

a playback means for retrieving the image file from the recording medium and playing back the image data in the image file;

a display means for displaying images of the image data played back by the playback means; and a controller means for retrieving the index file from the recording medium by referring to the management data in the management file and the location data in the management data table and controlling the playback means so that the predetermined number of the low resolution image data in the retrieved index file is displayed on the display means, the controller means including a memory means for saving data of the management file and management data table and is arranged responsive to the data of the management file and management data table in the memory means for directing the playback means to play back the image file;

wherein:

the recording medium has a multi-level directory structure comprising a directory and subdirectories provided in a lower level than the directory;

the management file has a first management file allocated in the directory and a second management file allocated in each subdirectory;

the index file has a first index file allocated in the directory and a second index file allocated in the subdirectory;

the controller means is arranged to control the playback means for producing on the display means a first screen display of a specific number of the low resolution image data retained in the first index file with reference to the data of the first management file and the management data table saved in the memory means, and for producing on the display means a second screen display of a given number of the low resolution image data retained in the second index file with reference to the data of the second management file and the management data table saved in the memory means;

the first screen display is composed of the specific number of the low resolution image data indicating the subdirectories leveled lower than the directory;

the second screen display is composed of the given number of the low resolution image data indicating all the image files in the subdirectories;

the first management file contains a plurality of directory data units arranged corresponding to the order of displaying the specific number of the low resolution image data in the first screen display; and the second management file contains a plurality of image data units arranged corresponding to the order of displaying the given number of the low resolution image data in the second screen display, thus allowing the controller means to specify a subdirectory through examining the directory data units and the low resolution image data in the first screen display and also, a high resolution image file through examining the image data units and the low resolution image data in the second screen display.

8. A playback apparatus according to claim 7, wherein:

each directory data unit of the plurality of directory data units contains a directory number indicative of a subdirectory; and each image data unit of the plurality of image data units contains an image number indicative of a high resolution image file.

9. A playback apparatus according to claim 8, wherein:

the recording medium includes a first area for storing the image file and the management file, and a second area for storing the management data table; and the management data table comprises first management blocks for controlling the second area on the basis of units of management block differentiated from the recording units, and second management blocks for controlling the location of the image file in the first area on the basis of the recording units for each directory or subdirectory, thus allowing the controller means to control the playback means for retrieving the specified high resolution image file through referring to data of the first and second management blocks.

10. A playback apparatus according to claim 9 wherein the controller means is arranged to specify a second management block indicative of the directory with reference to the data of the first management blocks, and directs the playback means to retrieve the first index file through referring to data of the second management block indicative of the directory.

11. A playback apparatus according to claim 9 wherein the controller means is arranged to specify a second management block indicative of the directory with reference to the data of the first management blocks, also specify a second management block indicative of the specified subdirectory with reference to data of the second management block indicative of the directory, and directs the playback means to retrieve the second index file in the subdirectory through referring to data of the second management block indicative of the subdirectory.

12. A playback apparatus according to claim 9 wherein the controller means is arranged to specify a second management block indicative of the directory with reference to the data of the first management blocks, also specify a second management block indicative of the specified subdirectory with reference to data of the second management block indicative of the directory, and directs the playback means to retrieve the specified high resolution image file through referring to data of the second management block indicative of the subdirectory.

13. A method of playing back image data stored in a recording medium which has an image file having a plurality of high resolution image files containing high resolution image data, at least one index file containing more than one low resolution image data produced from the high resolution image data, a management file containing management data for displaying the high resolution image files specified by their respective low resolution image data, and a management data table containing location data for identifying relative recording locations of the image file and the management file on the recording medium based on recording units of the recording medium, comprising the steps of:

(a) retrieving a single one of the at least one index file from the recording medium through referring to the management data of the management file and the location data of the management data table; and (b) playing back the single index file retrieved at the step (a) so that the more than one low resolution image data in the single index file is displayed on a display means.

14. A playback method according to claim 13, further comprising a step of saving the data of the management file and the management data table in a memory means other than the recording medium so that in the step (b), the single index file is played back by means of the data of the management file and the management data table saved in the memory.

15. A playback method according to claim 13, further comprising a step of decoding the low resolution image data in the single one of the at least one index file.

16. A playback method according to claim 14, wherein:

the recording medium has a multi-level directory structure comprising a directory and subdirectories provided in a lower level than the directory;

the management file comprises a first management file allocated in the directory and a second management file allocated in each subdirectory; and the single one of the at least one index file comprises a first index file allocated in the directory and a second index file allocated in the subdirectory.

17. A playback method according to claim 16, wherein the step (b) includes:

producing on the display means a first screen display of a specific number of the low resolution image data retained in the first index file, with reference to the data of the first management file and the management data table saved in the memory means, and producing on the display means a second screen display of a given number of the low resolution image data retained in the second index file, with reference to the data of the second management file and the management data table saved in the memory means.

18. A playback method according to claim 17, wherein:

the first screen display is composed of the specific number of the low resolution image data indicating the subdirectories leveled lower than the directory; and the second screen display is composed of the given number of the low resolution image data indicating all the image files in the subdirectories.

19. A playback method of playing back image data stored in a recording medium which has an image file consisting of a plurality of high resolution image files containing high resolution image data and at least one index file containing a predetermined number of low resolution image data produced from the high resolution image data, a management file containing management data for displaying the high resolution image files specified by their respective low resolution image data, and a management data table containing location data for identifying the relative recording locations of the image file and the management file on the recording medium on the basis of recording units of the recording medium, comprising the steps of:

(a) retrieving the index file from the recording medium through referring to the management data of the management file and the location data of the management data table;

(b) playing back the index file retrieved at the step (a) so that the predetermined number of the low resolution image data in the index file is displayed on the display means; and (c) saving the data of the management file and management data table in a memory means other than the recording medium so that in the step (b), the index file is played back by means of the data of the management file and management data table saved in the memory;

wherein:

the recording medium has a multi-level directory structure comprising a directory and subdirectories provided in a lower level than the directory;

the management file comprises a first management file allocated in the directory and a second management file allocated in each subdirectory;

the index file comprises a first index file allocated in the directory and a second index file allocated in the subdirectory;

the step (b) further includes the steps of:

(i) producing on the display means a first screen display of a specific number of the low resolution image data retained in the first index file, with reference to the data of the first management file and the management data table saved in the memory means, the first screen display is composed of the specific number of the low resolution image data indicating the subdirectories leveled lower than the directory; and (ii) producing on the display means a second screen display of a given number of the low resolution image data retained in the second index file, with reference to the data of the second management file and the management data table saved in the memory means, the second screen display is composed of the given number of the low resolution image data indicating all the image files in the subdirectories; and while the first management file contains a plurality of directory data units arranged corresponding to the order of displaying the specific number of the low resolution image data in the first screen display, and the second management file contains a plurality of image data units arranged corresponding to the order of displaying the given number of the low resolution image data in the second screen display, the playback method further comprises the steps of:

(d) specifying a subdirectory through examining the directory data units and the low resolution image data in the first screen display; and (e) specifying a high resolution image file through examining the image data units and the low resolution image data in the second screen display.

20. A playback method according to claim 19, wherein:

each directory data unit of the plurality of directory data units contains a directory number indicative of a subdirectory; and each image data unit of the plurality of image data units contains an image number indicative of a high resolution image file.

21. A playback method according to claim 19, further comprising, while the recording medium includes a first area for storing the image file and the management file and a second area for storing the management data table, and the management data table comprises first management blocks for controlling the second area on the basis of units of management block differentiated from the recording units, and second management blocks for controlling the location of the image file in the first area on the basis of the recording units for each directory or subdirectory:

(f) retrieving the high resolution image file specified at the step (e) through referring to data of the first and second management blocks.

22. A playback method according to claim 21, further comprising:

specifying a second management block indicative of the directory with reference to the data of the first management blocks, and as in the step (a), retrieving the first index file through referring to data of the second management block indicative of the directory.

23. A playback method according to claim 21, further comprising:

specifying a second management block indicative of the directory with reference to the data of the first management blocks; and specifying a second management block indicative of the subdirectory specified at the step (d) with reference to data of the second management block indicative of the directory, and as in the step (a), retrieving the second index file in the subdirectory specified at the step (e) through referring to data of the second management block indicative of the subdirectory.

24. A playback method according to claim 21, further comprising:

specifying a second management block indicative of the directory with reference to the data of the first management blocks; and specifying a second management block indicative of the subdirectory specified at the step (d) with reference to data of the second management block indicative of the directory, and as in the step (f), retrieving the high resolution image file specified at the step (e) through referring to data of the second management block indicative of the subdirectory of the step (d).

25. An apparatus for playing back pictures stored on a recording medium, the apparatus comprising:

a controller that identifies a plurality of low resolution pictures to be retrieved from a recording medium;

a playback device that retrieves the plurality of low resolution pictures identified by the controller; and a display device that simultaneously display all of the low resolution pictures retrieved by the playback device;

wherein the recording medium also stores a plurality of medium resolution pictures that correspond with the plurality of low resolution pictures, wherein the controller identifies a medium resolution picture that corresponds with a low resolution picture displayed on the display device when the low resolution picture is selected, wherein the playback device retrieves the medium resolution picture identified by the controller, and wherein the display device display the medium resolution picture retrieved by the playback device.

* * * * *